(12) United States Patent
Peterson et al.

(10) Patent No.: US 7,734,397 B2
(45) Date of Patent: Jun. 8, 2010

(54) METHOD AND SYSTEM FOR TRACKING THE POSITIONING AND LIMITING THE MOVEMENT OF MOBILE MACHINERY AND ITS APPENDAGES

(75) Inventors: Brandon J. Peterson, West Jordan, UT (US); Michael G. Nelson, Murray, UT (US); William A. Hustrulid, Bonita Springs, FL (US)

(73) Assignee: Wildcat Technologies, LLC, West Jordan, UT (US)

( * ) Notice: Subject to any disclaimer, the term of this patent is extended or adjusted under 35 U.S.C. 154(b) by 1120 days.

(21) Appl. No.: 11/319,876

(22) Filed: Dec. 28, 2005

(65) Prior Publication Data

US 2007/0150149 A1 Jun. 28, 2007

(51) Int. Cl.
*E02F 5/00* (2006.01)
(52) U.S. Cl. .............................................. 701/50; 172/2
(58) Field of Classification Search .................... 701/50; 414/697, 699; 172/2, 4, 4.5; 37/348, 395, 37/397, 414, 415, 907
See application file for complete search history.

(56) References Cited

U.S. PATENT DOCUMENTS

| | | |
|---|---|---|
| 4,106,022 A | 8/1978 | Last |
| 4,583,907 A | 4/1986 | Wimberley |
| 4,622,458 A | 11/1986 | Boeck et al. |
| 5,157,408 A | 10/1992 | Wagner et al. |
| 5,160,056 A * | 11/1992 | Yoshimatsu et al. ......... 212/277 |
| 5,432,841 A | 7/1995 | Rimer |
| 5,490,081 A * | 2/1996 | Kuromoto et al. ........... 700/178 |
| 5,646,844 A * | 7/1997 | Gudat et al. ................. 701/208 |
| 5,704,141 A * | 1/1998 | Miura et al. .................... 37/348 |
| 5,710,798 A | 1/1998 | Campana, Jr. |
| 6,040,801 A | 3/2000 | Dawirs |
| 6,047,475 A | 4/2000 | Tyrrell et al. |
| 6,085,090 A | 7/2000 | Yee et al. |
| 6,112,143 A | 8/2000 | Allen et al. |
| 6,370,126 B1 | 4/2002 | De Baere et al. |
| 6,377,210 B1 | 4/2002 | Moore |
| 6,405,132 B1 | 6/2002 | Breed et al. |
| 6,611,738 B2 | 8/2003 | Ruffner |
| 6,711,838 B2 * | 3/2004 | Staub et al. .................... 37/348 |
| 6,768,944 B2 | 7/2004 | Breed et al. |
| 6,799,032 B2 | 9/2004 | McDonnell et al. |
| 6,799,116 B2 | 9/2004 | Robbins |
| 6,813,499 B2 | 11/2004 | McDonnell et al. |
| 6,862,526 B2 | 3/2005 | Robbins |
| 6,882,307 B1 | 4/2005 | Gifford |
| 7,178,606 B2 * | 2/2007 | Pecchio .......................... 172/6 |
| 2005/0134367 A1 | 6/2005 | Johnson et al. |
| 2006/0136110 A1 | 6/2006 | Casey et al. |
| 2006/0232856 A1 | 10/2006 | Horiguchi et al. |

* cited by examiner

*Primary Examiner*—Dalena Tran
(74) *Attorney, Agent, or Firm*—Morriss O'Bryant Compagni

(57) ABSTRACT

A method and system for tracking and limiting the movement of key identified points on a movable machine, through the use of location devices positioned on the body or appendages of the machine, by comparing the sensed locations against a database of site information, and to restrict movement of the machine and/or its appendages if it has or is likely to pass through a defined boundary in the site information database.

29 Claims, 62 Drawing Sheets

METHOD AND SYSTEM FOR TRACKING THE POSITIONING AND LIMITING THE MOVEMENT OF MOBILE MACHINERY AND ITS APPENDAGES

BACKGROUND OF THE INVENTION

1. Field of the Invention

This invention relates to techniques and devices for locating, tracking, positioning and limiting the movement of mobile machines and/or mobile appendages of machines. More specifically, this invention relates to the tracking and control of the positions of such machines that makes use of a computer system programmed to receive positional information and user specified three dimensional boundary information and then to limit the movement of the machine within the established boundaries.

2. Description of Related Art

A variety of devices and techniques for position tracking and control are well known in the field. These include the use of one or two location points and then supplementing this data with information from onboard sensors or movement algorithms. The use of onboard sensors has been proven to be problematic, in that in many circumstances devices or sensors, which are located on the machines, body are destroyed or damaged during operation of the machine. Some prior systems, such as the Caterpillar CAESultra, Leica Geosystems Dozer 2000 and the Modular Mining Systems Shovel Positioning System, provide computer based machine operator assistance that displays the current location of the equipment relative to predefined surface outlines. Other prior systems, such as the P&H Mining Equipment OptiDig is designed to automatically optimize the power usage of electric shovels during digging.

Further systems, such as supplied by P&H Mining Equipment's Electric Boom Protection Envelope, is designed to limit the dipper of an electric shovel from coming into contact and potentially damaging the shovel boom by controlling the speed and motion of the shovel hoist and crowd. Still further systems, such as Caterpillar's Accugrade use only two GPS ("Global Positioning Satellite") receiver units positioned on the blade of the dozer to determine if the dozer blade is going past any design limits and to lift the blade if it is. And, another system, the Norvariant Logic 7D, uses two GPS antennas connected to a dual GPS receiver to track the position of the bucket and compare this information to data supplied by the user to display the location of the bucket relative to the final design of the project being worked on.

Systems having locating means are described in U.S. Pat. No. 4,106,022 which describes a relay system for relaying hyperbolic navigation signal information received by a mobile user. U.S. Pat. No. 4,583,907 describes a flexible extensible apparatus for employing an end-use work tool for one of multiple purposes. U.S. Pat. No. 4,622,458 describes a trajectory acquisition and monitoring system that includes a plurality of mobile optical-electronic data acquisition stations for individual training on particular mobile targets.

U.S. Pat. No. 5,157,408 describes a radio system for determining the range and bearing of mobile equipment, with a low probability of interception. U.S. Pat. No. 5,432,841 describes a vehicle location system which provides a plurality of cellular systems that includes a memory for identifying the cellular subscriber stations that are based in the particular system and visiting cellular subscriber stations based in another of the systems. U.S. Pat. No. 5,710,798 describes a system and method for wireless transmission of information which is subject to fading by using an RF carrier modulated with a subcarrier modulated with the information.

U.S. Pat. No. 6,040,801 describes a radio navigation system that is particularly directed to means for transmitting range and azimuthal information to selected receivers only. U.S. Pat. No. 6,047,475 describes a demolition shear attachable to a mobile machine by one of two brackets. U.S. Pat. No. 6,085,090 describes an autonomous interrogatable information and position device that combines the functionality of a satellite communications device, a geo-location device, an input/output port, and a control processor.

U.S. Pat. No. 6,370,126 B1 describes a communication system for communication with a plurality of mobile terminals. U.S. Pat. No. 6,377,210 B1 describes an automatic mobile object locator apparatus and method that provide position information and map data to user terminal equipment through a data communication network, such as the Internet. U.S. Pat. No. 6,405,132 B1 and U.S. Pat. No. 6,045,132 B1 describe systems and methods for preventing vehicle accidents in which GPS ranging signals relating to a host vehicle's position on a roadway on a surface of the earth are received on a first communication link from a network of satellites and DGPS auxiliary range correction signals for correcting propagation delay errors in the GPS ranging signals are received on a second communication link from a station or satellite.

U.S. Pat. No. 6,768,944 B2 describes a control system and method for controlling a vehicle or a component of a vehicle in which an inertial reference unit includes accelerometers and gyroscopes which provide data on vehicle motion and a processor processes the data and controls the vehicle or component of the vehicle based thereon. U.S. Pat. No. 6,799,032 B2 describes a mobile entity that provides accuracy limit data that indicate a desired accuracy of location data about the mobile entity. U.S. Pat. Nos. 6,799,116 B2 and U.S. Pat. No. 6,862,526 B2 describe methods and apparatus for producing GPS corrections. U.S. Pat. No. 6,813,499 B2 describes a method and device for obscuring the location of a mobile entity to a specified accuracy level. U.S. Pat. No. 6,882,307 B1 describes a system for interactive tracking and inventorying of incident response equipment.

SUMMARY OF THE INVENTION

It is desirable to provide a method and system that is capable of tracking and limiting the movement of key points on the body and/or appendages of mobile machines. Moreover, it is particularly desirable to provide such a method and system that actively limit the machine from exceeding the predetermined limits of operation for the machinery; that display the equipment's location relative to a predetermined surface design; and that interact with the equipment in a way that would limit the equipment from damaging an object and/or structure.

Accordingly, it is an object of one or more embodiments of this invention to provide a method and/or system for tracking and limiting the movement of key points on the body and/or appendages of a mobile machine.

Further, it is an object of one or more embodiments of this invention to provide such a method and/or system for tracking and limiting the movement of key points on a body and/or appendages of a mobile machine that can actively limit the machine from exceeding the predetermined limits of operations.

Further, it is an object of one or more embodiments of this invention to provide such a method and/or system for tracking and limiting the movement of key points on a body and/or appendages of a mobile machine that is adapted to work with a wide variety of machines or equipment, including but not necessarily limited to lifting equipment, including fork trucks, cranes, cherry pickers and reach stackers; loading equipment, including electric shovels, front shovels, mass excavators, backhoes, utility shovels and front end loaders; scraping equipment, including scrapers, dozers, graders and bobcats; hauling equipment, including haul trucks, dump trucks and belly dumps; and other equipment such as trenchers, drills and augers.

Further, it is an object of one or more embodiments of this invention to provide such a method and/or system for tracking and limiting the movement of key points on a body and/or appendages of a mobile machine that provides a display of the equipment's location relative to a predetermined surface design.

Further, it is an object of one or more embodiments of this invention to provide such a method and/or system for tracking and limiting the movement of key points on a body and/or appendages of a mobile machine that interacts with the equipment in a manner that would limit the equipment from damaging an object and/or structure.

Further, it is an object of one or more embodiments of this invention to provide such a method and/or system for tracking and limiting the movement of key points on a body and/or appendages of a mobile machine that controls the equipment when the equipment is in danger of exceeding the predetermined limit boundary of the system.

Further, it is an object of one or more embodiments of this invention to provide such a method and/or system for tracking and limiting the movement of key points on a body and/or appendages of a mobile machine that uses three or more GPS units to provide accurate measurement, including the axis of rotation of the equipment and/or appendage.

Further, it is an object of one or more embodiments of this invention to provide such a method and/or system for tracking and limiting the movement of key points on a body and/or appendages of a mobile machine that will typically place the GPS units on the top of the body of the equipment, thereby avoiding damage to the GPS units when the equipment is in use.

Further, it is an object of one or more embodiments of this invention to provide such a method and/or system for tracking and limiting the movement of key points on a body and/or appendages of a mobile machine that includes a location system and a control system.

Additional objects, advantages and other novel features of this invention will be set forth in part in the description that follows and in part will become readily apparent to those skilled in the art upon examination of the following or may be learned with the practice of the invention. The objects and advantages of this invention may be realized and attained by means of the instrumentalities and combinations particularly pointed out in the appended claims. Still other objects of the present invention will become readily apparent to those skilled in the art from the following description wherein there is shown and described the preferred embodiment(s) of this invention, simply by way of illustration of one or more of the modes best suited to carry out this invention. As it will be realized, this invention is capable of other different embodiments, and in its several details, specific components and steps, is capable of modification in various aspects without departing from the concepts of this invention.

BRIEF DESCRIPTION OF THE DRAWINGS

In the drawings, which currently illustrate what is considered to be the best mode for carrying out the invention.

DETAILED DESCRIPTION OF THE INVENTION

Figure 1:
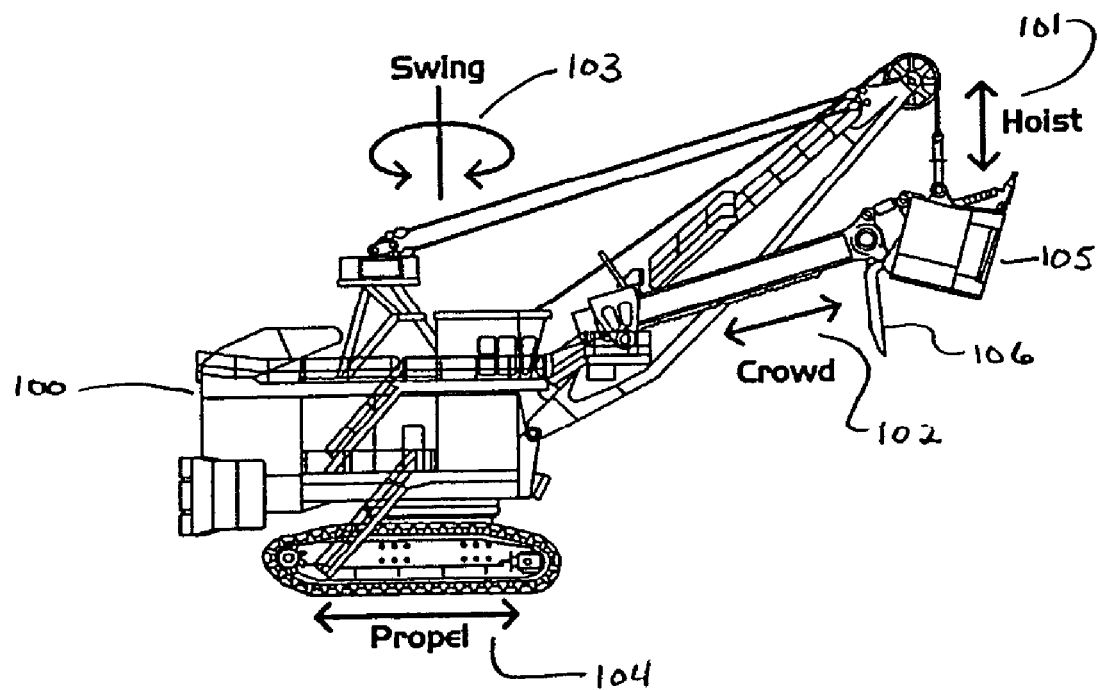
FIG. 1 is an illustration modern shovel movements.

This invention is a method and system of tracking and limiting the movement of key points on the body and/or appendages of mobile machines, such as construction equipment and the like. The movement of these key points is tracked in an external coordinate system through the use of a minimum of one, or more preferably three or more location points and information supplied by the joint position monitors on the machine. The movement of the key points is then limited by comparing the current and/or predicted future location of the key points relative to three dimensional boundary data supplied by the end user.

This invention can be used and adapted for use with a wide variety of applications, including, but not necessarily limited to, mining and excavating, construction, hauling, lifting, loading, scraping, and other digging or drilling. The use of this invention in these applications can enable the final result of the work to conform to the initial design and to protect the machine operator(s), machine, and surrounding structures from damage caused by the movement of the machine past intended boundary limits. This invention can be used with a wide variety of machines or equipment, including, but not necessarily limited to: lifting equipment, such as fork trucks, cranes, cherry pickers, reach stackers and the like; loading equipment, such as electric shovels, front shovels, mass excavators, backhoes, utility shovels, front end loaders, and the like; scraping equipment, including scrapers, dozers, graders, bobcats, and like; hauling equipment, including haul trucks, dump trucks, belly dumps and the like; and other digging equipment, including trenchers, drills, augers and the like.

In the present mode of the invention, it includes two separate systems, the location system and the control system. The location system has one or more location points (three or more being preferred). Typically, in embodiments using only one or two location points, additional equipment is used to supply the information required to calculate the location and orientation of the machine and/or its appendages. The control system includes a computer, connected (typically electrically) to the machine and the location system. The control system computer is programmed to calculate the locations of the key points on the machine and/or its appendages with the information supplied by the location system. After calculating the locations of the key points, the control system monitors the key point locations relative to the limit boundaries that have been entered into the control system. The control system detects if any of the key points has passed and/or is projected to pass through the limit boundaries, and then limits the movements of the machine and/or its appendages to bring the key points back to within the limit boundaries.

In the present embodiment, this invention functions by calculating the global (limit boundary specific) location(s) of the key points through the use of the information supplied by the location points and any information supplied by sensors on a machine joints and/or extension points. After calculating the global locations of the key points, the control system monitors and tracks the key point location information relative to the limit boundaries that have entered into the control system computer. If the control system detects that any of the key points have already or are projected to move past one or more limit boundaries, then the control system limits the movement of the machine and/or its appendage(s) so as to stop or keep the key points from going past the limit boundaries.

In its present preferred embodiment, this invention makes use of three or more location points in order to accurately locate the key points without requiring the machine to move around, without inaccuracies due to abnormalities such as dense ore bodies in the ground, and without requiring additional location identification equipment. Also, in the present preferred embodiment, Global Positioning Satellite (GPS) units are used as locating devices and preferably "false" satellites are used to keep the system working at optimum accuracy when there are not enough visible satellites in the sky. Alternative, position locating devices/system, such as radio transmitter/receivers, lasers, or fixed location machines, can be substituted without diverging from the concept of this invention. Also, in the present preferred embodiment of this invention, joint-monitoring sensors can be used to calculate the current angles and distances of the different joints, extensions and rope lengths of the machine. In alternative embodiments, other sensors, such as tilt sensor and extra locating devices, can be employed without departing from the concept of this invention.

Throughout most of the following description, this invention is described as used on large electric shovels as are typically used in mining operations. However, this invention can be employed on nearly any type of moveable and/or mobile construction equipment that can have an impact on the final design or result of a project or on equipment that is consistently put in danger or which can put other structures, machines and/or people in danger when in use through its expected area of travel.

This invention includes three components that work together as a whole. The first is the shovel, on which sensors will be installed. The shovel must be equipped to report the crowd and hoist positions and to receive overriding instructions from a computer. The second component of the invention includes the GPS units and a base station. Presently three GPS units are preferred, as three units will enable the system to independently instantly determine the shovel's location and orientation. The base station sends satellite correction information to the GPS units, which increases their accuracy typically to about within 1-centimeter (0.39-inch). The third component is the invention control computer. This computer contains the programming for a complex set of calculations that determine the bucket position, detect mine design limit intersections, and calculate the adjustments to the shovel's controls.

The method of this invention calculates the locations of key bucket points in local and global coordinates, the intersection of the bucket with the design limit mesh, and the corrections that should be made to the controls so the shovel will follow the mine plan. In the design of this invention, it was found that each set of calculations had its own unique challenges, but by far the most challenging were the Global Key Bucket Point Location Calculations.

This invention was tested in a computer model, using a discrete-event simulation software package called Flexsim (Flexsim, 2004). The model was set up with each piece of equipment represented as a unique object in the model. This setup allowed the system to operate in the computer model as closely as possible to the way it would work in the real world. The test was set up to answer one primary question and three secondary questions, using three different mesh designs to represent the mine plan. The primary question was "Does the invention work as expected and if so how well?" The three secondary questions were the same question, considered for each of the three input parameters (check interval time, look ahead time, minimum adjustment value), namely, "What is the effect of changing this input parameter?"

This invention is not limited to use on only electric shovels, or for the protection of benches and highwalls. The system and method of this invention could be used to keep a wide variety of excavation and construction equipment from exceeding different types of limits put in place; limits that are designed to restrict equipment movement into unsafe areas, and to protect various types of structures. Modifications may be required for these applications depending on the type of equipment on which the system is implemented, and the limits the system will be required to maintain.

By way of background, in open pit mining the stability of the highwall is important to the safety and economic viability of the mining operation. The overall pit angle of an open pit mine determines the amount of waste that must be mined for each ton of ore that is recovered. When the amount of waste per ton of ore recovered increases, the mine becomes less profitable and the percentage of the ore body that is recovered decreases. In today's open pit mines a great amount of effort goes into designing the angles of the bench faces to maximize the profitability of the mine while maintaining a safe working environment.

The design of the highwalls in an open pit mine must take into account the strength of the highwall rock, the amount of rain and ground water that will be present, the shape and size of the ore body, and the major structures present in the rock. In open pit mines there are four main types of failures that will result from these conditions, and are taken into account when designing the highwalls: circular slip, plane sliding, wedge sliding, and toppling.

The modern electric shovels used in today's mining industry are large, powerful machines capable of digging nearly solid rock. Electric shovels are most commonly used in large open pit mines. Larger shovels are primarily used for the removal of waste material, due to their large capacities, while smaller electric shovels are primarily used for the recovery of ore because they can be more selective and thus control the ore grade.

FIG. 1 shows an illustration of modern shovel 100 movements of hoist 101, crowd 102, swing 103 and propel 104. The propel 104 motion is used only to move the shovel 100 from one location to another. The other three motions (hoist 101, crowd 102 and swing 103) are used to dig and transfer material. Typically, trucks or other machines are loaded. The digging and loading sequence of a shovel 100 can be broken down into four steps, making a cycle that is about 30 seconds long.

The first step begins when the shovel 101 is ready to dig. The operator will then begin to push the bucket 105 forward by increasing the crowd 102, while at the same time lifting the bucket 105 by decreasing the hoist 101. This causes the bucket 105 to dig into the material.

The second step begins when the bucket 105 has been filled with material from the first step. At this point the operator will lift the bucket 105 to the appropriate dumping height and swing 103 the bucket 105 to the dumping position at the same time.

The third step begins when the bucket 105 has reached the appropriate dumping position from the second step. The operator will then release the bucket 105 door 106 that is at the back of the bucket 105, allowing the material to fall through the bucket 105 to the loading location.

The final step begins when all the material is out of the bucket 105. The machine 100 operator will then swing 103 the machine 100 back into the loading position and lower the hoist 101 at the same time. The bucket 105 door 106 is closed by gravity when the bucket 105 is brought into the loading (digging) position.

Because this invention makes use of GPS units, the following brief review of Global Positioning Systems is provided.

Figure 2:
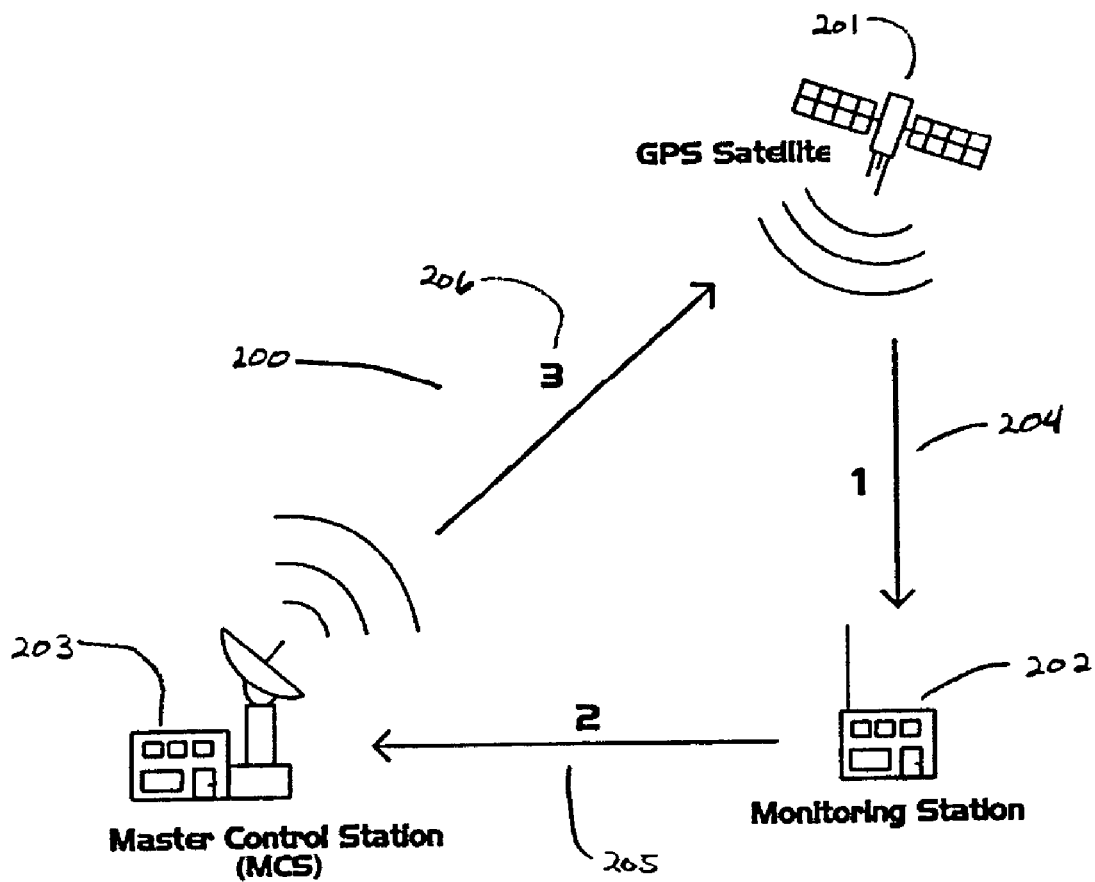
FIG. 2 is an illustration of the different GPS segments.
Figure 3:
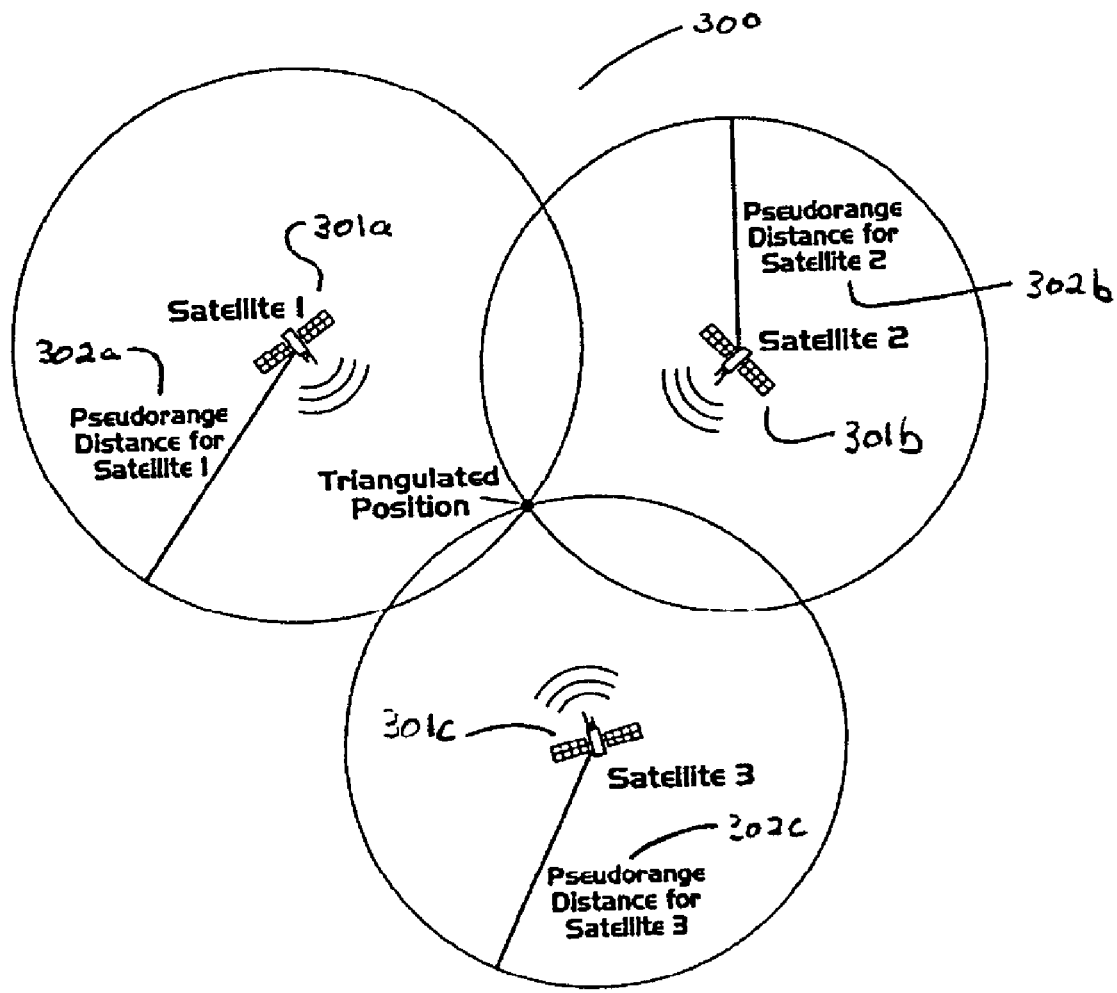
FIG. 3 is an illustration of how triangulation works with satellite pseudo-ranges.
Figure 4:
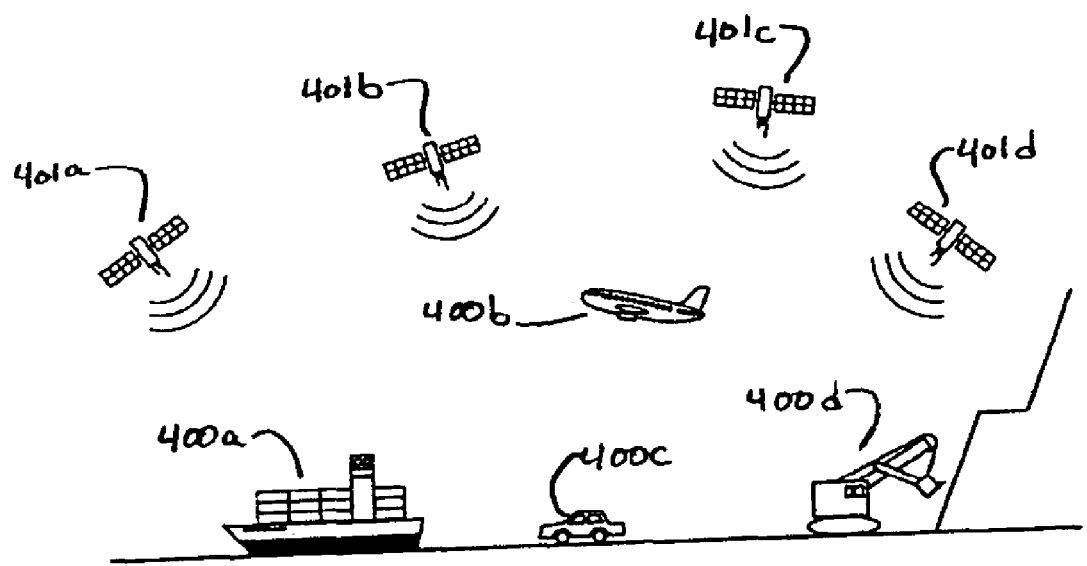
FIG. 4 is an illustration of multiple users simultaneously using the same satellites to calculate their position.

FIG. 2 is an illustration of the different segments of a standard GPS. The Global Positioning System 200, commonly known as GPS, is a space-based radio navigation system. It presently consists of 24 NAVSTAR (NAVigation Satellite Timing and Ranging) Satellites 201, owned and operated by the U.S. Department of Defense, and ground support for those satellites. In principle, the GPS system allows users to determine their positions in three dimensions anywhere on earth, in any weather, and at any time.

The three segments of the GPS system are the satellite segment 201, the ground control segment, and the user segment. Each satellite in the GPS system broadcasts a coded signal that contains specific information. The signal 204 broadcast by the satellite 201 is received by GPS receivers in a monitoring station 202 and is then decoded. The information contained in the signal is then compared to the information received from other satellites at the same time; this allows the receiver to calculate its position.

Figure 5:
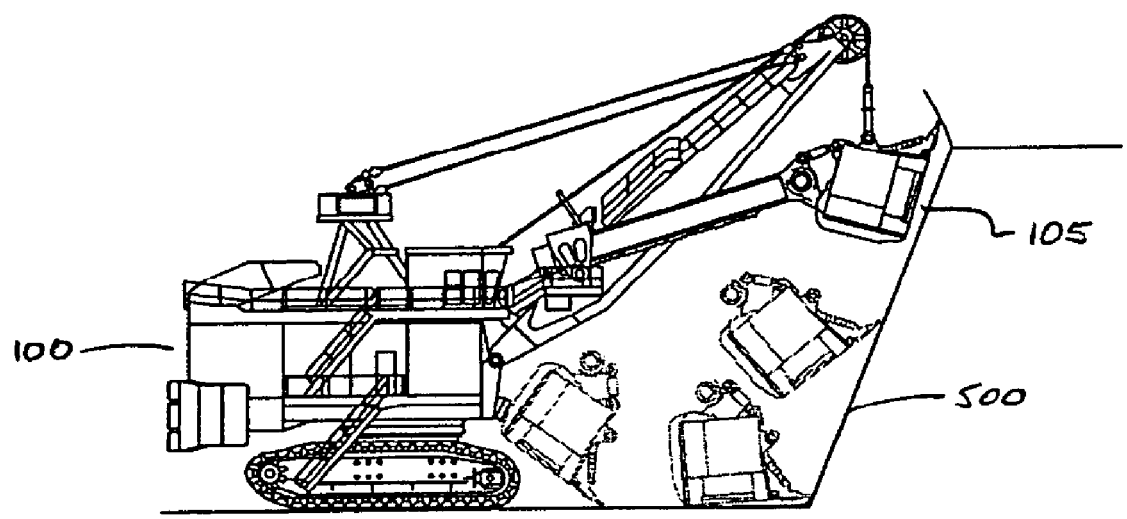
FIG. 5 is an illustration of a shovel performing a digging motion with use of this invention.
Figure 6:
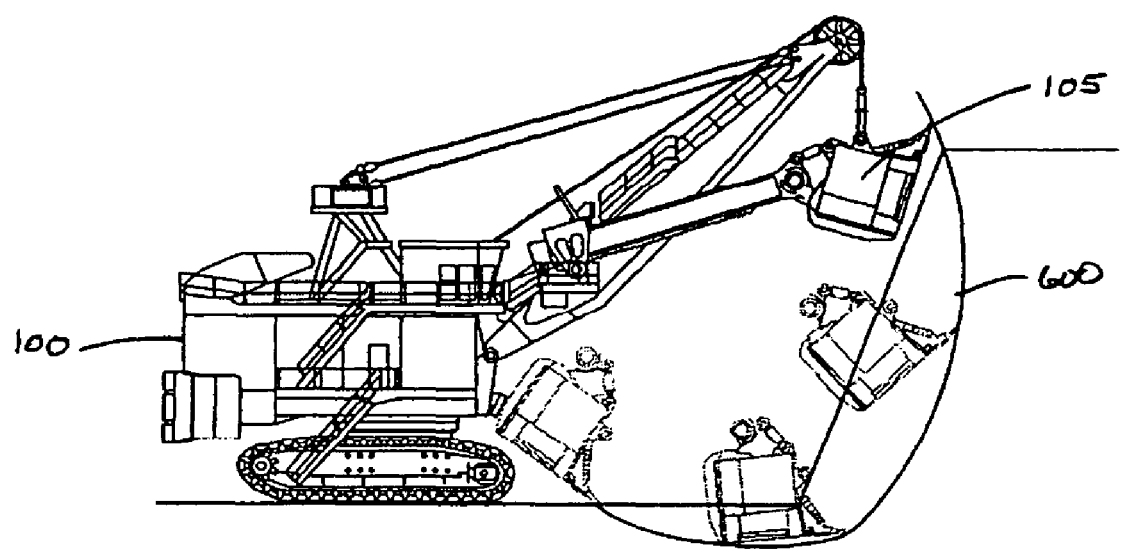
FIG. 6 is an illustration of a shovel performing a digging motion without the use of this invention.

This invention, which is a Computer-Controlled Excavation System ("CCES), was designed to protect open pit mine highwalls and benches from damage caused by large electric cable shovels 100. The system acts by overriding the operator's control inputs when the shovel 100 is in danger of damaging the highwall. The system override causes the shovel 100 bucket 105 to follow the contour 500 of the planned mine design, as shown in FIG. 5 rather than allowing the shovel 100 bucket 105 to follow its natural digging motion into the highwall 600, as shown in FIG. 6. The CCES combines GPS technology with spatial analysis and computer algorithms to allow automatic control of the bucket's 105 position in real time.

Figure 7:
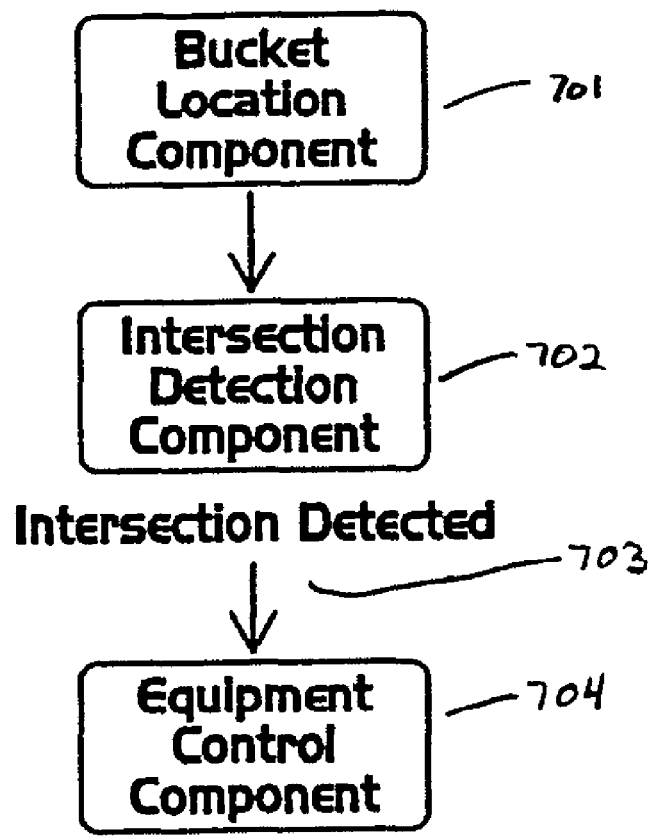
FIG. 7 is a flow diagram of the component steps of this invention.

FIG. 7 is a flow diagram of the component steps of this invention, the CCES. The CCES, of this invention, operates through the interactions among three distinct components of the system: Dipper or Bucket Location 701, Intersection Detection 702, and Equipment Control 704. The three components were designed to be independent of each other. This makes it possible to change one component without having a significant effect on the others. A system with three independent components is readily adaptable to equipment other than shovels and for situations other than highwall protection.

The Bucket Location component 701 is responsible for calculating the local bucket location and orientation and the global location of key bucket points at given crowd and hoist locations. The Bucket Location component is presently composed of two distinct sections, the Local Bucket Location and Orientation Calculations section and the Global Key Bucket Point Location Calculations section.

The Local Bucket Location and Orientation Calculations are responsible for calculating the locations for the key bucket points at given crowd and hoist locations. Because the bucket is constantly moving relative to the shovel, it is necessary for these calculations to be done in real time. These calculations are called by the Global Key Bucket Point Location Calculations section of the CCES, which is the same for all shovel types. The Local Bucket Location and Orientation Calculations are specific to the electric shovel design and may involve slight modifications when the CCES is used on different types of equipment. The modifications will adjust for the different ways that the digging surface moves on each piece of equipment.

The Global Key Bucket Point Location Calculations are responsible for calculating the location of the key bucket points in the global coordinate system. The key bucket points are the points that define the edges on the bucket that are tested for intersections with the mine design mesh. Two of these points are the left and right bottom front edges of the bucket. These points define a line across the bottom digging edge of the bucket that can be tested for intersections with the mine design mesh.

These calculations require the local location of the key bucket points before they can calculate the global location. To do this, the calculations call upon the Local Bucket Location and Orientation Calculations of the CCES. The Global Key Bucket Point Location Calculations are different from the local calculations because they are not dependent upon the shovel, but upon the GPS system. This means that as long as the CCES is set up with three GPS units, the Global Key Bucket Point Location Calculations will work with only minor changes on any other type of excavating equipment. The minor changes that may be necessary will adjust for differences in the number of edges that are checked for intersections with the mine design mesh.

The Intersection Detection 702 component is responsible for detecting edge intersections with the mine design mesh. Once the Bucket Location component 701 has determined the global location of the key bucket points, the Intersection Detection component 702 checks the mesh for intersections with the bucket edges defined by the key bucket points. It then sends the results from the test to the Equipment Control component 704. This component can be used on any other type of excavating equipment with only minor changes.

The Equipment Control component 704 is responsible for making adjustments to the user controls, to help the shovel avoid intersecting the mine design mesh. The initial Equipment Control component 704 calculations are based on the results form the Intersection Detection component 702. The Equipment Control component 704 decides what adjustments to make and what size to make them based on the calculations described in the Adjustment Group of the Mine Design Limit Calculations. When the Equipment Control component 704 makes an adjustment to the crowd or hoist control, it calls on the Intersection Detection component 702 to recheck the mesh for intersections. Based on those results it may make further adjustments.

The CCES, process of this invention, operates through the interactions among three components of the system, as shown in FIG. 7. The Bucket Location component 701 is responsible for calculating the global location and orientation of the bucket. This information is given to the Intersection Detection component 702. The Intersection Detection component 702 uses the information from the Bucket Location component to find any intersections with the mine design limits that the bucket is capable of at the future time specified by the look ahead time variable. If the CCES determines that the bucket is going to intersect 703 the mine design mesh, the Equipment Control component 704 will override the operator controls and prohibit the bucket from crossing the mine design limit mesh.

Figure 8:
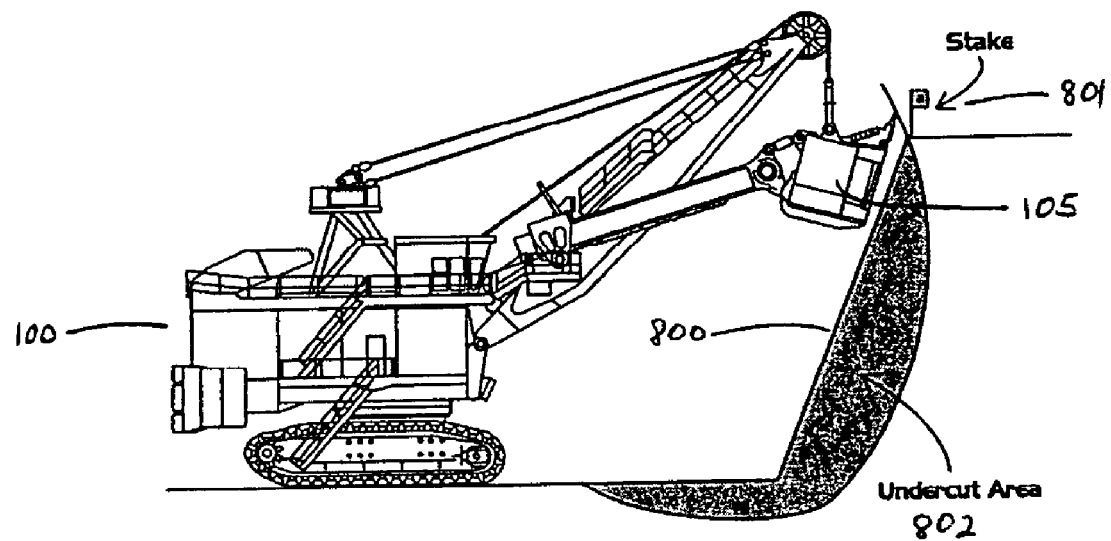
FIG. 8 is an illustration of how the natural digging motion of a shovel undercuts the highwall.

FIG. 8 is an illustration of how the natural digging motion of a shovel 100 undercuts 802 the highwall 800. Typically, after a bench in an open pit mine has been drilled and blasted, stakes 801 are placed in the ground as guides for the shovel operators. In most cases the shovel operators remove material from the highwall 800 face until the stakes 801 are reached. This method usually results in undercutting of the upper bench due to the operator's inability to accurately determine the proposed highwall limits. Shovel undercutting 802 is shown in this FIG. 8.

To reduce the amount of undercutting caused by shovel operation some mines use secondary blasts and smaller hydraulic shovels to make secondary cleanup passes on the highwall 800. This process allows for more accurate removal of material from the highwall 800, resulting in less shovel damage to the highwalls 800 and highwalls 800 that are mined closer to the planned dimensions. The drawback to this process is that it results in additional costs. The additional costs come from the required secondary drilling and blasting, using a less efficient shovel to remove muck, the loss of production time spent on the process, and the efficiency loss that results from the shovel operator slowing down to more carefully mine next to the highwall 800.

Another method of protecting highwalls 800 from shovel damage is the use of computer systems that display to the shovel operators the proposed mine layout and the shovel's current location relative to the layout. These systems eliminate the need for secondary blasting and cleanup passes while still allowing the shovel operator to achieve similar results. There are two drawbacks to this type of system: first, there is an efficiency loss that results when the shovel operator slows down to more carefully mine next to the highwall 800, and second, the accuracy is limited to the ability of the shovel operator to control the shovel 100.

Ideally an electric shovel would be capable of accurately removing the ore from next to a highwall 800 without requiring the shovel operators to alter their digging habits. This invention, the CCES, is capable of achieving this type of shovel activity, because it limits the shovel's 100 digging motion when the shovel 100 bucket 105 is in danger of intersecting the mine design limits. This means that the shovel operators can operate as if they are following stakes in the ground and the CCES will adjust the controls to ensure that the shovel 100 digs according to the mine plan.

The benefits of the CCES will be improved economy and safety in three different areas: Ore Recovery, Equipment Protection, and Mine Safety.

The end goal of all mining is the removal of ore from the earth and the processing of that ore into a commodity, which is the reason that ore recovery is so important to mining operations. The CCES allows a mine to increase ore recovery by increasing the angles of the highwalls or reducing the widths of benches.

Figure 9:
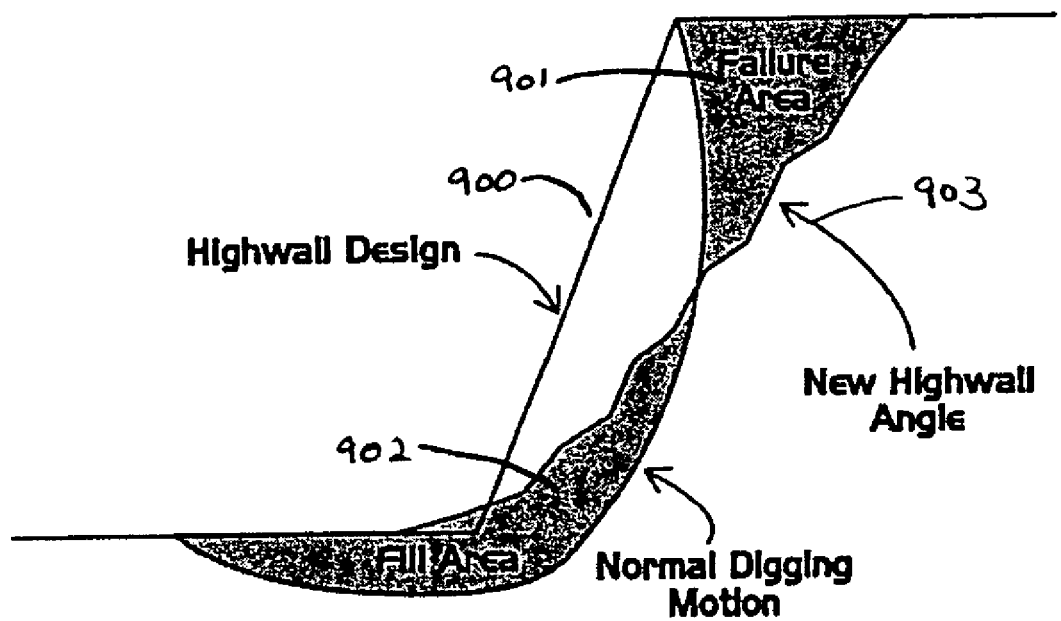
FIG. 9 is an illustration of highwall failure caused from shovel undercutting.

It may appear that traditional shovel operation will produce a steeper highwall angle than the operation with the CCES. In the short run this is correct. However, when a shovel digs the highwall at a steeper angle than the design, it is likely that the highwall will suffer a minor failure and end up being at a shallower angle than the design. FIG. 9 shows how part of the highwall 900 will fail 901 and fill in another area 902 resulting in a shallower highwall angle 903. Operation with this invention, the CCES, markedly decreases this type of failure.

Figure 10:
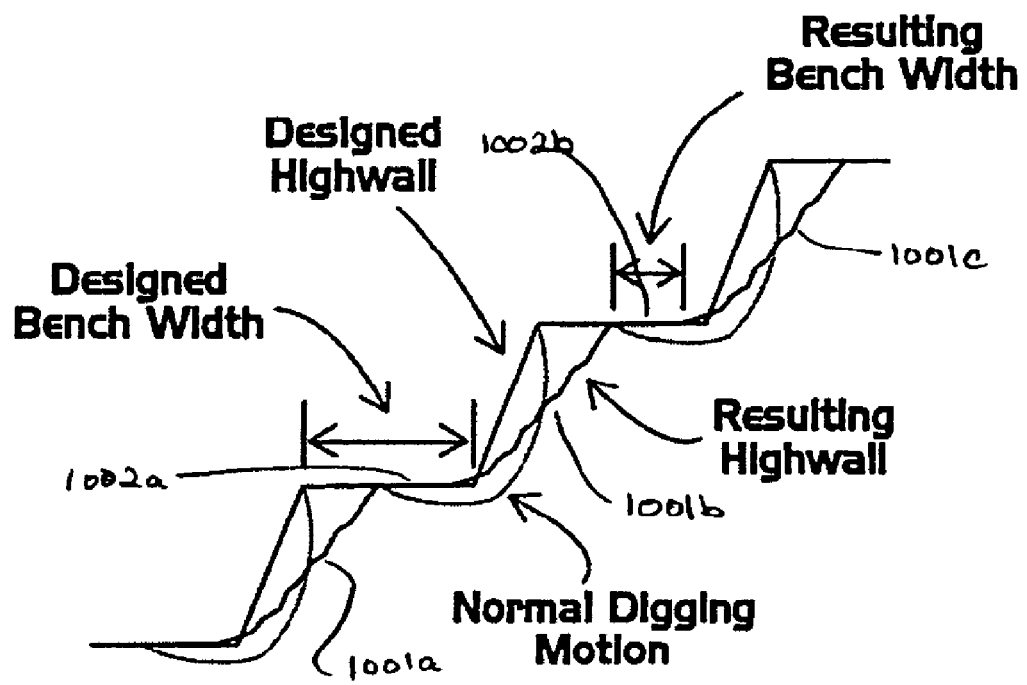
FIG. 10 is an illustration of how minor failures affect the highwall angle and bench size.
Figure 11:
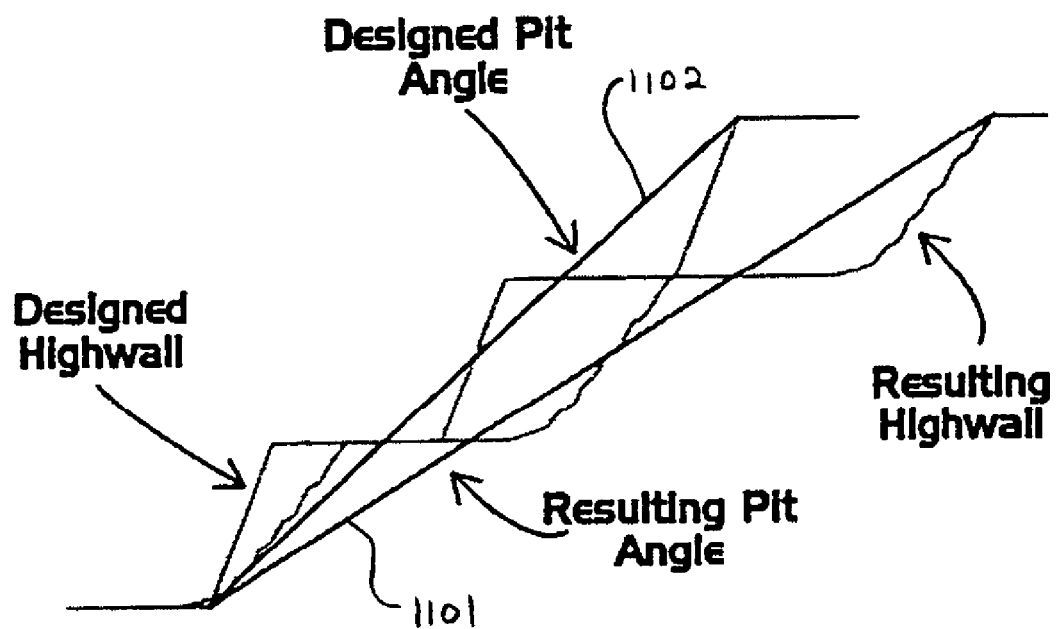
FIG. 11 is an illustration of how minor failures affect the overall pit angle.

Further, this invention, the CCES, helps reduce the bench widths in a mine by reducing the risk of a minor failure. When the highwall suffers a minor failure due to the traditional digging pattern of the shovel, part of the upper bench falls away while the lower bench is partially covered by the fallen material. This reduces the width of both benches; to maintain the designed bench widths the mine will have to dig wider benches to accommodate the displaced material. FIG. 10 shows how the minor failures 1001*a-c* caused by the traditional digging pattern of the shovel result in narrower benches 1002*a,b* and FIG. 11 shows how they can result in a shallower overall pit angle 1101 by showing how the designed pit angle 1102 is reduced by failures.

Blasting in an open pit mine is designed to minimize any damage to the highwall. Blast damage to the highwall loosens existing fractures and causes new fractures that weaken the highwall and make it more prone to failure. When a shovel 100 digs into this unblasted rock it causes excessive wear and tear on the shovel. By limiting the areas that the shovel can dig to the blasted rock, the CCES reduces the amount of wear and tear on the shovel 100.

Minor failures at the highwall crest caused by the natural digging motion of the shovel are not only a nuisance, they are dangerous. Damage to equipment and workers can range from minor to severe or fatal in even the smallest of failures. By constraining the shovel 100 to dig the highwalls according to the mine design the CCES will reduce the number of minor highwall failures and make the mine safer.

The bench width not only affects the stability of the highwall but also the safety of the mining environment below. The benches' function is to catch debris from minor failures and blasts that occur above. If a bench width is narrower than the design due to crest failure and sloughed material, then its capacity to catch debris is reduced. By helping to avoid failures at the crest and by producing clean benches the CCES will make the mine safer, by increasing the capacity of the benches to catch falling debris.

To protect the highwall from damage by the shovel, it is desirable for the invention, the CCES, to know the position and orientation of the shovel 100. The tracks of the crawler systems used on modern electric shovels must slip, to allow the machine to turn when being moved. Thus it is difficult if not impossible to absolutely determine the direction or distance the shovel 100 has traveled by measuring the number of rotations of the tracks, and the system used to calculate the shovel's position must be independent of the shovel's movement.

A global positioning system was chosen as the means of determining the shovel's 100 position because GPS is independent of the shovel's 100 movements, generally works in all weather, doesn't need to be readjusted periodically, and operates with the necessary accuracy.

The accuracy with which the location and orientation of the shovel are known will directly affect the ability of the CCES to protect the highwall from damage by the shovel 100. GPS accuracy depends on the number of satellites available for the receiver to calculate its position, the magnitudes of the errors involved, and the correction techniques used to compensate for errors. DGPS and RTK are systems that that can be used to increase the accuracy of the standard GPS system. The accuracies of standard and enhanced systems are discussed below.

Presently, standard GPS units work by using the C/A or P codes to determine the distances from the satellites to the GPS receiver. These distances, or pseudoranges, and are used to triangulate the position of the receiver. The receivers determine the distance from the satellite to the receiver by measuring the time delay between the equivalent chips on the satellite's code string and the receiver's replica. The standard GPS receivers using the C/A code have a theoretical accuracy of 3 meters (9.84 feet). The standard GPS receivers using the P code have a theoretical accuracy of 30 centimeters (11.81 inches). The actual accuracies of the C/A and P codes vary because the errors that affect the GPS signals and system vary by location and time. These errors reduce the accuracies of the codes to 12.1 meters (39.70 feet) and 6.5 meters (21.33 feet) for the C/A and P codes respectively.

DGPS stands for Differential (Relative) GPS. DGPS typically requires at least two receivers, set up at two stations. One station (called the base station) is usually set up at a stationary position, with known coordinates so that the coordinates of the other (mobile) receiver can be related to the position of the stationary receiver. The stationary receiver can then calculate Pseudorange Corrections (PRC) and Range Rate Corrections (RRC) by comparing its calculated position to its actual position. The PRC and RRC corrections can be used later to calculate the corrected position of the mobile receiver, or can be transmitted to the mobile receiver for real time corrected positioning. In DGPS systems, the corrections calculated at the base station can be used effectively by mobile receivers at distances up to 200 kilometers (124 miles). However, the accuracy of DGPS decreases as the distance from the base station to the mobile receiver increases. DGPS can offer an actual accuracy of 2 to 4 meters (6.56 to 13.12 feet).

Real-Time Kinematic (RTK) positioning currently uses the same concept as DGPS; however, while DGPS measures the pseudoranges using only the P or C/A codes, RTK uses carrier phase observations to further enhance the accuracy of the receiver. Carrier phase observation requires that the base station receiver be capable of receiving both the L1 and L2 signals. The base station then uses the differences between the L1 and L2 signal phases to calculate the kinematic solutions to the L1 signal. These corrections are then transmitted to the mobile receiver for real-time corrected positioning. RTK is effective when there is a good correlation between the atmospheric biases at the base station and the mobile receiver, and RTK is best suited for situations where the base station and the mobile receivers are within 20 kilometers (12.43 miles) of each other. RTK can supply the user with an actual accuracy of 1 centimeter (0.39 inches).

Presently, the information output by a GPS receiver is usually in the NMEA 0183 format, or a similar format based on NMEA 0183. The NMEA 0183 standard is a voluntary, industry standard for interfacing with marine electronic devices. The NMEA 0183 was first released in March of 1983 to define the electric signal requirements, data transmission protocol, timing and specific sentence formats for transmission of serial data at rates up to 38.4 K-baud.

The position data calculated by GPS receivers can be obtained from the receivers by actively requesting the information from the receiver or by passively waiting for the receiver to output the information on a predetermined time schedule.

Because of the active acquisition of the GPS data, this invention, the CCES, actively asks the GPS receivers for the location data. Using active acquisition allows the CCES to synchronize the receivers so that the data input from each receiver is from the same moment in time. This allows the CCES to be more accurate when the shovel 100 is rotating or moving.

The disadvantage to using active acquisition is that the CCES must typically be programmed to communicate with the GPS receivers. This means that the system can be incompatible with receivers for which it has not been programmed.

The passive acquisition of the GPS data means that the receiver automatically exports the location data to memory on the CCES. Passive acquisition allows the CCES to be compatible with a broader range of receivers because programming for communication with the receivers is not required.

The disadvantage to passive acquisition is that the receivers may not necessarily be synchronized. This can cause the location and orientation of the shovel 100 to be incorrect when the shovel is changing location or rotating. However, since shovels 100 do not usually change location or rotate while digging, so the magnitude of the error will typically be small due to the extremely short time differences that are likely.

GPS equipment capable of DGPS and RTK operation is available from several sources. However, the rough mining environment makes demands on electronic devices that only a few GPS manufacturers can meet. For the purpose of this disclosure an RTK-capable GPS system is reviewed for two the manufacturers described below.

Leica Geosystems is located in California and is the manufacturer of the Dozer 2000 mine equipment optimization system. Implementation of the CCES using Leica equipment will require the MC500 or the SR530 dual-frequency receiver for the base station. The MC500 is more rugged and better suited to harsh environments than the SR530. Therefore, the shovel will be equipped with three MC500 dual-frequency receivers. The MC500 and SR530 receivers require a 12-volt DC power supply, and do not need to be mounted near the receiving antenna. This allows these receivers to be mounted on the shovels with few or no modifications being made to the shovel.

A CCES comprising the Leica components above would be an RTK-based system capable of 1-centimeter (0.39-inch) accuracy. This system can update the shovel's location data 10 times per second with 50-millisecond latency. The update frequency and latency for this system are independent of whether the system is passive or active. Latency is the time required for the GPS unit to calculate its position after it has received the satellite signal. The base station uses a forward prediction of the corrections necessary for the mobile receivers, and can therefore supply the mobile receivers with real-time correction. The Leica receivers can export the location data in either the NMEA 0183 format or in OWI. OWI is a format proprietary to Leica. It is ASCII-based, similar to NMEA-0183, and primarily used at 9600 baud.

Trimble Navigation Ltd. is located in California and is partnered with Caterpillar in producing the CAESultra mine equipment optimization system. Using Trimble equipment the CCES will require one MS750 dual-frequency receiver for the base station and three MS750 dual-frequency receivers for the shovel. The MS750 receiver requires 12- or 24-volt DC power supply. This allows these receivers to be mounted on the shovel with few or no modifications being made to the shovel.

A CCES embodiment of the invention composed of the Trimble components described above would also be an RTK-based system capable of 1-centimeter (0.39-inch) accuracy. This system is capable of updating the location data 10 times per second with a 100-millisecond latency. Again, the update frequency and latency for this system are independent of whether the system is passive or active. The Trimble system can export the location data in NMEA 0183 format. The CCES can communicate with the MS750 receiver over an RS-232 connection, using Trimble's RS-232 Serial Interface Specifications. The RS-232 Serial Interface Specifications provide command packets and report packets for configuring the MS750 receiver and retrieving position and status information from the receiver.

In the present embodiment of the invention, the CCES requires that the design limits (mine data) of the protected area be input into the system; this is called the Mine Data Set. Future envisioned embodiments may allow for the automatic collection of mine data, using satellite or other digital data. The Mine Data Set consists of a series of triangles that define the design limit mesh. For a test of the CCES, the Mine Data Set was stored in an Excel file that was imported into the model as the Mine Data Test Set. The CCES Mine Data Test Set includes three design meshes that were configured to test the abilities of the CCES.

The CCES Mine Data Test Set establishes the definition of the CCES format; each row of the data set defines one triangle of the mesh and contains the X, Y, and Z locations for each of the three points and the normal values for the triangle. The normal values of the triangle are the X, Y, and Z values that define a vector that is perpendicular to the plane of the triangle. The normal values are included in the data to reduce the amount of processing that the CCES must do during operation.

In concept, the amount of data that can be input into the system is limited only by the amount of storage available. However, the greater the number of data points the longer it will take the system to test the mine limits for intersections during operation. In practice, the Mine Data Set can be obtained from various places, but will presently usually come from AutoCAD drawings and user surveys. The respective characteristics of a Mine Data Set obtained from AutoCAD or a user survey are discussed below.

Mine data obtained from AutoCAD will usually be taken from the mine plan, designed by a mining engineer at the mine. Using the mine plan data for the Mine Data Set will force the outline of the pit to conform to the mining engineer's specifications. This means that the mining engineer will have greater control over the final shape of the mine pit, the slope of the highwalls, and potentially, the grades of the haulage roads.

The drawback to this is that the drilling and blasting will have to be done more precisely, to ensure that the resulting highwall conforms to the design. For the blasting to be successful the rock that will be mined must be sufficiently fragmented to protect the shovel from damage, while the rock that makes up the highwall must be sufficiently protected from the blast to insure that the highwall will be stable.

Mine Data obtained from user surveys will come from actual surveys conducted in the field by the surveying crew, or from data obtained by the drill rig. When survey data are used for the Mine Data Set, the final pit dimensions in the Mine Data Set will be determined by the actual results of drilling and blasting the pit walls. This means that the outline of the pit in the Mine Data Set will be more reflective of actual practice, and probably less like the mine plan. The benefit of using actual survey data for the Mine Data Set is that it will help protect the shovel from being damaged by un-blasted rock and at the same time create a highwall that should be free from damage by the blast. This is will occur because the survey points used in the mine data will be taken according to the drill holes or rock damaged by the blast and not by the mine plan.

The Mine Data Set can be acquired and input into the CCES in different ways, depending on the source of the data. If the data are imported from AutoCAD, they will be extracted from the AutoCAD file and put into a specific format using a Lisp routine before they are imported by the CCES. If the data are imported from a user survey, they will be imported from the survey equipment or input by hand. These data may also require conversion to a specific format before they can be imported by this invention, the CCES.

Lisp routines are small programs or routines that are run by AutoCAD, and can be built to perform a wide variety of possible tasks within AutoCAD. The Lisp routine needed to extract the mine data information will need to perform the following tasks; identify the lines that represent the desired information; locate the sections of the lines that are within a certain range of the shovel; extract the X, Y, and Z locations for the points that make up the line sections; format the information into the CCES format; and export the information to the import file for the CCES.

The Lisp routine for each mine will probably differ, depending on which data are to be extracted and how the data are stored in the mine's AutoCAD system. This means that the Lisp routine at each mine will most likely need to be customized for that particular mine.

When the Mine Data Set is derived from user surveys, it is generally necessary to import those data from the survey equipment or enter them by hand into a spreadsheet program. The data will then be exported to an input file for the present CCES. With either method, the data will first be imported or entered into a spreadsheet program and then exported. The process is extremely flexible and can be the same at every mine site. The only requirement is that the spreadsheet program used by the mine is able to format and export the data to a comma-, tab-, or character-delimited file that can be imported by the CCES. The disadvantage to using user input files is that their construction can be time-consuming and prone to human errors.

The import format used by the CCES contains the X, Y, and Z locations of the three corners and the normal values for each triangle in the design limit mesh. The import file for the actual system will need to be in a comma-, tab-, or character-delimited format depending on the final system design. Since most of the data that is available from AutoCAD or user surveys will consist of a group of points rather than a set of polygons, the Lisp routine or a separate program is presently used to transform the data points into triangles and calculate the normal values of the triangles. If this is not possible then the user will have to do the conversion manually.

To keep the database-from becoming too large, it is regularly maintained to insure that outdated and un-needed data is deleted.

The present CCES embodiment of the invention is designed to perform up to 20 shovel-limit calculations per second. The high frequency of the CCES works best with a Mine Date Set that is maintained so that the necessary data points are stored in the system. The easiest way to maintain the data in the CCES is to store the data outside the system, and overwrite all of the data in the system each time new data are imported.

The computer speed of the CCES and the number of data points stored per meter of highwall determines the maximum length of highwall that can be described by the data stored on the system. Therefore it is preferable for each mine to determine the maximum number of highwall data points that can be stored on the CCES at its site.

Figure 12:
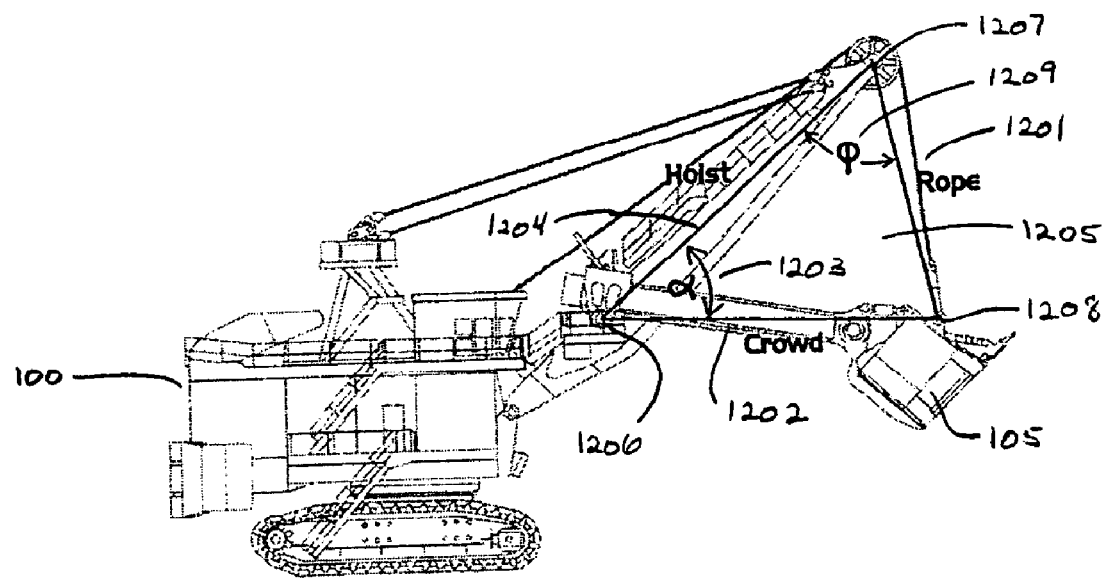
FIG. 12 is an illustration of triangle defined by the hoist, rope and crowd.

The Local Location and Orientation Calculations determine the local location and orientation of the bucket 105 in order to calculate the local location of the key bucket points. The key bucket points are points on the bucket 105 that define the edges of the bucket 105 that are tested for intersections with the mine design mesh. The location of the bucket 105 relative to the shovel is constantly changing as the shovel 101 moves through its digging cycle. The constant movement of the bucket 105 means that the location of the bucket 105 cannot be measured at the time the system is set up, and must therefore be calculated during the operation of the system. As shown in FIG. 12, there are two known values that change as the shovel 100 digs, the rope length 1201 and crowd 1202, both of which are controlled by the operator. The location of the bucket can be found by knowing the crowd length 1202 and the angle 1203 of the crowd, which is determined by the rope length 1201. The rope 1201, crowd 1202, and boom lengths 1204 define a triangle 1295 that can be used to determine the angle 1203 of the crowd through the use of the SSS theorem and the law of cosines as shown in FIG. 12.

Figure 13:
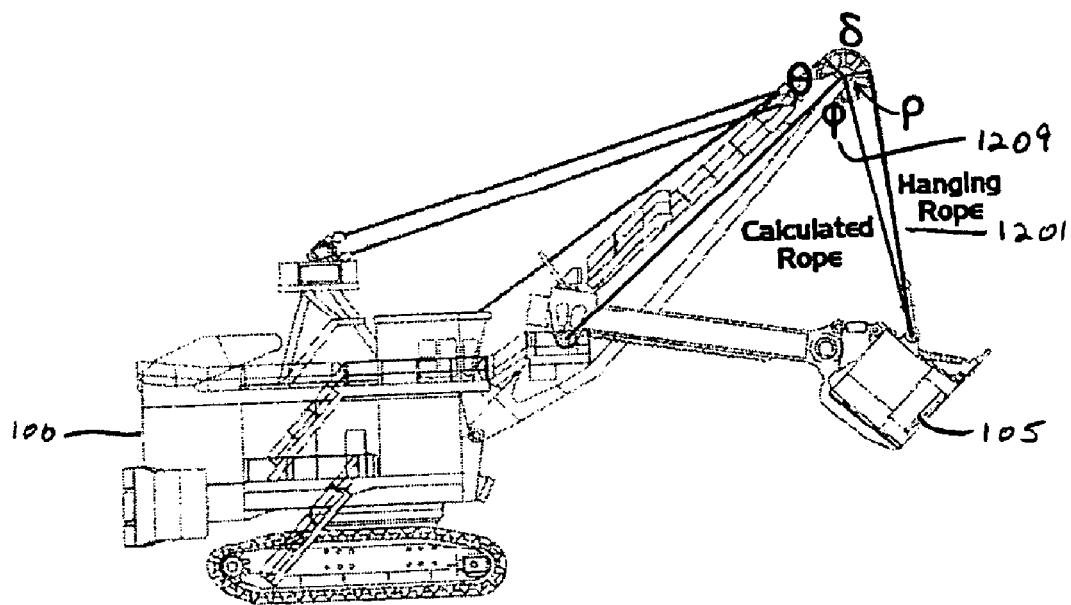
FIG. 13 is an illustration of the interactions among rope values and the angles around the boom point sheave.

To define the triangle 1205 it is necessary to know the angle 1203 of the crowd and the three corners 1206, 1207, 1208 of the triangle 1205 should be defined. The first 1206 and second 1207 points are the respective centers of the crowd pivot and the boom point sheave. The third point 1208 of the triangle 1205 will be a location on the bucket 105. The distance from the center of the crowd pivot 1206 to the center of the boom point 1207 sheave (hoist length) is a fixed distance and can be entered during the setup of the CCES of this invention. The distance from the center of the crowd pivot1206 to the bucket point 1208 (calculated crowd length) is determined by the current length of the crowd 1202 and by using straightforward trigonometric calculations. The distance from the center of the boom point 1207 sheave to the bucket point 1208 (calculated rope length 1201) is determined by the rope length 1201 and by the angle 1209 at the boom point sheave (φ). However, the angle φ 1209 is determined by the calculated rope length 1201 as shown in FIG. 13. This means that there is no direct way of knowing the distance and the angle because both are unknowns and the calculation of one requires that the other be known. The presently preferred way to determine both parameters is to use an iterative approach.

The iterative approach uses a best guess as one of the parameters and then calculates the other parameter based on that guess. This calculated answer is then used to calculate a new value for the parameter that was guessed. This process of using one parameter to calculate for the other and then repeating the process for the first parameter is repeated until the values stop changing. It was found that at least six iterations were required to obtain a calculated rope length value that changed by less than 3-millimeters (0.001-feet) from one iteration to the next. The calculations to determine the minimum number of iterations are discussed later in the chapter.

The Local Bucket Location and Orientation Calculations can be broken up into three parts: Crowd Length Calculations, Rope Length Calculations, and Bucket Location Calculations. The Crowd Length Calculations can be calculated from known values and is preferably completed before the Rope Length Calculations can be done. The calculated crowd length and calculated rope length are preferably both known before the Bucket Location Calculations can be done.

Figure 14:
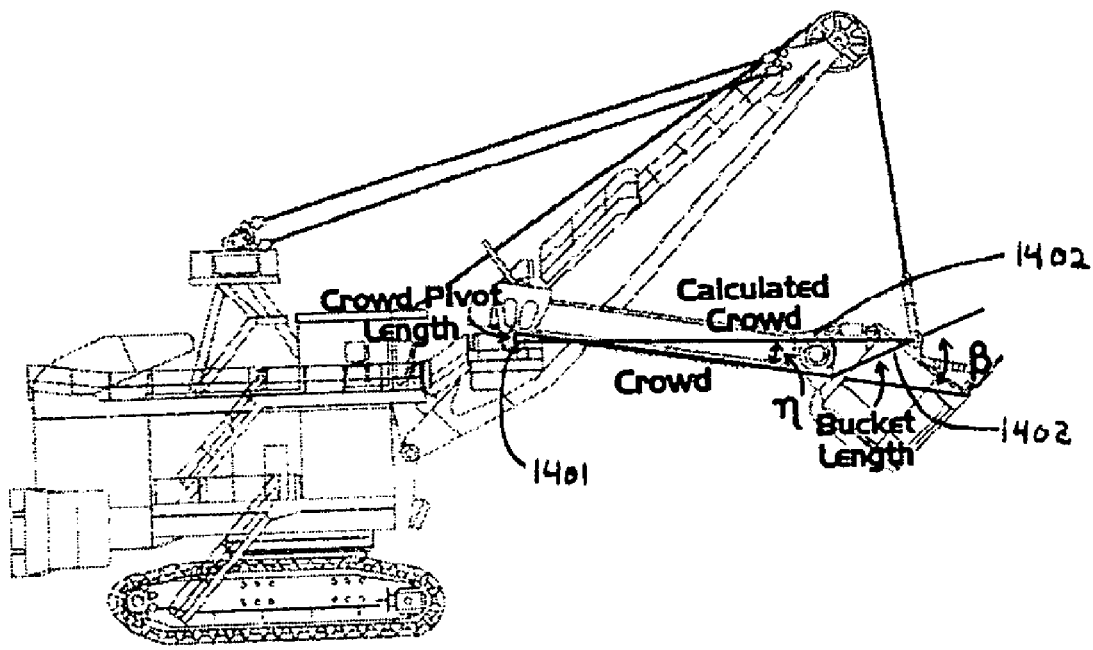
FIG. 14 is an illustration of the crowd length calculation values.

The calculated crowd length is composed of a number of smaller distances. As shown in FIG. 14 the distance includes the crowd pivot distance 1401, the crowd length 1402, and the bucket length 1403 (along the axis of the crowd arm). The present calculations to convert these distances into one distance are as follows:
  a) Retrieve the setup values needed for the calculations;
  b) Calculate the x distance of the bucket length;
  c) Calculate the y distance of the bucket length;
  d) Calculate the total x distance from the crowd pivot to the bucket point;
  e) Calculate the total y distance from the crowd pivot to the bucket point;
  f) Calculate the distance from the crowd pivot to the bucket point using the Pythagorean Theorem; and
  g) Calculate the inter-crowd angle η, for use later.

Figure 15:
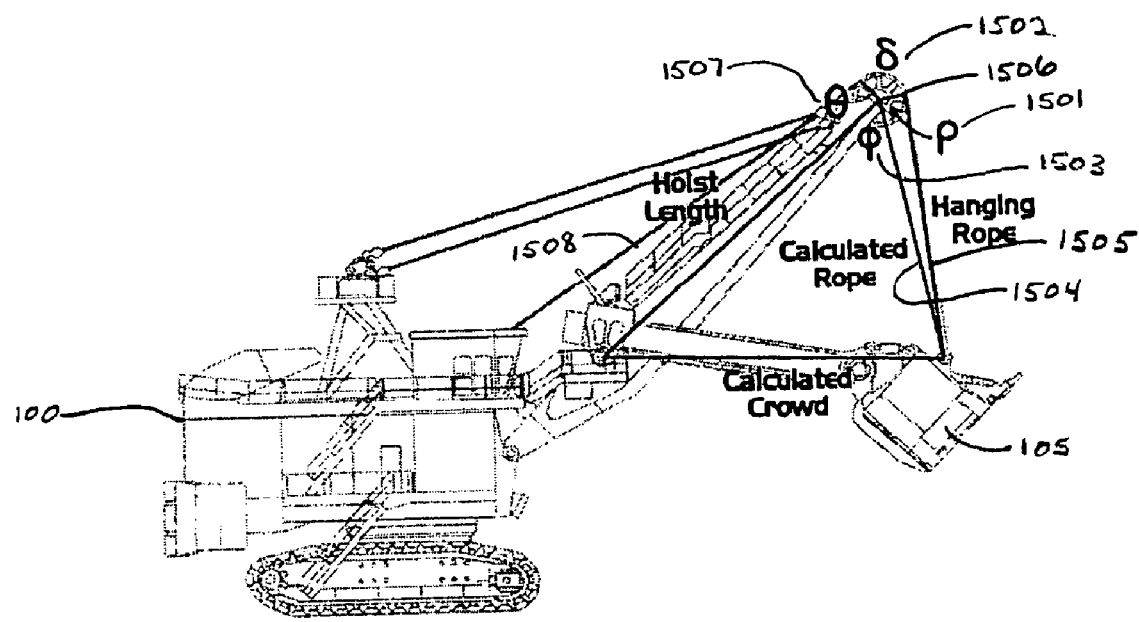
FIG. 15 is an illustration of the rope length calculation values.

The iterative Rope Length Calculations, as illustrated in FIG. 15, refine five values during each iteration: ρ 1501, δ 1502, φ 1503, the calculated rope length 1504, and the hanging rope length 1505. The angle ρ 1501 is the angle between the calculated rope length 1504 and the point where the rope leaves the boom point sheave 1506. The angle δ 1502 is the angle that corresponds to the amount of rope that is wrapped around the boom point sheave 1506. With the angles ρ 1501, δ 1502, and φ 1503, the values for the hanging rope length 1505 and the calculated rope length 1504 can be determined.

Figure 16:
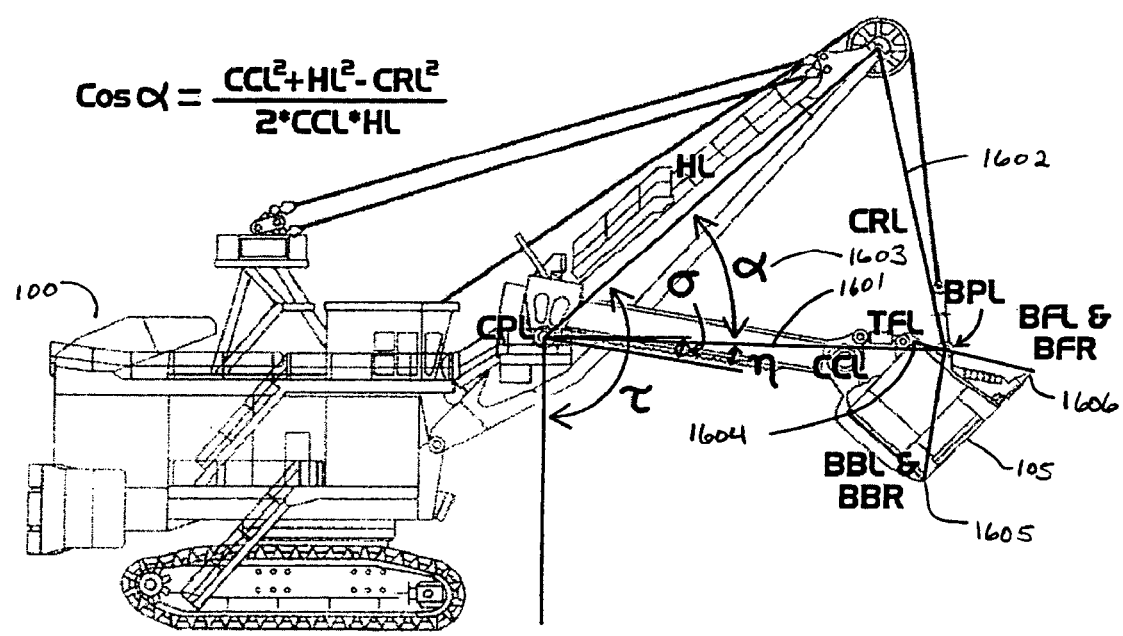
FIG. 16 is an illustration of local bucket calculations.

The interaction among the angle ρ 1501, the angle δ 1502, the angle φ 1503, the calculated rope length 1504, and the hanging rope length 1505 is shown in FIG. 15. Also shown in FIG. 15 is the angle θ 1507. The angle θ 1507 is the angle between the top of the hoist 1508 and the rope 1504. The angle θ 1507 remains constant during the operation of the shovel 100 and can be measured during the setup of the shovel 100. A description of the calculations is as follows:
  a) Retrieve the values required for the calculations, namely, Boom Point Sheave Radius, Total Rope Length, Hoist Length, and θ;
  b) Estimate a guess for the amount of hanging rope;
  c) Iterations:
    i) Calculate the calculated rope length;
    ii) Calculate ρ;
    iii) Calculate φ;
    iv) Calculate δ; and
    v) Calculate the hanging rope length.
  d) Calculate the final calculated rope length As shown in FIG. 16, once the calculated crowd length 1601 and calculated rope length 1602 are known, the angle 1603 of the crowd can be calculated. Knowing the angle 1603 of the crowd and the length 1601 of the crowd we can calculate the location of the key bucket points 1604, 1605, 1606 relative to the origin of the shovel 100. The Bucket 105 Location Calculations are as follows:
  a) Retrieve the values required for the calculations;
  b) Calculate α;
  c) Calculate σ;
  d) Calculate the bucket point location; and
  e) Calculate the local location of the key bucket points.

An error margin of less than 3 millimeters (0.01 feet) has been selected to insure that the error in the calculated rope length would be less than any probable setup measurement errors. To achieve this level of accuracy the calculations must be iterated at least six times. This number was determined by running an experiment in an Excel spreadsheet.

An Excel spreadsheet has been set up in a way that rope length calculation setup variables were in the top rows with the iterations in the rows below so that each column could have its own rope and crowd lengths. The setup variables in the experiment were as follows:

| | |
|---|---|
| A) 95-degrees | |
| B) Hoist Length | 14.90-meters |
| C) Hoist Radius | 1.15-meters |
| D) Calculated Crowd Length | Varied, 7.55-13.89-meters |
| E) Total Rope Length | Varied, 6.62-23.51-meters |
| F) Hanging Rope Length Guess | Varied, 3.79-20.69-meters |

The calculated crowd length and total rope lengths were varied between their respective minimum and maximum lengths. Table 1 specifies combinations of calculated crowd and total rope lengths that were tried. Combinations were omitted where rope and crowd length combinations were not physically possible:

TABLE 1

Crowd and rope length combination values that were used to test for the minimum number of iterations required

| | | Rope (meters) | | | | |
|---|---|---|---|---|---|---|
| | | 6.6 (Min) | 10.8 (25%) | 15.1 (50%) | 19.3 (75%) | 23.5 (Max) |
| Crowd (meters) | 7.6 (Min) | | | X | X | X |
| | 9.1 (25%) | | X | X | X | X |
| | 10.7 (50%) | | X | X | X | X |

TABLE 1-continued

Crowd and rope length combination values that were used to test for the minimum number of iterations required

| | Rope (meters) | | | | |
|---|---|---|---|---|---|
| | 6.6 (Min) | 10.8 (25%) | 15.1 (50%) | 19.3 (75%) | 23.5 (Max) |
| 12.3 (75%) | X | X | X | X | X |
| 13.9 (Max) | X | X | X | X | X |

The guess for the hanging rope length was set to be the amount of rope equal to the length of rope wrapped around 141 degrees of the boom point sheave. The angle of 141 degrees was chosen because it is the midpoint of the minimum and maximum values for the angle $\delta$ that were seen during the experiment.

The minimum number of iterations that were required for each of the different combinations that was tested ranged between three and six. A combination was deemed to have reached its minimum number of iterations when the calculated rope length changed by less than $1/100^{th}$ of a foot. Table 2 is a table of the results for each of the combinations that were tested.

TABLE 2

Minimum number of iterations required for each crowd and rope length combination

| | | Rope (meters) | | | | |
|---|---|---|---|---|---|---|
| | | 6.6 (Min) | 10.8 (25%) | 15.1 (50%) | 19.3 (75%) | 23.5 (Max) |
| Crowd (meters) | 7.6 (Min) | | | 4 | 4 | 4 |
| | 9.1 (25%) | | 4 | 3 | 3 | 4 |
| | 10.7 (50%) | | 3 | 3 | 3 | 4 |
| | 12.3 (75%) | 6 | 4 | 4 | 4 | 3 |
| | 13.9 (Max) | 5 | 3 | 4 | 4 | 4 |

Errors in the local locations of the key bucket points can be caused by bad measurements during the setup process or equipment errors during system operation. Correctly measuring the distances between the known points increases the system accuracy. If the measurements are incorrect then the system will be proportionally incorrect. While errors in these measurements will affect the system proportionally, the low probability of large errors means that the accuracy of the system should not be affected significantly.

The system depends upon electrical equipment to measure the locations of the hoist rope and the crowd. The accuracies of these devices will have the same affect on the accuracy of the system as the setup measurements. However, the accuracies of these devices are more of a concern than the setup measurements because they will likely decrease over time as the system is used. All measuring instruments require periodic maintenance and calibration. It will be necessary to determine those requirements for the instruments in this application during the first field test.

Earlier in the chapter a description of the calculations and their functions was given. Below are the mathematical formulas for the calculations described earlier.

Figure 17:
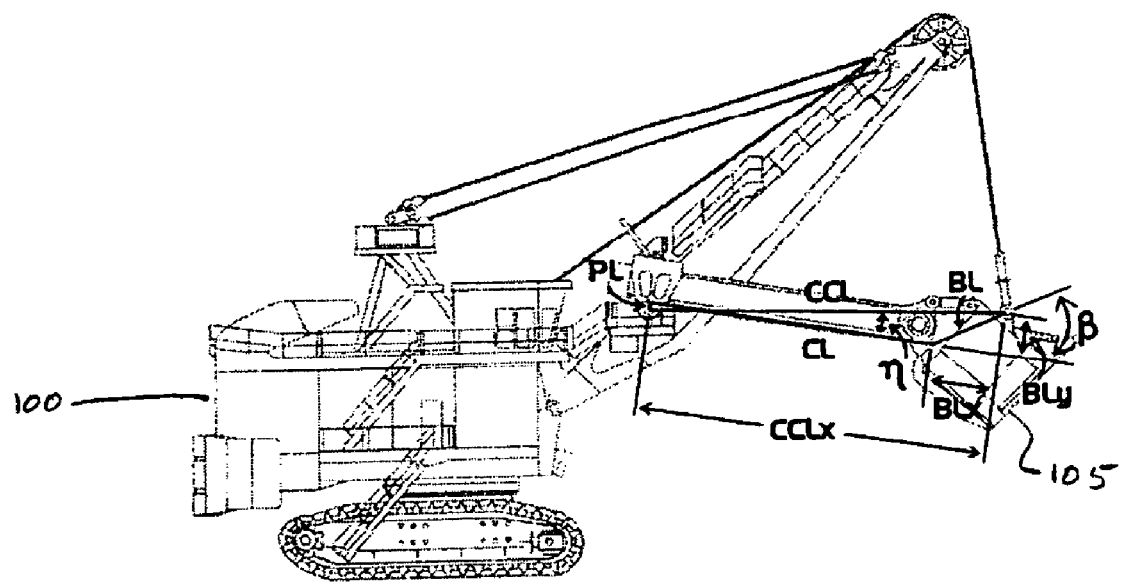
FIG. 17 is an illustration of the mathematical values used in the crowd length calculations.

The calculated crowd length is composed of three smaller lengths that are at angles to each other. Below are the calculations presently used to calculate the calculated crowd length:
 a) Retrieve the setup values needed for the calculations; namely, Bucket Length (BL), Bucket Angle ($\beta$), Crowd Length (CL), and Crowd Pivot Length (PL);
 b) $BL_x = BL \cos(\beta)$;
 c) $BL_y = BL \sin(\beta)$;
 d) $CCL_x = BL_x + CL$;
 e) $CCL_y = BL_y + PL$;
 f) $CCL = \sqrt{(CCL_x^2 + CCL_y^2)}$;
 g) $\eta = \tan^{-1}(CCL_y/CCL_x)$ FIG. 17 is an illustration of the mathematical values used in the crowd length calculations.

Figure 18:
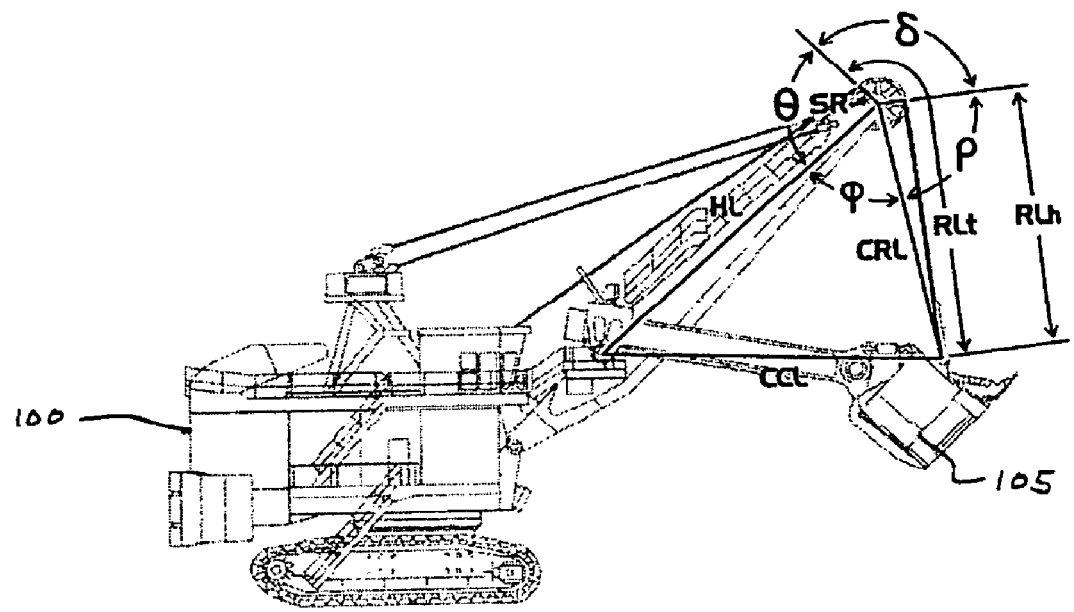
FIG. 18 is an illustration of the mathematical values used in the rope length calculations.

FIG. 18 is an illustration of the mathematical values used in the rope length calculations. The iterative Rope Length Calculations go through a series of trigonometric and mathematical functions to refine a series of values so that they can be used to calculate a final rope length. Below are the trigonometric and mathematical functions used to determine the calculated rope length:
 a) Retrieve the values required for the calculations; namely, Boom Point Sheave Radius (SR), Total Rope Length ($RL_t$), Hoist Length (HL), and $\theta$;
 b) $RL_h = RL_t - ((141/180)*\pi*SR)$;
 c) Iterations:
  i) $CRL = \sqrt{(RL_h^2 + SR^2)}$;
  ii) $\rho = \tan^{-1}(RL_h/SR)$;
  iii) $\phi = \cos^{-1}((CRL^2 + HL^2 + CCL^2)/(2*CRL*HL))$;
  iv) $\delta = 360 - (\theta + \rho + \phi)$; and
  v) $R_h = R_t - ((\delta/180)*\pi*SR)$.
 d) $CRL = \sqrt{(RL_h^2 + SR^2)}$.

Figure 19:
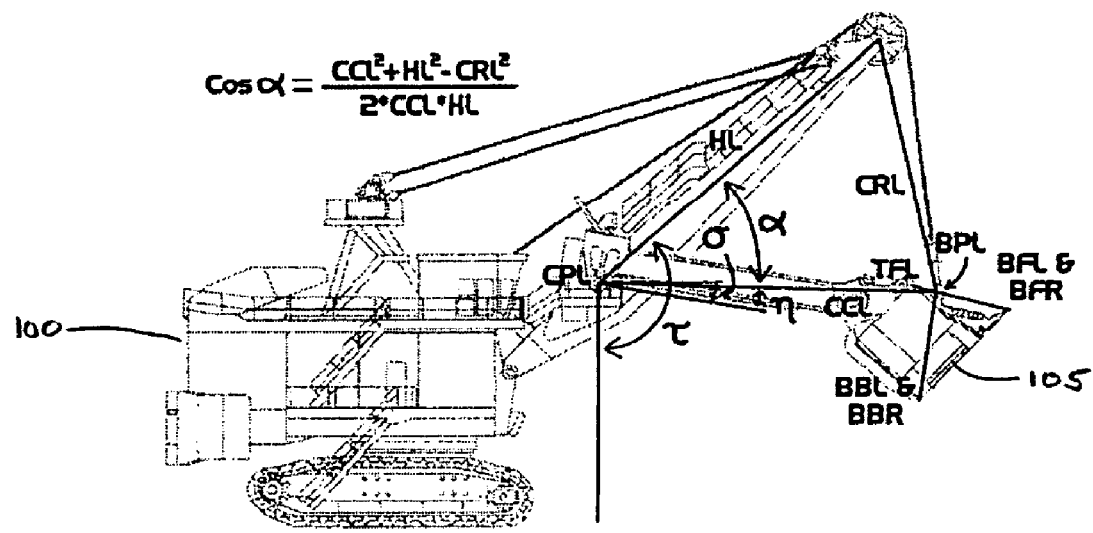
FIG. 19 is an illustration of the mathematical values used in the bucket location calculations.

FIG. 19 is an illustration of the mathematical values used in the bucket location calculations. Once the calculated crowd length and calculated rope length are known, then the angle between the hoist boom and crowd ($\alpha$) can be calculated using the SSS theorem. Subtracting $\alpha$ and the inter-crowd angle ($\eta$) from the angle of the hoist boom we can get the angle of the crowd ($\sigma$). Knowing the angle of the crowd and the length of the crowd we can calculate the location of the bucket and key bucket points relative to the origin of the shovel. The trigonometric and mathematical functions for the Bucket Location Calculations are below:
 a) Retrieve the values required for the calculations; namely, Hoist Boom Angle ($\tau$), Initial Crowd Point Location (CPL), Bucket Point Offset (BPO), and the Key Bucket Point Locations (BBLb, BBRb, BFLb, BFRb, TFLb);
  i) BBL=Bottom Back Left;
  ii) BBR=Bottom Back Right;
  iii) BFL=Bottom Front Left;
  iv) BFR=Bottom Front Right; and
  v) TFL=Top Front Left.
 b) $\alpha = \cos^{-1}((CCL^2 + HL^2 + CRL^2)/(2*CCL*HL))$;
 c) $\sigma = \tau - \alpha - 90 - \eta$;
 d) Calculate the bucket point location:
  i) $BPL_x = CPL_x + (CCL*\cos(\sigma))$;
  ii) $BPL_y = CPL_y$; and
  iii) $BPL_z = CPL_z + (CCL*\sin(\sigma))$.
 e) Calculate the local location of the key bucket points:
  i) $BBL_x = BPL_x + BPO_x + BBLb_x$;
  ii) $BBL_y = BPL_y + BPO_y + BBLb_y$;
  iii) $BBL_z = BPL_z + BPO_z + BBLb_z$;
  iv) $BBR_x = BPL_x + BPO_x + BBRb_x$;

v) $BBR_y=BPL_y+BPO_y+BBRb_y$;
vi) $BBR_z=BPL_z+BPO_z+BBRb_z$;
vii) $BFL_x=BPL_x+BPO_x+BFLb_x$;
viii) $BFL_y=BPL_y+BPO_y+BFLb_y$;
ix) $BFL_z=BPL_z+BPO_z+BFLb_z$;
x) $BFR_x=BPL_x+BPO_x+BFRb_x$;
xi) $BFR_y=BPL_y+BPO_y+BFRb_y$;
xii) $BFR_z=BPL_z+BPO_z+BFRb_z$;
xiii) $TFL_x=BPL_x+BPO_x+TFLb_x$;
xiv) $TFL_y=BPL_y+BPO_y+TFLb_y$; and
xv) $TFL_z=BPL_z+BPO_z+TFLb_z$.

Once the local (shovel-specific) locations and orientations for the key points on the bucket are known then their global locations can be calculated. The key bucket points are points on the bucket that define the edges on the bucket that are tested for intersections. To test the bucket edges for intersections with the mine design mesh the global locations of these points must be known. Two approaches were tested for calculating the global locations of these points; the matrix approach worked and the trigonometric approach did not.

It was initially believed that the most straightforward approach to finding the location and orientation of an object in space would be to use trigonometry. In the preparation of this thesis, the author spoke to several experts, all of whom recommended the trigonometric approach.

The trigonometric approach proposes the use of basic trigonometric functions, combined with the global and local locations of the GPS units, to calculate the global location and orientation of the shovel. The concept behind the trigonometric approach is to calculate the global X, Y, and Z rotations of the shovel by adjusting a set of global rotations, using a set of local rotations. Both of the latter two rotation sets are calculated from GPS units. The individual steps of the approach are as follows:

a) Calculate the initial offset of GPS unit 1 from the origin of the shovel (The shovel origin is an arbitrary point on the shovel that is chosen to represent the origin (0, 0, 0) of the shovel in local coordinates.);
b) Calculate the local rotations of the GPS units;
   i) Steps 1 and 2 are done only at the time of setup; and
   ii) The local rotations have now been calculated.
c) Translate all the GPS units so that GPS unit 1 is at the global origin;
d) Using GPS units 1 and 2 calculate the z rotation;
e) Rotate all the GPS units about the z axis by the calculated z rotation;
f) Using GPS units 1 and 2 calculate the y rotation;
g) Rotate all the GPS units about the y axis by the calculated y rotation;
h) Using GPS units 1 and 3 calculate the x rotation (the global rotations have now been calculated);
i) Translate GPS unit 1 so that it is at the global origin;
j) Translate all of the GPS 1 by the initial offset calculated in step 1;
k) Rotate GPS unit 1 about the z axis by the difference between the global and local z rotation (the shovel's rotation is the difference between the global and local rotations);
l) Rotate GPS unit 1 about the y axis by the difference between the global and local y rotation (the shovel's rotation is the difference between the global and local rotations);
m) Rotate GPS unit 1 about the x axis by the difference between the global and local x rotation (the shovel's rotation is the difference between the global and local rotations); and
n) Translate GPS unit 1 by the inverse of the values used in step 9;
   i) The final location of GPS unit 1 is the location of the origin of the shovel; and
   ii) Steps 3 through 14 are repeated each time the shovel location and orientation need to be recalculated.

In development of the present invention, a significant amount of time was devoted to applying a trigonometric approach to the location and calculation objective, but with little success. It was found that, with some rotation adjustments and proper placement of the GPS units, the trigonometric approach can accurately calculate the location and orientation of the shovel, as long as the shovel is rotating around only one axis at a time. However, the trigonometric approach breaks down when the shovel begins to rotate around more than one axis at a time, due to the sign changes that occur in the rotation values as the shovel moves through the trigonometric octants. Despite a considerable effort, no practical way was found for compensating for this problem. Thus the trigonometric approach does not appear to work when the shovel 100 is allowed to rotate upon all three axes and the GPS units are allowed to be placed at any location on the shovel 100. This same problem is encountered in standard robotic control systems.

The matrix approach uses vectors and matrix transforms to calculate the global locations of the key points on the bucket. Compared to the trigonometric approach this approach is abstract. This abstractness allows the method to avoid the problems associated with the trigonometric method.

The matrix approach uses the global and local locations of the GPS units to define global and local abstract coordinate systems. Conversion constants can be calculated for the shovel origin and each of the key bucket points based on their local locations and the local abstract coordinate system. The global location of the shovel origin and key bucket points can be found by using the conversion constants. The conversion constants are the dot products of the vector from GPS unit 1 to the key bucket points and the axes of the local abstract coordinate system.

The matrix approach is divided into two sets of calculations. The first set of calculations is done when the system is set up. It is used to determine the GPS local locations and a set of constants that will be used to determine the global shovel location. The second set of calculations is done repeatedly when the shovel is in operation, and is used to determine the actual global location of the shovel and the key bucket points.

There are many points or locations used in the following calculations and it is important to understand the naming conventions used. Vectors are named by combining the letters from the points that define the vector. For instance the vector between point A and point C is named AC. All global vectors and points have a lower case "g" at the ends of their names. Listed below are the names and descriptions of all of the points and vectors used in the calculations:

| | | |
|---|---|---|
| A | Point | Location of GPS unit 1 |
| B | Point | Location of GPS unit 2 |
| C | Point | Location of GPS unit 3 |
| R | Point | Origin of the shovel |
| BBL | Point | Bottom back left corner of the bucket |
| BBR | Point | Bottom back right corner of the bucket |
| BFL | Point | Bottom front left corner of the bucket |
| BFR | Point | Bottom front right corner of the bucket |
| TFL | Point | Top front left corner of the bucket |
| AB | Vector | Between point A and point B |
| AC | Vector | Between point A and point C |

-continued

| | | |
|---|---|---|
| N1 | Vector | Normal of vectors AB and AC |
| N2 | Vector | Normal of vectors AB and N1 |
| AR | Vector | Vector between point A and point R |
| ABBL | Vector | Vector between point A and point BBL |
| ABBR | Vector | Vector between point A and point BBR |
| ABFL | Vector | Vector between point A and point BFL |
| ABFR | Vector | Vector between point A and point BFR |
| ATFL | Vector | Vector between point A and point TFL |

Figure 20:
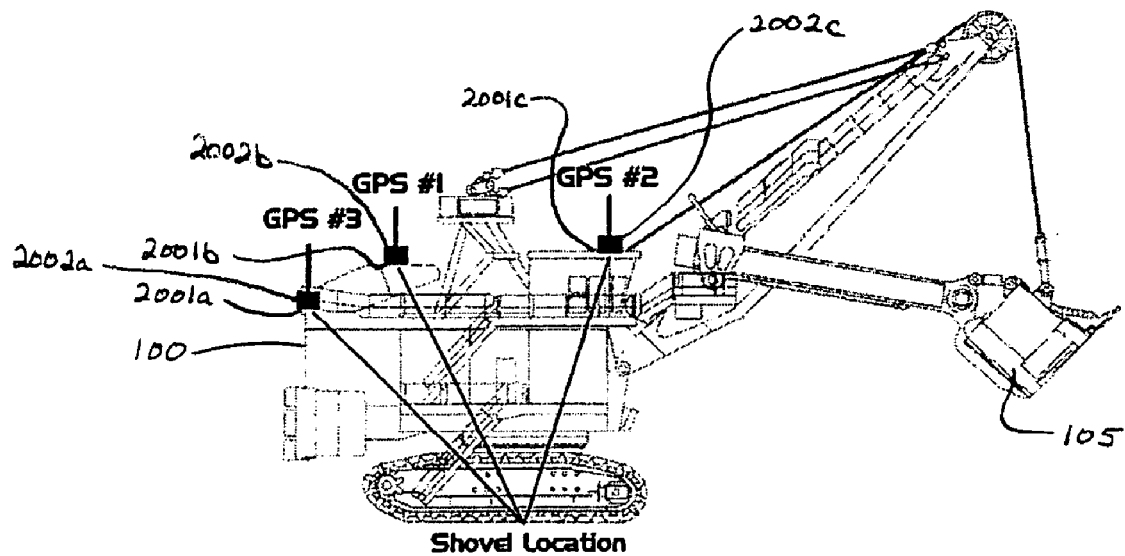
FIG. 20 is an illustration of the local locations of the GPS units.

FIG. 20 is an illustration of the local locations of the GPS units. The local locations 2001a,b,c of the GPS units 2002a, b,c and the constants for the shovel 100 origin are calculated at the time the system is set up, to reduce the number of calculations that must be done when the system is running. The Setup Calculation steps are as follows:

a) Calculate local locations of the GPS units in three dimensions, relative to the shovel location as shown in FIG. 20.

b) Construct the local abstract coordinate system:
   i) Use the local locations of GPS Unit 1 and 3 to calculate the vector AC;
   ii) Use the local locations of GPS Unit 1 and 2 to calculate the vector AB;
   iii) Make AB a unit vector;
   iv) Obtain N1 by crossing AB with AC;
   v) Make N1 a unit vector; and
   vi) Obtain N2 by crossing AB with N1.

c) Calculate the constants for the shovel;
   i) Use the local locations of the shovel origin and GPS unit 1 to calculate the vector AR; and
   ii) Calculate the constants for the shovel.

Figure 21:
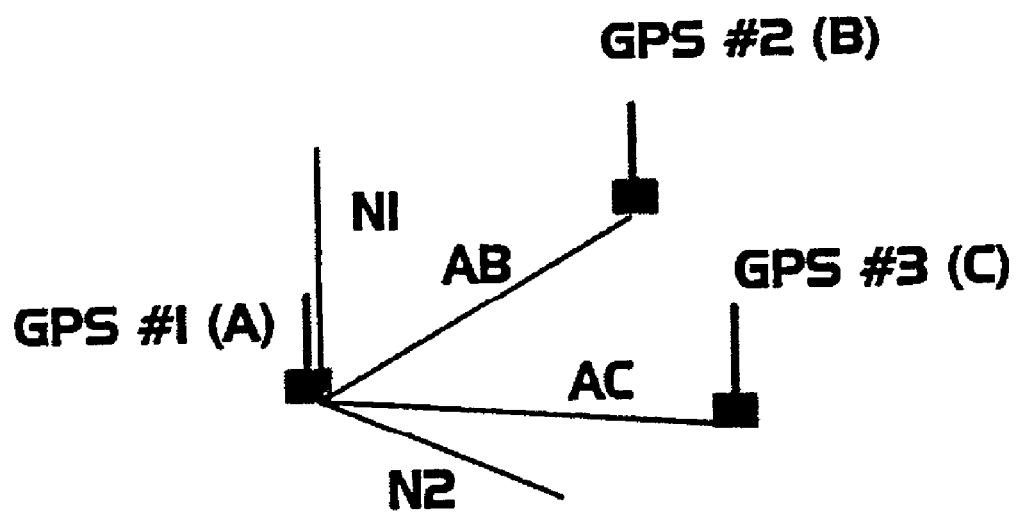
FIG. 21 is an illustration of the abstract coordinate system relative to the GPS units.
Figure 22:
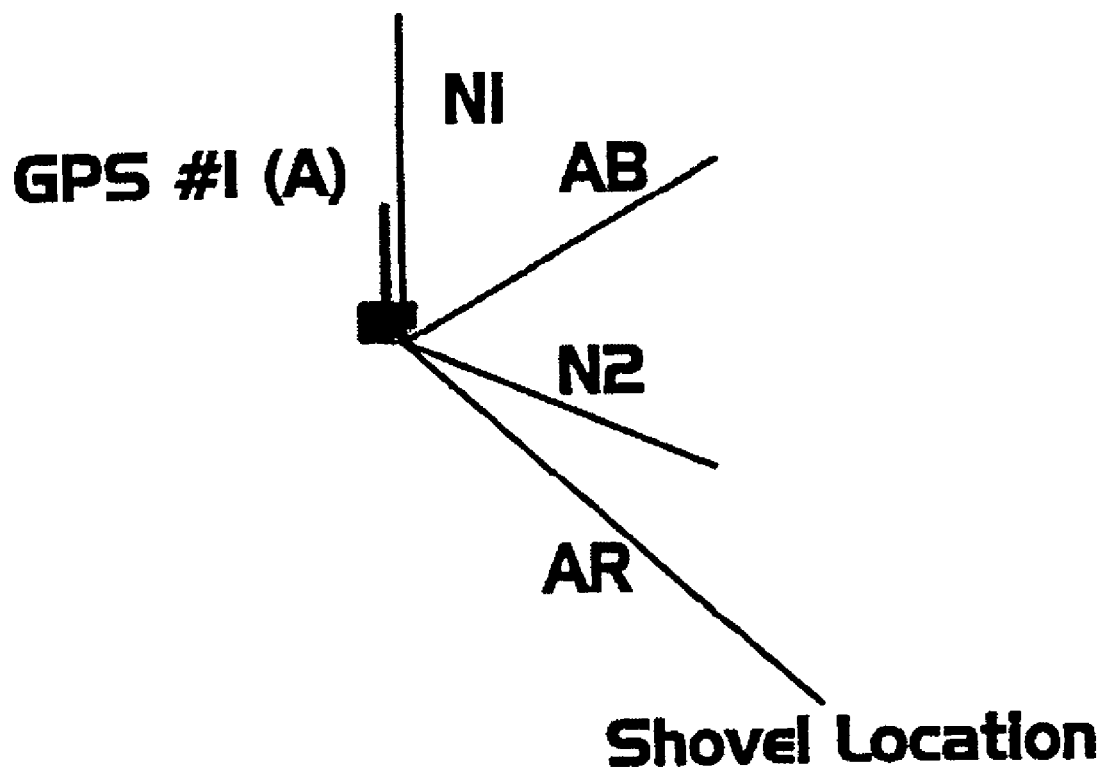
FIG. 22 is an illustration of the shovel locations and the abstract coordinate system.

FIG. 21 is an illustration of the abstract coordinate system relative to the GPS units. FIG. 22 is an illustration of the shovel locations and the abstract coordinate system.

Figure 23:
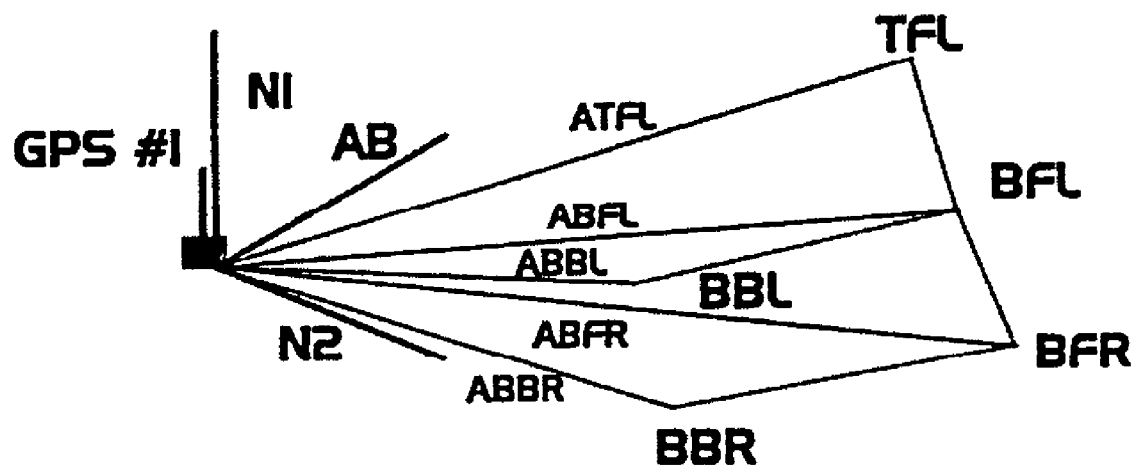
FIG. 23 is an illustration of the vectors between the key bucket points and GPS unit 1.

FIG. 23 is an illustration of the vectors between the key bucket points and GPS unit 1. The Runtime Calculations are repeated whenever it is necessary to calculate the global location of the shovel and key bucket positions as they change over time. The runtime calculation steps are as follows:

a) Retrieve the local abstract coordinate system data and constants calculated in the Setup Calculations;

b) Acquire the local location of the key bucket points, as calculated above (this cannot be done during setup because the bucket constantly moves);

c) Calculate the constants for the key bucket points:
   i) Use the local locations of the key bucket points and GPS unit 1 to calculate the vectors ABBL, ABBR, ABFL, ABFR, ATFL, shown in FIG. 23; and
   ii. Calculate the key bucket point constants.

d) Acquire GPS units' global locations;

e) Construct the global abstract coordinate system:
   i) Use the global locations of GPS Unit 1 and 3 to calculate the vector ACg;
   ii) Use the global locations of GPS Unit 1 and 2 to calculate the vector ABg;
   iii) Make ABg a unit vector;
   iv) Obtain N1g by crossing ABg with ACg;
   v) Make N1g a unit vector; and
   vi) Obtain N2g by crossing ABg with N1g.

f) Calculate the global shovel location;
   i) Calculate the vector ARg; and
   ii) Calculate the shovel's global location.

g) Calculate the global locations of the key bucket points;
   i) Calculate the vectors ABBLg, ABBRg, ABFLg, ABFRg, ATFLg; and
   ii) Calculate the key bucket points' global locations.

Figure 24:
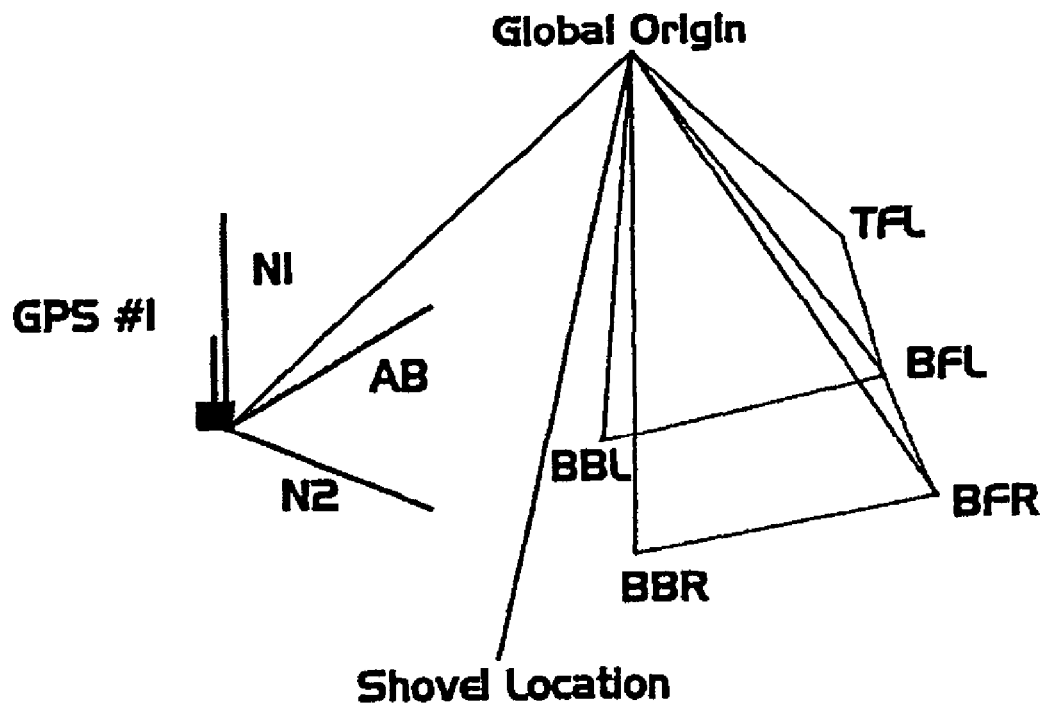
FIG. 24 is an illustration of the global locations of the different points on the shovel.

FIG. 24 is an illustration of the global locations of the different points on the shovel.

Errors in the global locations of the key bucket points can be caused by multiple sources and can range from minor to catastrophic in scale. Correct placement of the base station and the GPS units on the shovel is important to the accuracy of the entire system. It is not necessary to place either the GPS units or the base station in any particular location, though each should have an unobstructed view of the sky. However, it is preferable that the locations of the GPS units be precisely known; the more accurately they are known, the more accurate the system will be.

Errors in the global locations indicated by the GPS units can be caused by a variety of factors, from weather to the number of available satellites. However, the errors in the global locations of the GPS units will typically be minor and will affect all of the GPS units equally. This means that there is little chance for the error to be additive or subtractive, and this type of error is not a concern for the CCES. GPS failure caused by the physical failure of one or more of the GPS units, or by failure of one or more units to find enough satellites in the sky, will cause the system to not work.

Figure 25:
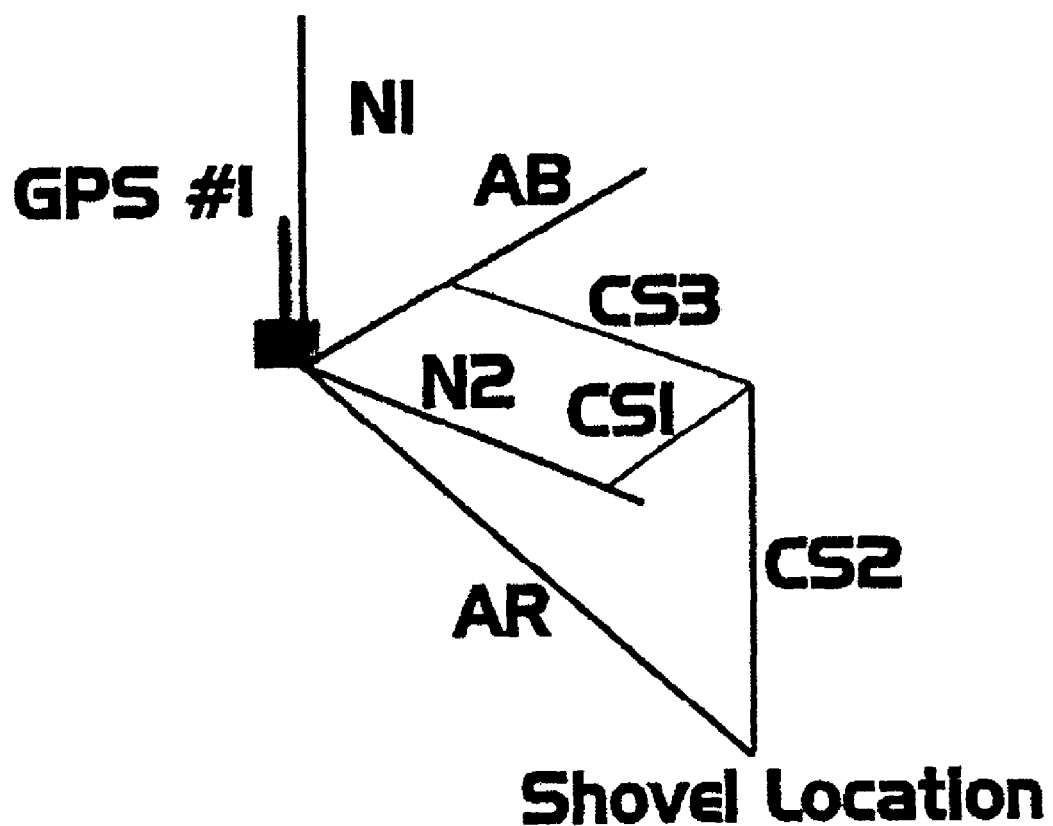
FIG. 25 is an illustration of the constants calculated for the shovel location.

FIG. 25 is an illustration of the constants calculated for the shovel location. Earlier in the chapter a description of the calculations and their functions was given. Below are the mathematical formulas for the calculations described earlier.

Figure 26:
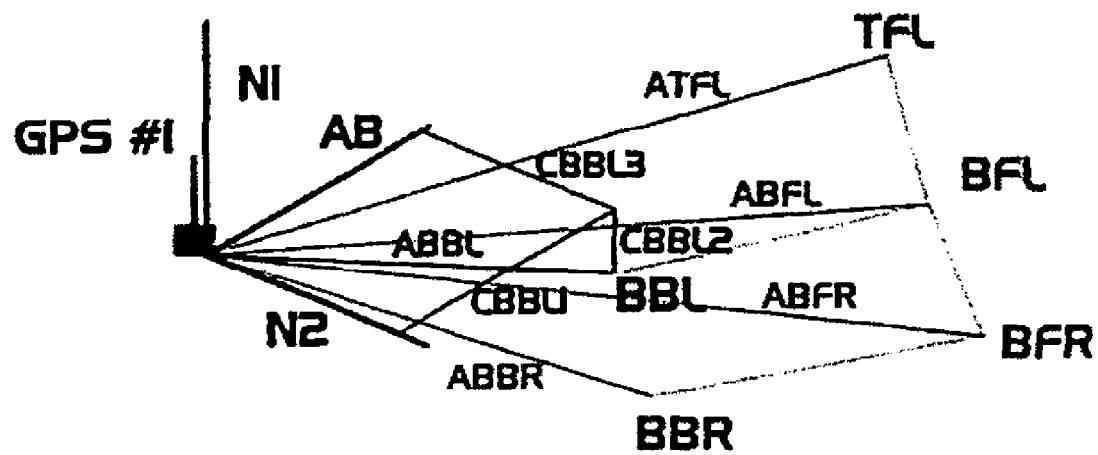
FIG. 26 is an illustration of the constants for the key bucket point BBL.
Figure 27:
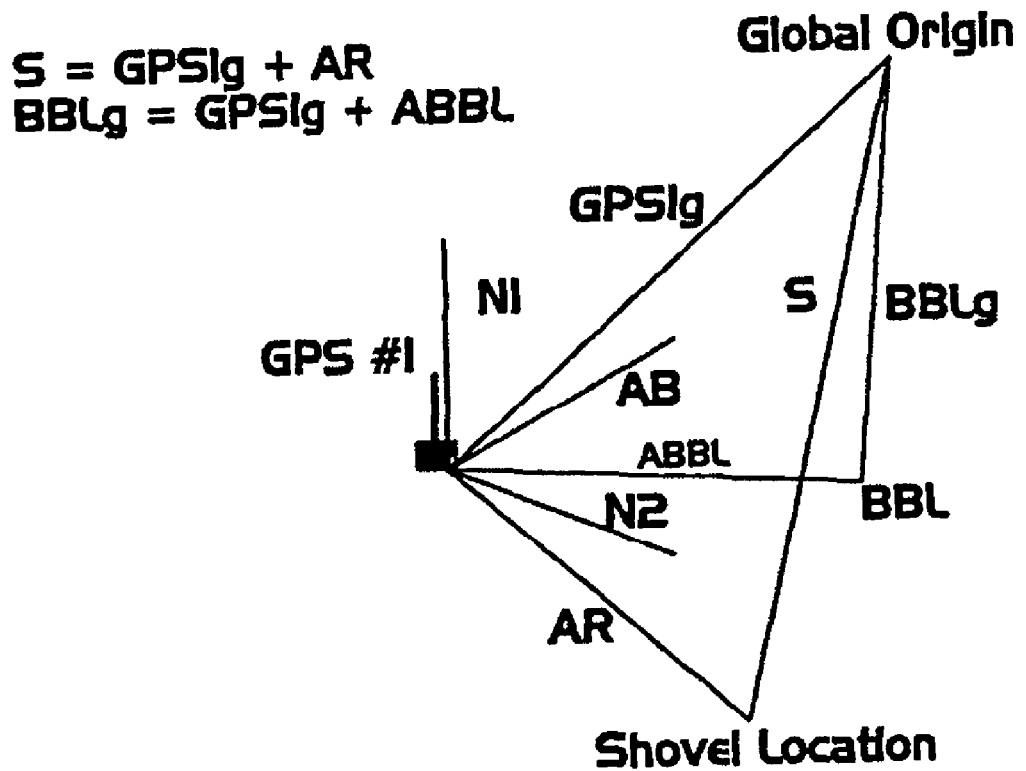
FIG. 27 is an illustration of how the global location of the point BBL is calculated.

The local locations of the GPS units and the constants for the shovel origin are calculated at the time the system is setup to reduce the amount of calculations that need to be done when the system is running. The setup calculation steps and mathematical formulas are as follows:

a) Measure the locations of the GPS units' on the shovel relative to the origin of the shovel
   i) GPS1 (x, y, z), GPS2(x, y, z), GPS3(x, y, z).

b) Construct the local abstract coordinate system
   i) AB=GPS2−GPS1;
   $AB_x = GPS2_x - GPS1_x$
   $AB_y = GPS2_y - GPS1_y$
   $AB_z = GPS2_z - GPS1_z$
   ii) Make AB a unit vector;
   Scalar=$\sqrt{(AB_x^2 + AB_y^2 + AB_z^2)}$
   $AB_x = AB_x / Scalar$
   $AB_y = AB_y / Scalar$
   $AB_z = AB_z / Scalar$
   iii) AC=GPS3−GPS1;
   $AC_x = GPS3_x - GPS1_x$
   $AC_y = GPS3_y - GPS1_y$
   $AC_z = GPS3_z - GPS1_z$
   iv) N1=AB×AC;
   $N1_x = (AB_y * AC_z) - (AB_z * AC_y)$
   $N1_y = (AB_z * AC_x) - (AB_x * AC_z)$
   $N1_z = (AB_x * AC_y) - (AB_y * AC_x)$
   v) Make N1 a unit vector
   Scalar=$\sqrt{(N1_x^2 + N1_y^2 + N_z^2)}$
   $N1_x = N1_x / Scalar$
   $N1_y = N1_y / Scalar$
   $N1_z = N1_z / Scalar$
   vi) N2=AB×N1
   $N2_x = (AB_y * N1_z) - (AB_z * N1_y)$
   $N2_y = (AB_z * N1_x) - (AB_x * N1_z)$
   $N2_z = (AB_x * N1_y) - (AB_y * N1_x)$ c) Calculate the shovel's constants;
i) Use the local locations of the shovel origin and GPS1 to calculate the vector AR;
$AR_x = 0 - GPS1_x$
$AR_y = 0 - GPS1_y$
$AR_z = 0 - GPS1_z$
ii) Calculate the shovel's constants
$CS1 = (AR_x * AB_x) + (AR_y * AB_y) + (AR_z * AB_z)$
$CS2 = (AR_x * N1_x) + (AR_y * N1_y) + (AR_z * N1_z)$
$CS3 = (AR_x * N2_x) + (AR_y * N2_y) + (AR_z * N2_z)$ FIG. 26 is an illustration of the constants for the key bucket point BBL. The Runtime Calculations are repeated every time we want to calculate the global location of the shovel and key bucket positions as they move over time. The runtime calculation steps and mathematical formulas are as follows:

a) Retrieve the local abstract coordinate system data and constants calculated in the Setup Calculations;
i) AB(x, y, z), N1(x, y, z), N2(x, y, z), CS1, CS2, CS3 b) Acquire the local location of the key bucket points;
i) BBL(x, y, z), BBR(x, y, z), BFL(x, y, z), BFR(x, y, z), TFL(x, y, z)
Bottom back left, bottom back right, bottom front left, bottom front right, and top front left c) Calculate the constants for the key bucket points:
i) Use the local locations of the key bucket points and GPS1 to calculate the vectors ABBL, ABBR, ABFL, ABFR, ATFL
$ABBL_x = BBL_x - GPS1_x$
$ABBL_y = BBL_y - GPS1_y$
$ABBL_z = BBL_z - GPS1_z$
$ABBR_x = BBR_x - GPS1_x$
$ABBR_y = BBR_y - GPS1_y$
$ABBR_z = BBR_z - GPS1_z$
$ABFL_x = BFL_x - GPS1_x$
$ABFL_y = BFL_y - GPS1_y$
$ABFL_z = BFL_z - GPS1_z$
$ABFR_x = BFR_x - GPS1_x$
$ABFR_y = BFR_y - GPS1_y$
$ABFR_z = BFR_z - GPS1_z$
$ATFL_x = TFL_x - GPS1_x$
$ATFL_y = TFL_y - GPS1_y$
$ATFL_z = TFL_z - GPS1_z$ ii) Calculate the key bucket point constants:
$CBBL1 = (ABBL_x * AB_x) + (ABBL_y * AB_y) + (ABBL_z * AB_z)$
$CBBL2 = (ABBL_x * N1_x) + (ABBL_y * N1_y) + (ABBL_z * N1_z)$
$CBBL3 = (ABBL_x * N2_x) + (ABBL_y * N2_y) + (ABBL_z * N2_z)$
$CBBR1 = (ABBR_x * AB_x) + (ABBR_y * AB_y) + (ABBR_z * AB_z)$
$CBBR2 = (ABBR_x * N1_x) + (ABBR_y * N1_y) + (ABBR_z * N1_z)$
$CBBR3 = (ABBR_x * N2_x) + (ABBR_y * N2_y) + (ABBR_z * N2_z)$
$CBFL1 = (ABFL_x * AB_x) + (ABFL_y * AB_y) + (ABFL_z * AB_z)$
$CBFL2 = (ABFL_x * N1_x) + (ABFL_y * N1_y) + (ABFL_z * N1_z)$
$CBFL3 = (ABFL_x * N2_x) + (ABFL_y * N2_y) + (ABFL_z * N2_z)$
$CBFR1 = (ABFR_x * AB_x) + (ABFR_y * AB_y) + (ABFR_z * AB_z)$
$CBFR2 = (ABFR_x * N1_x) + (ABFR_y * N1_y) + (ABFR_z * N1_z)$
$CBFR3 = (ABFR_x * N2_x) + (ABFR_y * N2_y) + (ABFR_z * N2_z)$
$CTFL1 = (ATFL_x * AB_x) + (ATFL_y * AB_y) + (ATFL_z * AB_z)$
$CTFL2 = (ATFL_x * N1_x) + (ATFL_y * N1_y) + (ATFL_z * N1_z)$
$CTFL3 = (ATFL_x * N2_x) + (ATFL_y * N2_y) + (ATFL_z * N2_z)$ d) Calculate GPS units' global locations:
i) GPS1g(x, y, z), GPS2g(x, y, z), GPS3g(x, y, z)

e) Construct the global abstract coordinate system:
i) ABg = GPS2g - GPS1g
$ABg_x = GPS2g_x - GPS1g_x$
$ABg_y = GPS2g_y - GPS1g_y$
$ABg_z = GPS2g_z - GPS1g_z$
ii) Make ABg a unit vector
$Scalar = \sqrt{(ABg_x^2 + ABg_y^2 + ABg_z^2)}$
$ABg_x = ABg_x / Scalar$
$ABg_y = ABg_y / Scalar$
$ABg_z = ABg_z / Scalar$
iii) ACg = GPS3g - GPS1g
$ACg_x = GPS3g_x - GPS1g_x$
$ACg_y = GPS3g_y - GPS1g_y$
$ACg_z = GPS3g_z - GPS1g_z$
iv) N1g = ABg × ACg
$N1g_x = (ABg_y * ACg_z) - (ABg_z * ACg_y)$
$N1g_y = (ABg_z * ACg_x) - (ABg_x * ACg_z)$
$N1g_z = (ABg_x * ACg_y) - (ABg_y * ACg_x)$
v) Make N1g a unit vector
$Scalar = \sqrt{(N1g_x^2 + N1g_y^2 + N1g_z^2)}$
$N1g_x = N1g_x / Scalar$
$N1g_y = N1g_y / Scalar$
$N1g_z = N1g_z / Scalar$
vi) N2g = ABg × N1g
$N2g_x = (ABg_y * N1g_z) - (ABg_z * N1g_y)$
$N2g_y = (ABg_z * N1g_x) - (ABg_x * N1g_z)$
$N2g_z = (ABg_x * N1g_y) - (ABg_y * N1g_x)$ f) Calculate the global shovel location:
i) Calculate the global vector ARg
$ARg_x = (CS1 * ABg_x) + (CS2 * N1g_x) + (CS3 * N2g_x)$
$ARg_y = (CS1 * ABg_y) + (CS2 * N1g_y) + (CS3 * N2g_y)$
$ARg_z = (CS1 * ABg_z) + (CS2 * N1g_z) + (CS3 * N2g_z)$
ii) Calculate the shovel's global location:
$S_x = ARg_x + GPS1g_x$
$S_y = ARg_y + GPS1g_y$
$S_z = ARg_z + GPS1g_z$ g) Calculate the global locations of the key bucket points:
i) Calculate the global vectors ABBLg, ABBRg, ABFLg, ABFRg, ATFLg
$ABBLg_x = (CBBL1 * ABg_x) + (CBBL2 * N1g_x) + (CBBL3 * N2g_x)$
$ABBLg_y = (CBBL1 * ABg_y) + (CBBL2 * N1g_y) + (CBBL3 * N2g_y)$
$ABBLg_z = (CBBL1 * ABg_z) + (CBBL2 * N1g_z) + (CBBL3 * N2g_z)$
$ABBRg_x = (CBBR1 * ABg_x) + (CBBR2 * N1g_x) + (CBBR3 * N2g_x)$
$ABBRg_y = (CBBR1 * ABg_y) + (CBBR2 * N1g_y) + (CBBR3 * N2g_y)$
$ABBRg_z = (CBBR1 * ABg_z) + (CBBR2 * N1g_z) + (CBBR3 * N2g_z)$
$ABFLg_x = (CBFL1 * ABg_x) + (CBFL2 * N1g_x) + (CBFL3 * N2g_x)$
$ABFLg_y = (CBFL1 * ABg_y) + (CBFL2 * N1g_y) + (CBFL3 * N2g_y)$
$ABFLg_z = (CBFL1 * ABg_z) + (CBFL2 * N1g_z) + (CBFL3 * N2g_z)$
$ABFRg_x = (CBFR1 * ABg_x) + (CBFR2 * N1g_x) + (CBFR3 * N2g_x)$
$ABFRg_y = (CBFR1 * ABg_y) + (CBFR2 * N1g_y) + (CBFR3 * N2g_y)$
$ABFRg_z = (CBFR1 * ABg_z) + (CBFR2 * N1g_z) + (CBFR3 * N2g_z)$
$ATFLg_x = (CTFL1 * ABg_x) + (CTFL2 * N1g_x) + (CTFL3 * N2g_x)$
$ATFLg_y = (CTFL1 * ABg_y) + (CTFL2 * N1g_y) + (CTFL3 * N2g_y)$ $ATFLg_z=(CTFL1*ABg_z)+(CTFL2*N1g_z)+$
$(CTFL3*N2g_z)$ ii) Calculate the key bucket points global locations $BBLg_x=ABBLg_x+GPS1g_x$
$BBLg_y=ABBLg_y+GPS1g_y$
$BBLg_z=ABBLg_z+GPS1g_z$
$BBRg_x=ABBRg_x+GPS1g_x$
$BBRg_y=ABBRg_y+GPS1g_y$
$BBRg_z=ABBRg_z+GPS1g_z$
$BFLg_x=ABFLg_x+GPS1g_x$
$BFLg_y=ABFLg_y+GPS1g_y$
$BFLg_z=ABFLg_z+GPS1g_z$
$BFRg_x=ABFRg_x+GPS1g_x$
$BFRg_y=ABFRg_y+GPS1g_y$
$BFRg_z=ABFRg_z+GPS1g_z$
$TFLg_x=ATFLg_x+GPS1g_x$
$TFLg_y=ATFLg_y+GPS1g_y$
$TFLg_z=ATFLg_z+GPS1g_z$ FIG. 27 is an illustration of how the global location of the point BBL is calculated.

Figure 28:
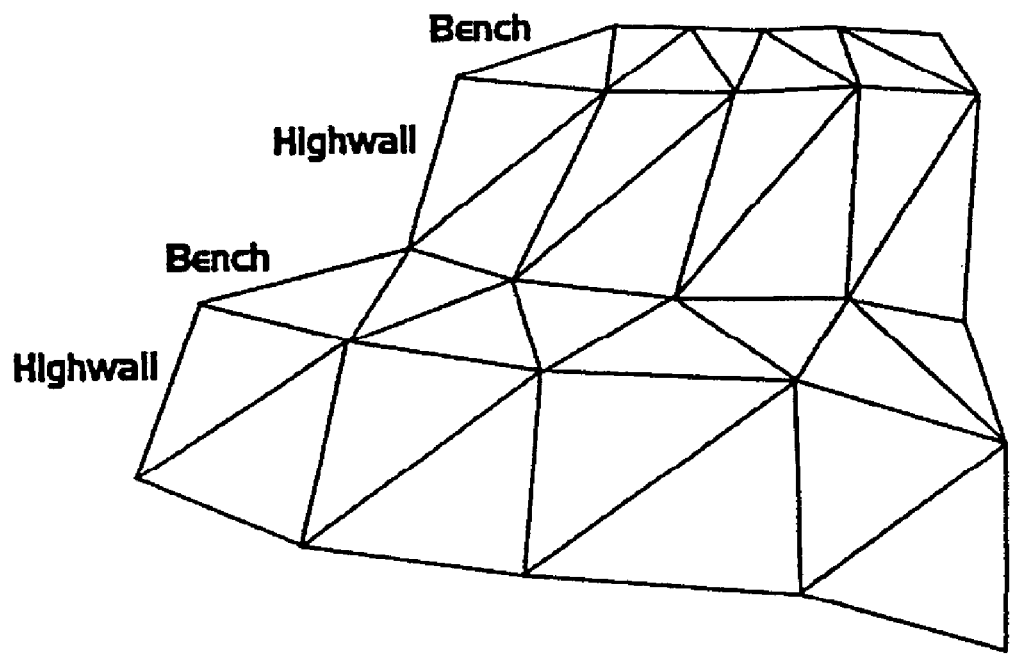
FIG. 28 is an illustration of a mine design mesh.

FIG. 28 is an illustration of a mine design mesh. The Mine Design Limit Calculations allow this CCES invention to detect an intersection with the mine design limits, and to override the operator controls when an intersection is predicted. In these calculations, the CCES tests certain edges of the bucket to see if they intersect with each triangle in the limit mesh (FIG. 27). The limit mesh is defined by the Mine Data Set, above. There are three control parameters that can be adjusted to affect the way the CCES interacts with the shovel: the look-ahead time, the time interval between checks, and minimum adjustment amount.

The look-ahead time might also be called the forecast time. It is the amount of time in the future in which the CCES looks for an intersection. By looking in the future for an intersection the CCES gives the shovel time to respond to the changes that must be made to the shovel controls to and reduce or eliminate any actual intersections with the design limits.

The time interval between checks could also be called the control cycle time, and will most likely be determined by the characteristics of the equipment being controlled. The CCES can do the calculations and send control signals to the machine very quickly; excessive wear on the shovel components may result if the calculations and the resulting adjustments are done too frequently. Thus it can be important to determine how often the CCES checks for an intersection.

The minimum adjustment amount could also be called the deadband. It is minimum change that the CCES allows to the any component on the shovel. The shovel uses analog controls whose output signals range from −1 to 1, so theoretically an infinite number of adjustments that can be made between the two values. While smaller adjustments result in smoother digs, they also require more calculations to determine the adjustment the system must make, and can cause increased wear to machine components.

Figure 29:
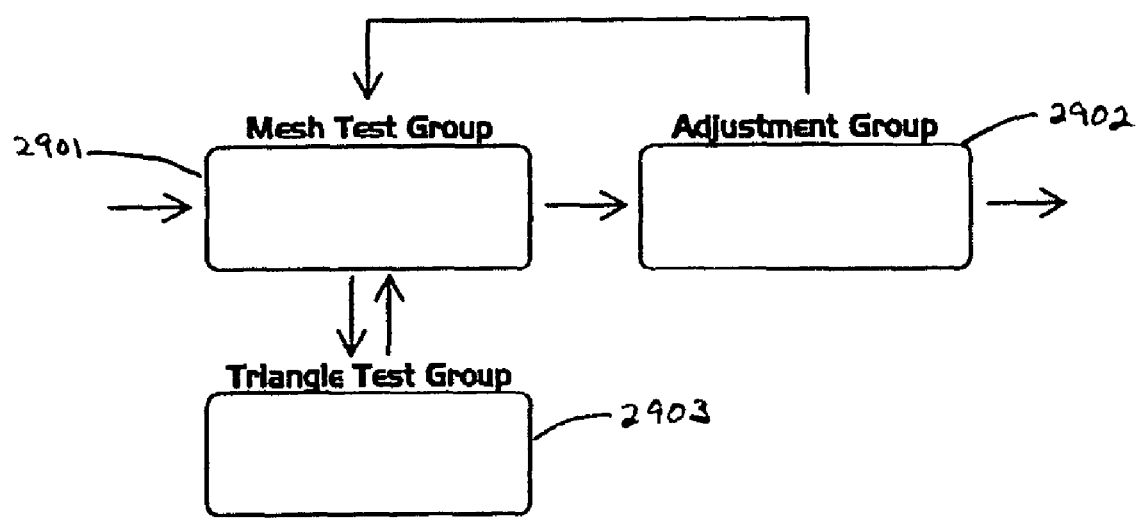
FIG. 29 is a flow diagram of mine design limit calculations.

The Mine Design Limit Calculations are divided into three smaller groupings. The first group, the Mesh Test Group 2901, iterates through the entire mesh to test for an intersection with the bucket edges. The Mesh Test Group 2901 calls upon the second group, the Triangle Test Group 2903, to do the actual intersection calculations for each specific triangle in the mesh. If the Mesh Test Group 2901 finds an intersection then the third group, the Adjustment Group 2902, is actuated. It makes an adjustment to the controls and then calls upon the Mesh Test Group 2901 to check and see if the adjustment is sufficient to avoid the intersection. If it is not, the adjustment is increased. This process is repeated until the adjustment is sufficient to avoid the intersection, or until no further adjustments can be made. FIG. 29 shows a flow diagram of the interactions in the Mine Design Limit Calculations.

Figure 30:
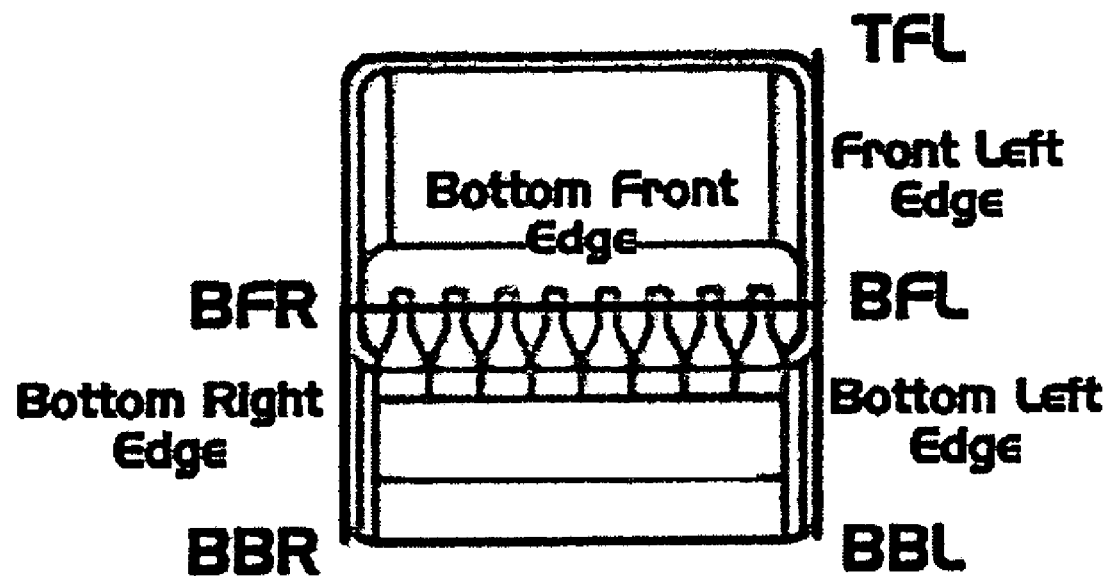
FIG. 30 is an illustration of bucket edges and key bucket points.

The Mesh Test Group 2901 tests the bucket edges on the bottom left, bottom right, bottom front, and left front (FIG. 30). These edges were chosen because they are the smallest group of edges that provide a positive intersection result for almost any possible actual intersection. It is believed that testing these four edges will provide adequate control to prevent or minimize intersections.

Figure 31:
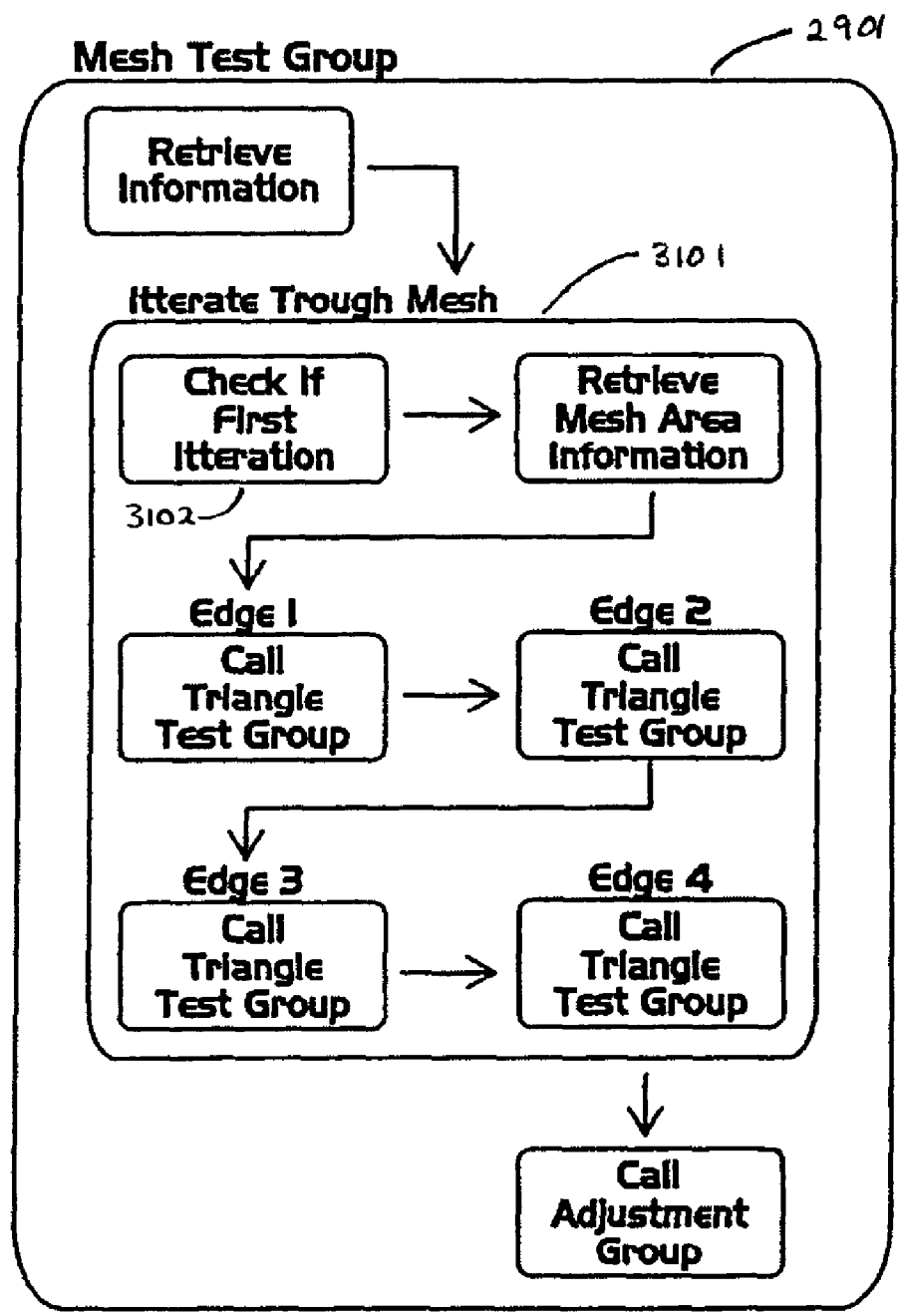
FIG. 31 is a flow diagram of the mesh test group.

The Mesh Test Group 2901, detail is provided in FIG. 31 and is designed to iterate through the entire mesh in a way that is fast and efficient. To do this the group tests one area of the mesh at a time, reducing the number of calculations that must be made.

On the first check 3102 for intersections the Group tests each area in the mesh with the first bucket edge, flagging the area if it intersects with that edge. With each successive bucket edge, a given area is tested only if it has not already been flagged for intersection with a previously tested edge. When an adjustment has been made and the Group must test for intersections again, it is assumed that an intersection can only occur with an area that was intersected during the previous check. Using this assumption the Group tests the mesh as it did the first time, but only the areas that were intersected on the previous check are checked again. This reduces the number of areas that have to be checked each time an adjustment is made. The steps in the process are described in detail in FIG. 31:

a) Retrieve the information necessary for the calculations;
b) Retrieve the predicted bucket point position at the look-ahead time, based on the current control settings +/− any pending adjustments and the look ahead time;
c) Retrieve the predicted global positions of the key bucket points;
d) Iterate through each area of the mesh:
  i) Check to see if this is the first iteration or if this area of the mesh was intersected during the last iteration—
    Continue if true
    Loop to next area of mesh if false
  ii) Retrieve the information for the area of the mesh;
  iii) For the bottom left edge of the bucket:
    Retrieve the information for the bucket edge
    Call the Triangle Test Group to test for an intersection
    Set the flag for the area to the value of the intersection test
  iv) For the bottom right edge of the bucket:
    Test to see if the flag for the area is less than 3 (Intersected)
      Continue if true
      Loop to next area of mesh if false
    Retrieve the information for the bucket edge
    Call the Triangle Test Group to Test for an intersection
    Set the flag for the area to the value of the intersection test if its current value is lower
  v) For the bottom front edge of the bucket
    Test to see if the flag for the area is less than 3 (Intersected)
      Continue if true
      Loop to next area of mesh if false
    Retrieve the information for the bucket edge
    Call the Triangle Test Group to Test for an intersection
    Set the flag for the area to the value of the intersection test if its current value is lower
  vi) For the left front edge of the bucket
    Test to see if the flag for the area is less than 3 (Intersected)

Figure 32:
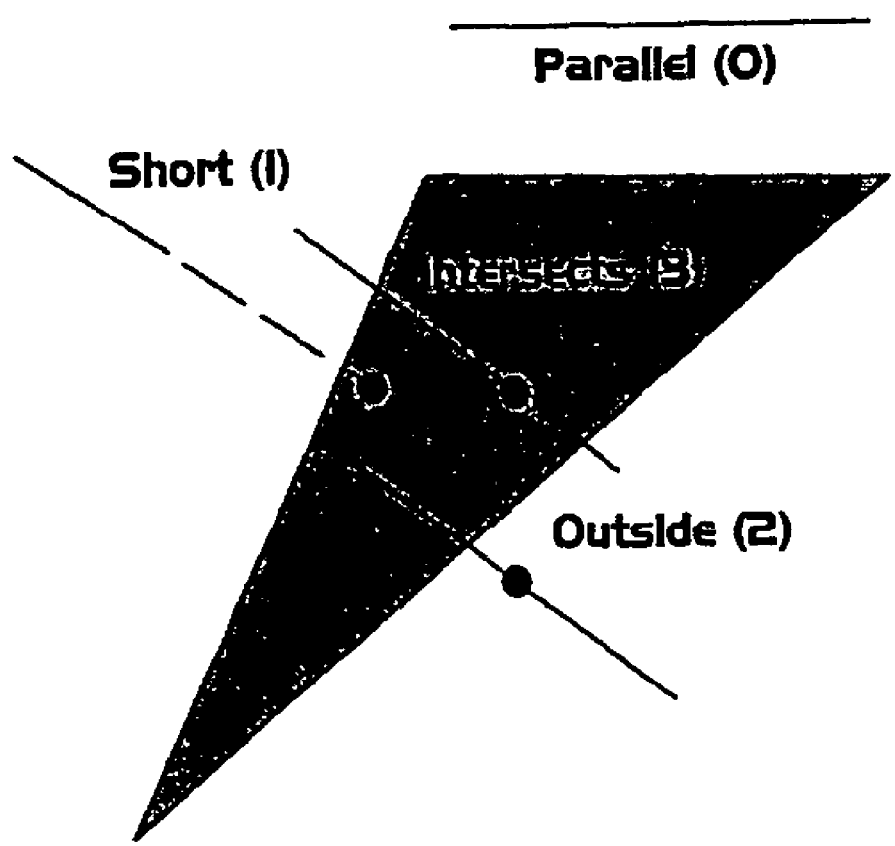
FIG. 32 is an illustration of the different states of a line as compared to a triangle.

Continue if true
Loop to next area of mesh if false
Retrieve the information for the bucket edge
Call the Triangle Test Group to Test for an intersection
Set the flag for the area to the value of the intersection test if its current value is lower The Triangle Test Group 2903 is the heart of the Mine Design Limit Calculations; about 95% of all the calculations are done by this group. It is important that the Triangle Test Group 2903 be as efficient as possible, to reduce the number of calculations that must be done. Proving an intersection requires the highest number of calculations so efficiency is gained in the Triangle Test Group 2903 by testing for non-intersection. At any time, a line or bucket edge can be in one of four states with respect to a triangle as shown in FIG. 32, which is an illustration of the different states of a line as compared to a triangle. The states are:

1. Parallel (Can never intersect);
2. Short (Too short to intersect the plane of triangle);
3. Outside (Intersects the plane of the triangle but does so outside of the triangle); and
4. Intersects.

Figure 33:
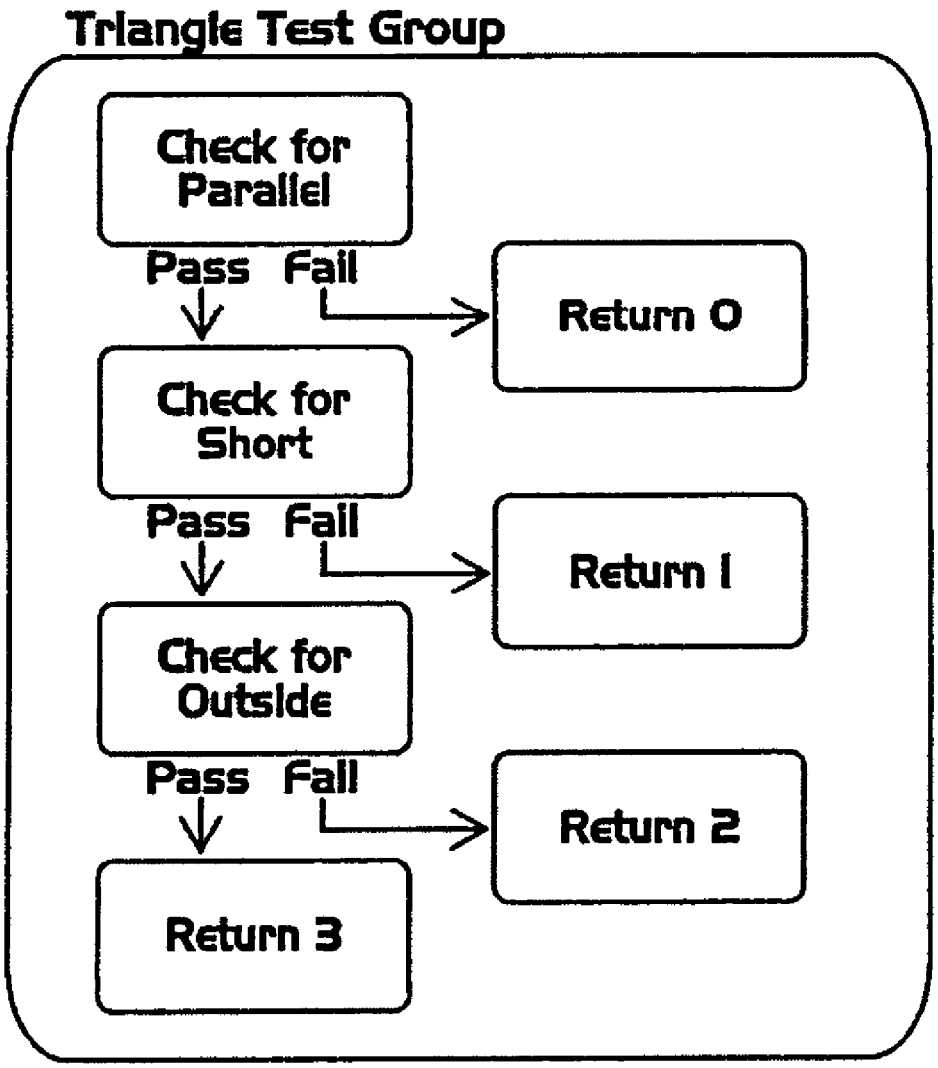
FIG. 33 is an illustration of the triangle test group.

The Triangle Test Group 2903 returns a number between 0 and 3 that corresponds to the list above. As the Triangle Test Group 2903 tests for non-intersection it tests for the above states in the order they appear in the list. As the group tests for each successive state, the total number of calculations required increases. If an edge tests positive for any state then the group will stop testing for the remaining states and return the number of the state the edge that tested positive. A description of the Triangle Test Group 2903 calculations is given below in FIG. 33, which is an illustration of the triangle test group process.

Figure 34:
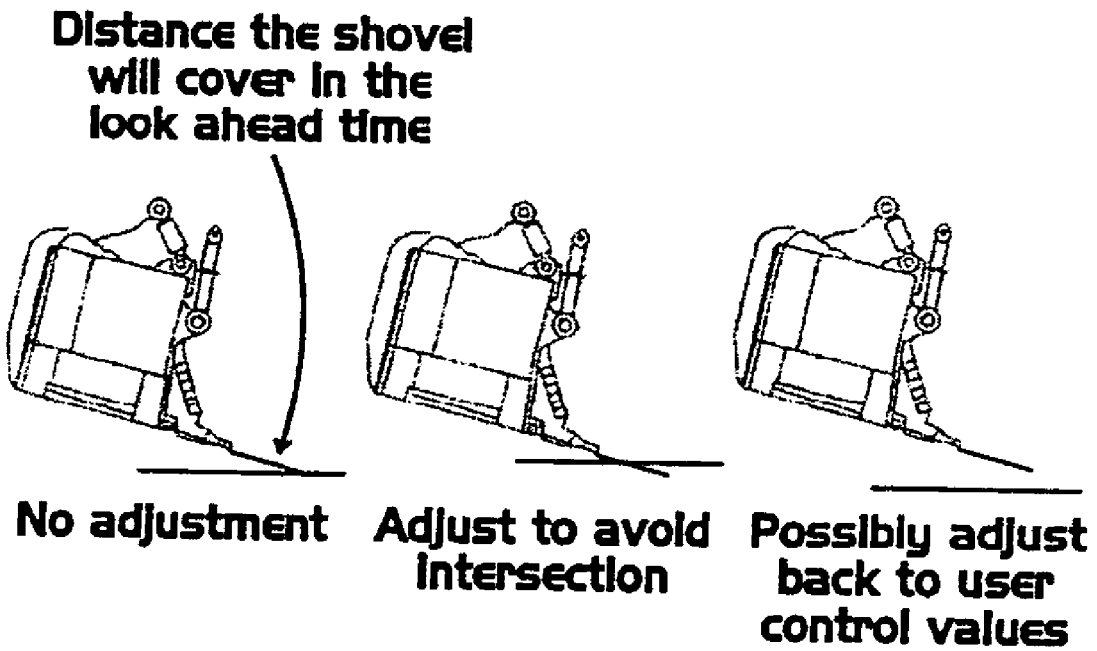
FIG. 34 is an illustration of adjustment group operations.

FIG. 34 is an illustration of adjustment group operations. The Adjustment Group 2902 makes overriding adjustments to the user controls of the system. Of the many control inputs that an operator can adjust on a shovel, only two, the crowd and the hoist, are adjusted while the shovel 100 is digging. Thus these are the only controls that the CCES adjusts. The inputs to the crowd and hoist controls are numerical values between −1 (back on the crowd and up on the hoist), and 1 (forward on the crowd and down on the hoist.)

The normal digging motion of a shovel 100 can be divided into two phases. In the first phase the crowd is the main digging force, pushing forward with the rope at its full length. In the second phase the crowd has reached its full length the hoist becomes the main digging force. When the CCES makes an adjustment to the control inputs it starts with the hoist control. This is because the hoist is not the main digging force during the first phase and during the second phase it is already in the position to which the system would adjust it. To avoid an intersection the CCES adjusts the hoist and crowd inputs only in the negative direction (up and towards the shovel). It does not adjust the inputs in the positive direction because this is contrary to the normal shape and design of a highwall and would only be necessary in very extreme or unusual circumstances.

If the CCES makes an adjustment during the digging motion it will attempt to return to the original position once it no longer detects an upcoming intersection with the design limits. The Adjustment Group 2902 resets the loop counter on the Mesh Test Group so the Mesh Test Group 2901 will check all of the mesh areas during the next iteration. In successive iterations, if the Mesh Test Group 2901 doesn't find an intersection, the Adjustment Group 2902 will increase the adjustment it has made, so the bucket will return to the original position more quickly. After making this adjustment the Adjustment Group 2902 again resets the loop counter on the Mesh Test Group 2901, so that it will check the entire mesh again. If the Mesh Test Group 2901 finds an intersection, the Adjustment Group 2902 will adjust the controls only by the last set of adjustments that did not result in an intersection. FIG. 34 illustrates the operation of the Adjustment Group 2902.

Figure 35:
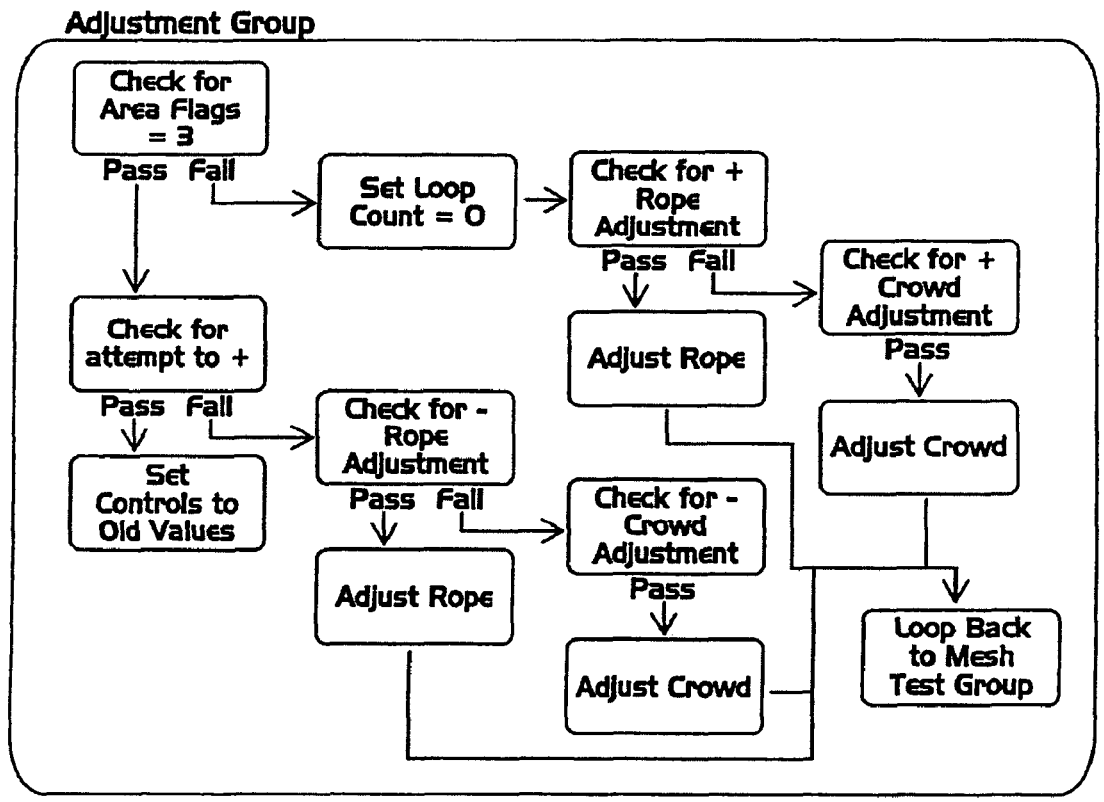
FIG. 35 is a flow diagram of the adjustment group.
Figure 36:
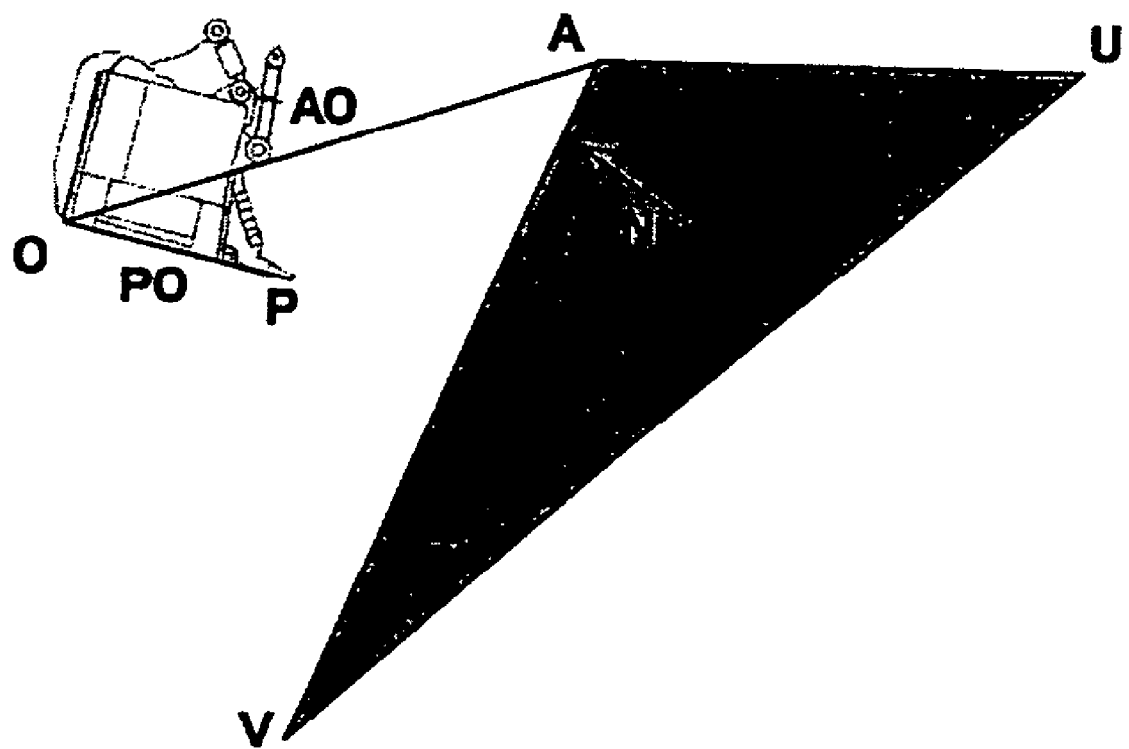
FIG. 36 is an illustration of the bucket nets to a triangle.

The Adjustment Group 2902 requires very few calculations. It is mostly a group of checking statements designed to determine which controls to adjust and by how much. The steps and calculations in the Adjustment Group 2902 are listed below and shown in FIG. 35, which is a flow diagram of the Adjustment Group 2902:

a) Check to see if any of the mesh area flags have been set to 3;
   i) Yes—Continue and attempt to adjust the controls to avoid the intersection.
   ii) No—Possibly attempt to adjust the controls to return to the operator settings (Go to Line 5).
b) Check to see if the system is attempting to return the controls to the user input;
   i) Yes—Set the controls to what they were during the last iteration
   ii) No—Continue
c) Check to see if the rope control can be adjusted;
   i) Yes—Adjust the rope control by the minimum adjustment
   ii) No—Check to see if the crowd control can be adjusted
      Yes—Adjust the crowd control by the minimum adjustment
      No—Stop
d) Loop back to the Mesh Test Group to retest the mesh for intersections;
e) Reset the Mesh Test Group loop counter to zero;
f) Check to see if the crowd control should be adjusted;
   i) Yes—Adjust the crowd control by the minimum adjustment
   ii) No—Check to see of the hoist control is already at the user position
      Yes—Stop
      No—Adjust the hoist control by the minimum adjustment
g) Loop back to the Mesh Test Group to retest the mesh for intersections;

The Mesh Test Group 2901 is composed of a few mathematical calculations, a lot of data retrieval statements, some checking statements and a few calls to the Triangle Test Group 2903. The equations and program statements are as follows:

a) Retrieve the information that will be necessary for the calculations; namely, Rope Speed (RS), Crowd Speed (CS), Rope Control Setting (RC), Crowd Control Setting (CC), Operator Rope Setting (ORS), and Operator Crowd Setting (OCS);
b) Retrieve the predicted bucket point position at the look-ahead time.
   i) bpos(x, y, z, angle)
   ii) Call Local Bucket Location and Orientation Calculations
c) Retrieve the predicted global positions of the key bucket points;
   i) B1, B2, B3, and B4
   ii) Call Global Bucket Location and Orientation Calculations d) Iterate through each area of the mesh;
  i) If(loopcount=1 or areaflag=3)
    True—Continue
    False—Go to next area
  ii) Retrieve the information for the area of the mesh
    A=A
    U=U−A
    V=V−A
    N=N
  iii) For the bottom left edge of the bucket
    Retrieve the information for the bucket edge (see FIG. 36, which is an illustration of the bucket nets to a triangle)
    O=BBL
    PO=BFL−BBL
    AO=A−O
    Call the Triangle Test Group to Test for an intersection
    areaflag=returnvalue
  iv) For the bottom right edge of the bucket (! in C++ means "not")
    If(areaflag !=3)
      True—Continue
      False—Go to next area
    Retrieve the information for the bucket edge
      O=BBL
      PO=BFL−BBL
      AO=A−O
    Call the Triangle Test Group to Test for an intersection
    areaflag=returnvalue
  v) For the bottom front edge of the bucket
    If(areaflag !=3)
      True—Continue
      False—Go to next area
    Retrieve the information for the bucket edge
      O=BBL
      PO=BFL−BBL
      AO=A−O
    Call the Triangle Test Group to Test for an intersection
    areaflag=returnvalue
  vi) For the left front edge of the bucket
    If(areaflag !=3)
      True—Continue
      False—Go to next area
    Retrieve the information for the bucket edge
      O=BBL
      PO=BFL−BBL
      AO=A−O
    Call the Triangle Test Group to Test for an intersection
    areaflag=returnvalue Of the three groups in the Mine Design Limit Calculations, the Triangle Test Group 2903 is called the most often. Proving an intersection requires the highest number of calculations, so efficiency is gained in the Triangle Test Group 2903 by testing for non-intersection. As the Triangle Test Group 2903 tests for non-intersection it also tests for the different states of intersection. As the group 2903 tests for each successive state, the total number of calculations required increases. If an edge tests positive for any state then the group will stop testing for the remaining states and return the number of the state the edge tested positive for. For derivations and a more detailed explanation of the Segment Triangle Intersection theory see Intersections of Rays/Segments with Triangles (2001). The equations and statements for the Triangle Test Group are as follows:

a) bottom=N•PO
  $(N_x*PO_x)+(N_y*PO_y)+(N_z*PO_z)$
b) If(bottom=0)
  i) True—Return 0
  ii) False—Continue
c) top=N.AO
  $(N_x*AO_x)+(N_y*AO_y)+(N_z*AO_z)$
d) R=top/bottom
e) If(R<=1 and R>=0)
  i) True—Continue
  ii) False—Return 1
f) I=(O+(R*PO))
  i) $I_x=(O_x+(R_x*PO_x))$
  ii) $I_y=(O_y+(R_y*PO_y))$
  iii) $I_z=(O_z+(R_z*PO_z))$
g) W=I−A
  i) $W_x=I_x-A_x$
  ii) $W_y=I_y-A_y$
  iii) $W_z=I_z-A_z$
h) S=(W•V⊥)/(U•V⊥)
  i) S=[(U•V)(W•V)−(V•V)(W•U)]/[(U•V)$^2$−(U•U)(V•V)]
  ii) $U•U=(U_x*U_x)+(U_y*U_y)+(U_z*U_z)$
  iii) $U•W=(U_x*W_x)+(U_y*W_y)+(U_z*W_z)$
  iv) $U•V=(U_x*V_x)+(U_y*V_y)+(U_z*V_z)$
  v) $W•V=(W_x*V_x)+(W_y*V_y)+(W_z*V_z)$
  vi) $V•V=(V_x*V_x)+(V_y*V_y)+(V_z*V_z)$
i) If(S>0 and S<1)
  i) True—Continue
  ii) False—Return 2
j) T=(W•U⊥)/(V•U⊥)
  i) T=[(U•V)(W•U)−(U•U)(W•V)]/[(U•V)$^2$−(U•U)(V•V)]
k) If(T>0 and S+T<1)
  i) True—Return 3
  ii) False—Return 2

Figure 37:
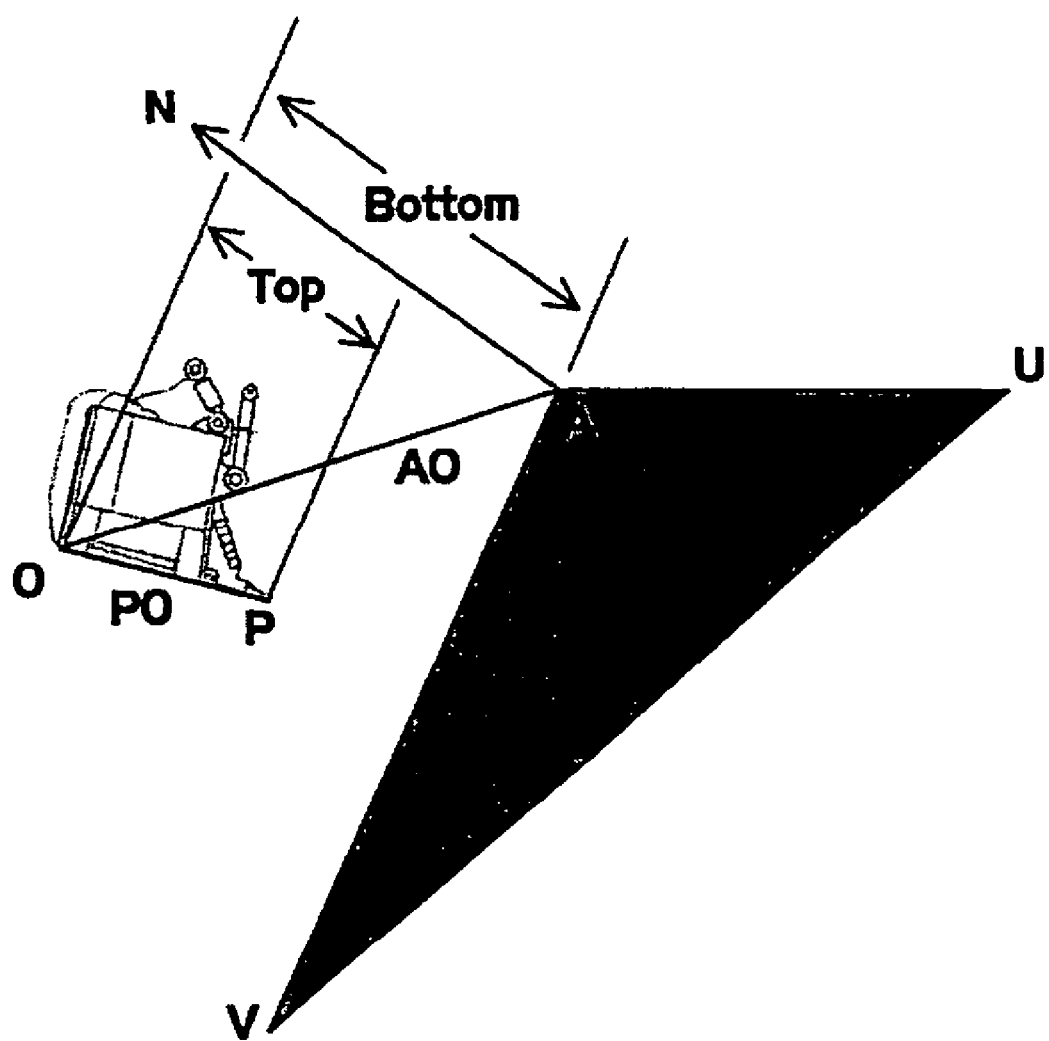
FIG. 37 is an illustration of the top and bottom parts of the intersection equation.
Figure 38:
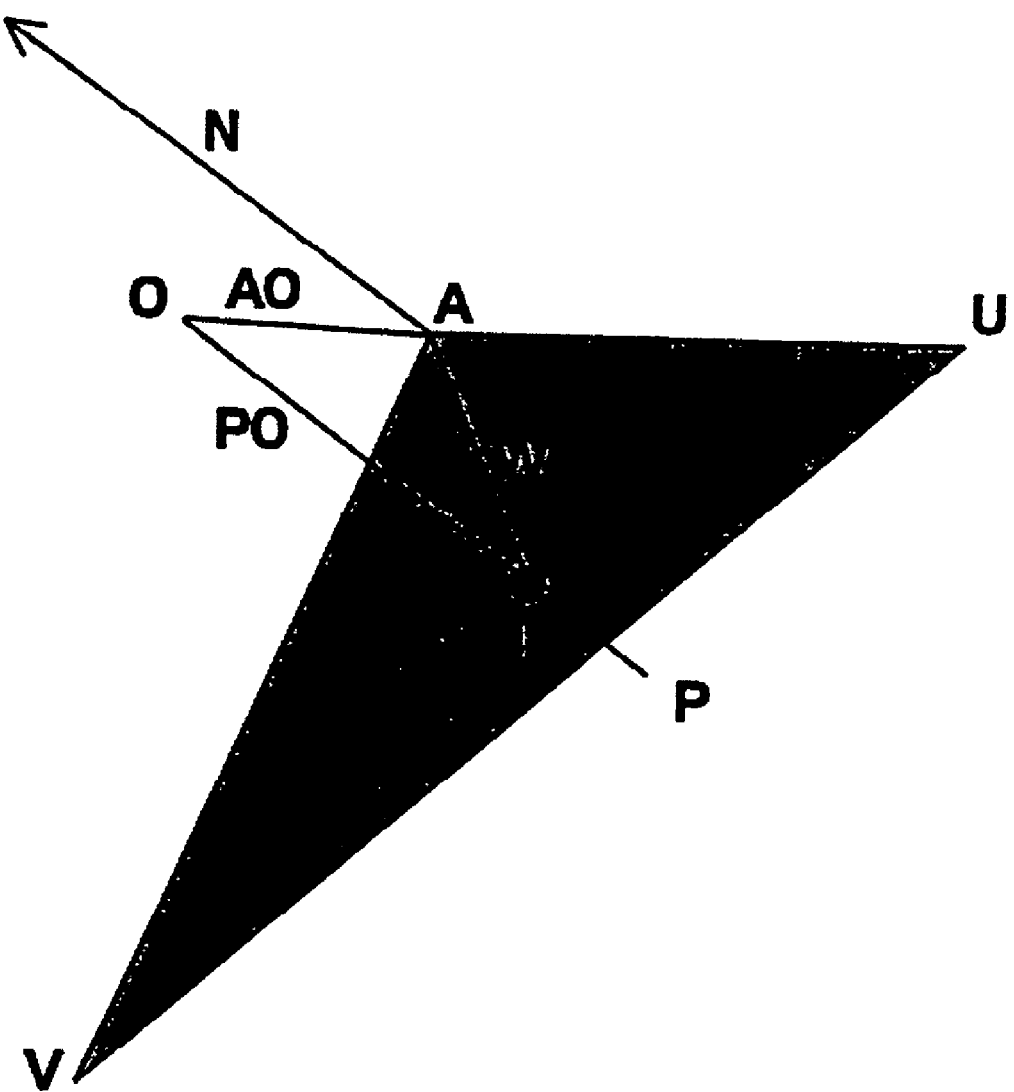
FIG. 38 is an illustration of the mesh design limit calculations calculating the vector AW.
Figure 39:
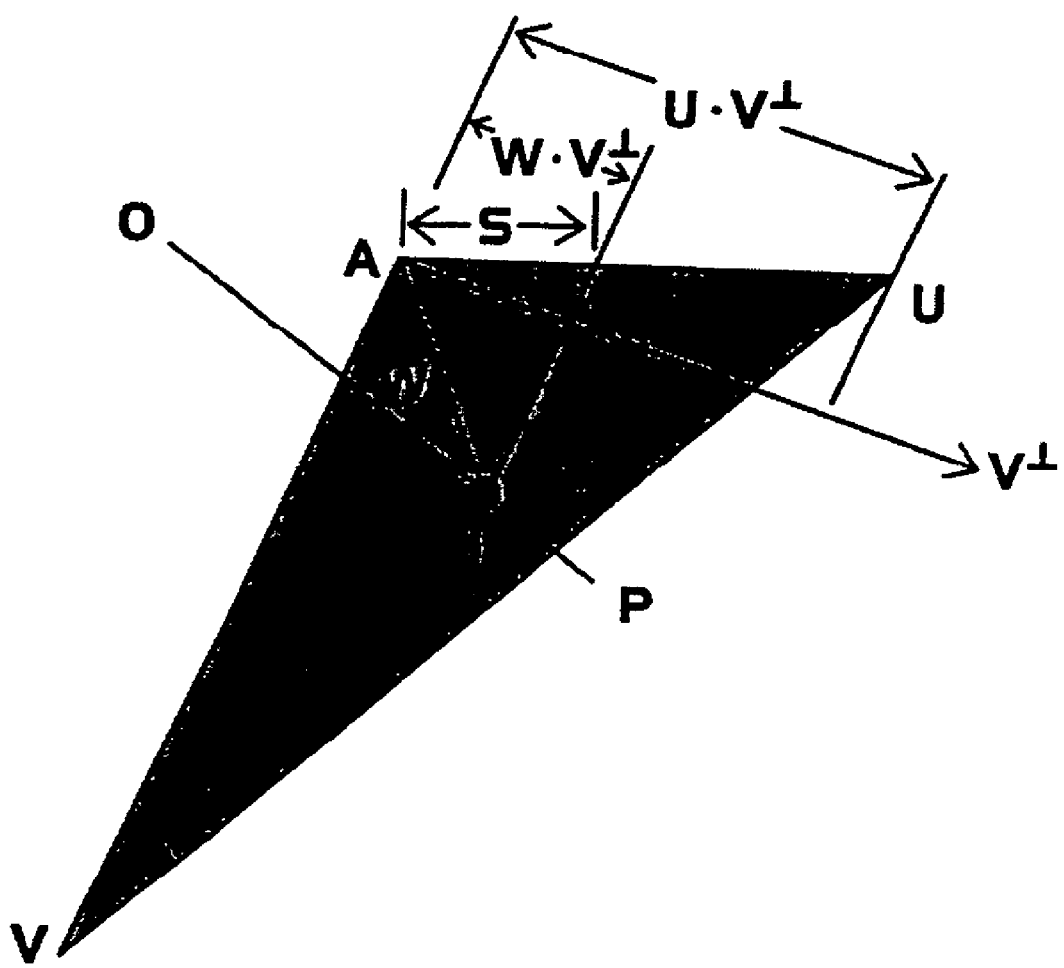
FIG. 39 is an illustration showing how to calculate the value for S.
Figure 40:
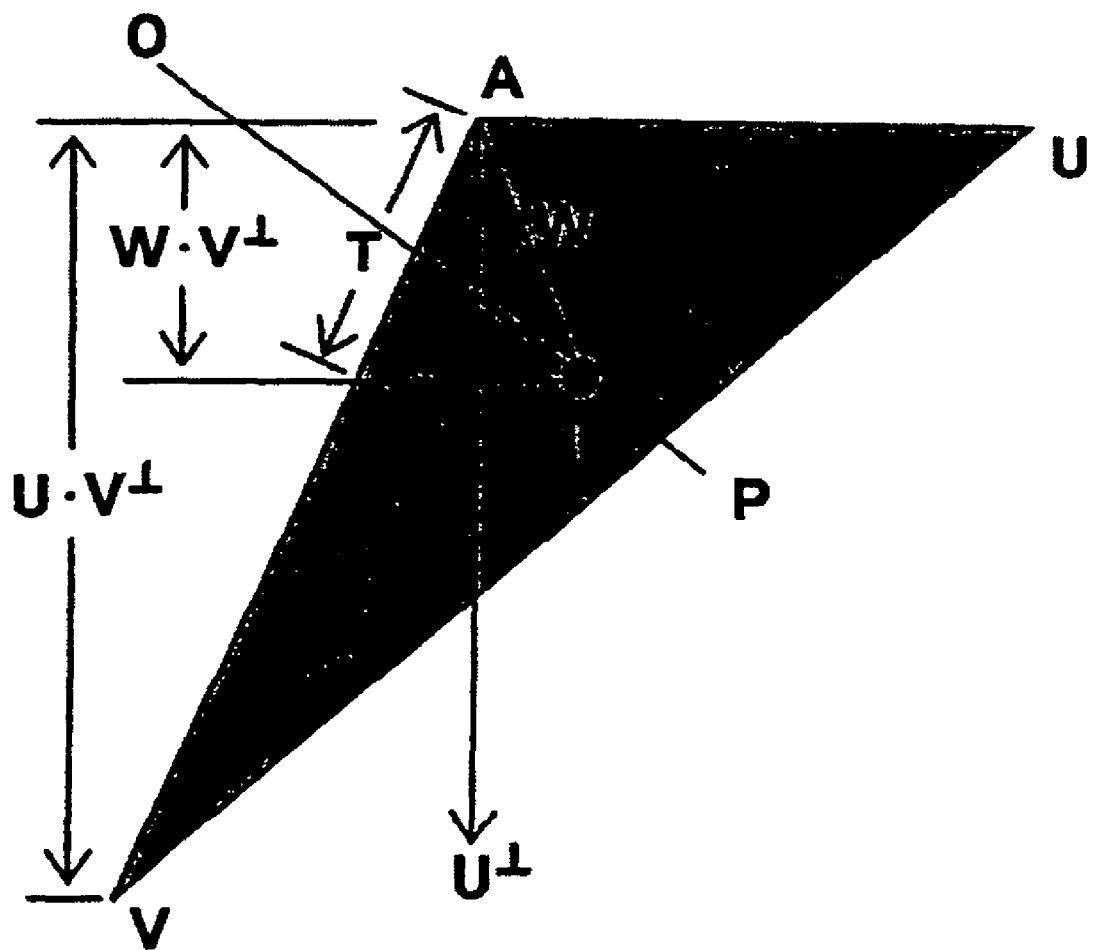
FIG. 40 is an illustration showing how to calculate the value for T.

FIG. 37 shows an illustration of the top and bottom parts of the intersection equation. FIG. 38 shows an illustration of the mesh design limit calculations calculating the vector AW. FIG. 39 shows an illustration showing how to calculate the value for S. FIG. 40 shows an illustration showing how to calculate the value for T.

Figure 41:
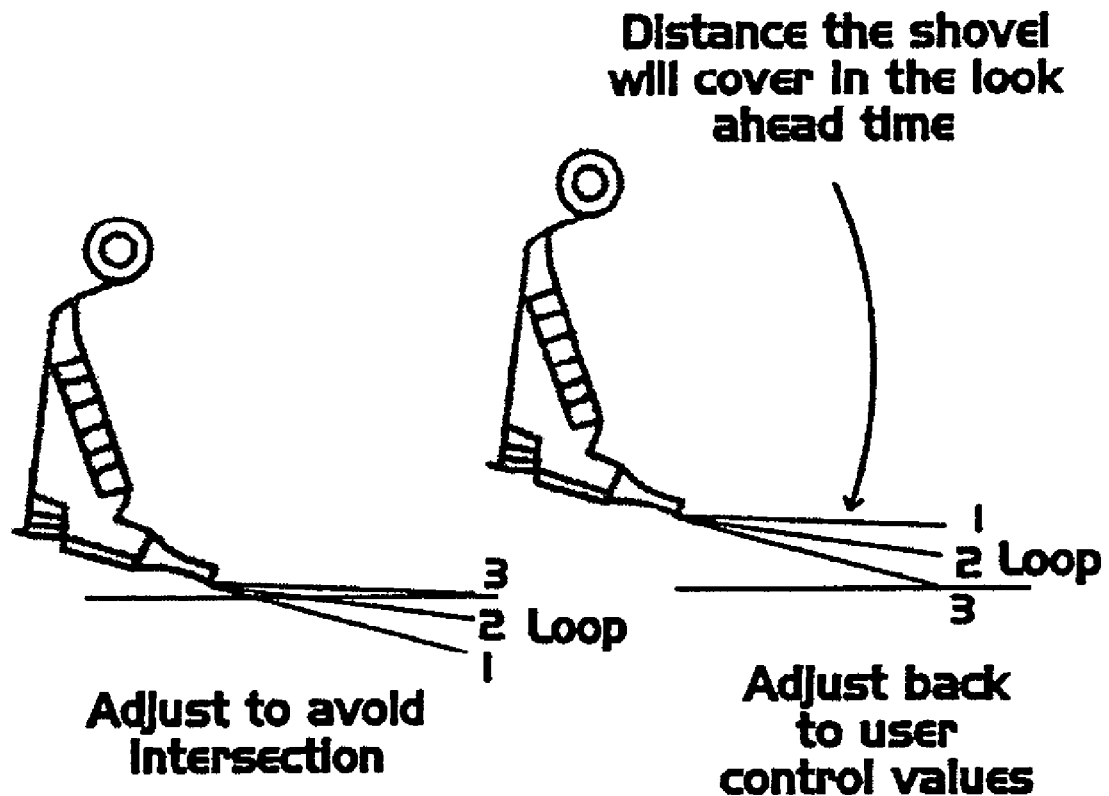
FIG. 41 is an illustration showing how the adjustment group loops through the adjustments.

FIG. 41 is an illustration showing how the adjustment group loops through the adjustments. The Adjustment Group 2902 calculates the values of the adjustments that must be made to the user control inputs to avoid an intersection with the mine design mesh. While mostly made up of logical analysis, the Adjustment Group also includes some calculations. The equations and statements are as follows:

a) Loop through mesh flags and check to see if any of the flags=3
  i) True—Continue
  ii) False—Go to Line 5
b) If(plusflag)
  i) True
    ropecontrol=oldropecontrol
    crowdcontrol=oldcrowdcontrol
  ii) False—Continue
c) If(ropecontrol>−1)
  i) True—ropecontrol=ropecontrol−minadjust
  ii) No—If(crowdcontrol>−1)
    True—crowdcontrol=crowdcontrol−minadjust
    No—Stop
d) Loop back to the Mesh Test Group to retest the mesh for intersections
e) loopcount=0
f) If(crowdcontrol<usercrowd)
  i) True
    oldropecontrol=ropecontrol oldcrowdcontrol=crowdcontrol
plusflag=1
crowdcontrol=crowdcontrol+minadjust
ii) False—If(initialrope<defaultrope) True
oldropecontrol=ropecontrol
oldcrowdcontrol=crowdcontrol
plusflag=1
ropecontrol=ropecontrol+minadjust
False—Stop
g) Loop back to the Mesh Test Group to retest the mesh for intersections.

Figure 42:
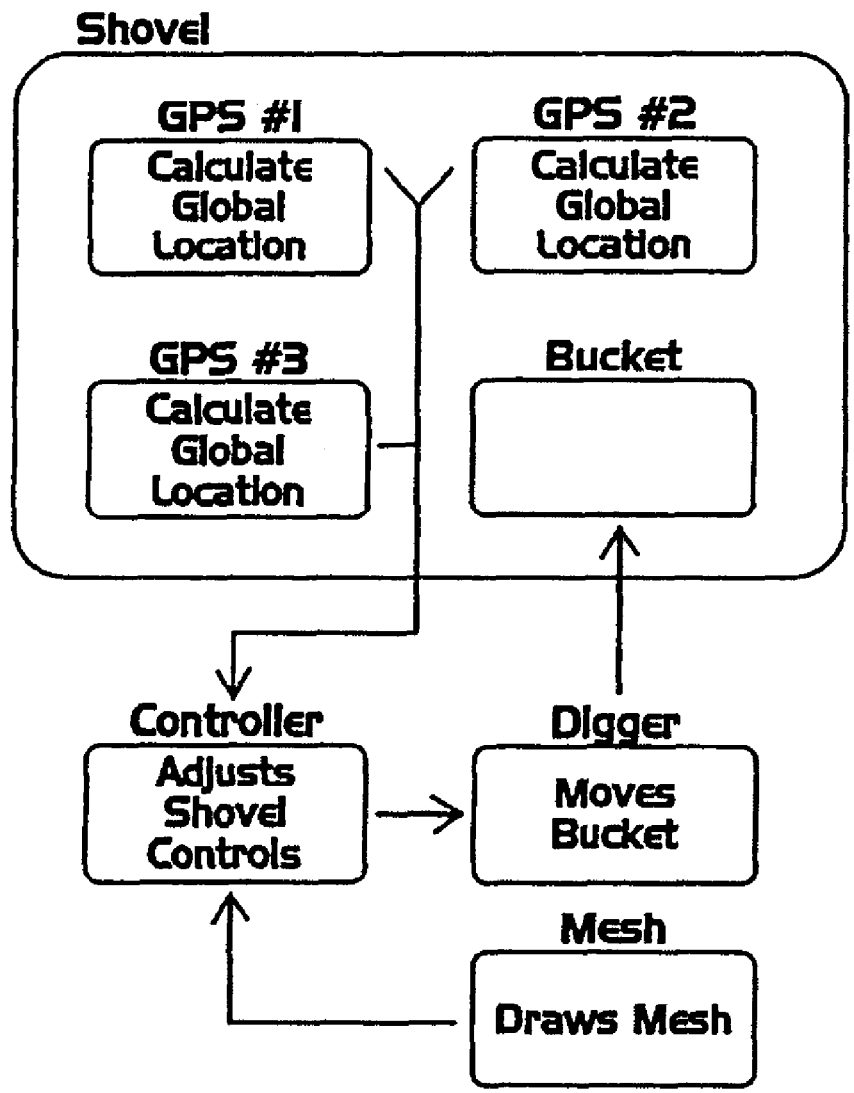
FIG. 42 is a flow diagram of the system test objects.

FIG. 42 is a flow diagram of the system test objects. The CCES test was designed to answer a primary question and a set of secondary questions. The primary question was, "Does the CCES work as expected, and if so how well?" The three secondary questions that were the same question for each of the three control input parameters: "What is the effect of changing this input parameter?" Because a mine shovel was not available for testing, the CCES test was conducted in a computer simulation. Below is a list of the components of the system that were programmed into the CCES test:

A) Local Bucket Location and Orientation Calculations
B) Global Key Bucket Point Location Calculations
C) Mine Design Limit Calculations The system test was conducted in a third-party software package to reduce the amount of programming required in areas outside of the actual CCES. The system test had to include the three-dimensional nature of the problem and also account for the events as they happened over time. For these reasons a discrete event simulation package called Flexsim was chosen.

The Flexsim simulation software was chosen to test the system because it could display the test in three dimensions, it could simulate the CCES and digging events of the shovel over time, and its object-oriented structure allowed the test to be designed to operate like the actual system.

A key requirement of the system test was to determine how the shovel would react and if the system was working correctly, and Flexsim's 3-D environment qualified it perfectly for this task. The system test displays on the computer screen the digging motion of the shovel and the bucket's interaction with the highwall design limit. The bucket is portrayed as a wire frame box with the key bucket points shown as small spheres that can be hidden. The design limit mesh is drawn as a series of triangles that are colored according to the highest value returned by the Triangle Mesh Group: green for 0 (Parallel), yellow for 1 (Short), orange for 2 (Outside), and red for 3 (Intersects). The shovel, its crowd arm, and boom are drawn using blocks that outline the shovel's basic shape.

Changes in the digging motion of the shovel and the CCES events occur at distinct points in time. In the system test the system events occur exactly as they would in the real world. The digging motion of the shovel is simulated by updating the position of the bucket every 0.01 seconds (more often than any of the system events) and changing the user control inputs when the bucket reaches the different phases of the digging cycle.

Because Flexsim is an object-oriented program, the components of the system can be represented as different objects in the test. This means that the design limits, the GPS units, the shovel, the bucket, and the control logic are all represented as individual objects that interact with each other in a realistic way. The shovel contains the GPS units and bucket object, which move and act as if they are on the shovel. The GPS units are represented as three individual objects whose global positions are updated every 0.1 seconds. The bucket is represented as a separate object inside of the shovel. Thus, its location is relative to the shovel's location.

The system test was designed to simulate the real world as closely as possible, to produce usable results. To do this the system test model is composed of different objects that represent the different parts of the system and the shovel. The system test model can be described in four parts: digger, controller, shovel, and Mesh. The parts of the system test and their interactions are shown in FIG. 42.

The digging motion of the shovel is controlled by an object called the Digger. The Digger updates the location of the bucket as the shovel moves through the digging phases. The Digger updates the bucket location according to the current crowd and hoist controls, which are set by the Control System every 0.01 seconds. The Digger uses the Local Bucket Location and Orientation Calculations to determine the new location of the bucket relative to the shovel.

The Control System is represented in the test model as the Controller object. In the simulation, the Controller object acts as the CCES, and prevents the shovel from digging through the mine design limits. The Controller object is set up to test for an intersection at varying intervals according to the scenario that was being simulated. The fastest time interval that was simulated is 0.05 seconds. This is twice as fast as the GPS units can update their locations, but it will only have a small impact because the shovel is not changing its position when it's digging.

The Shovel object represents the shovel itself. The purpose of the Shovel object is to show visually the location and orientation of the shovel and to contain the GPS and bucket objects so that they each have a global and a shovel specific (local) location.

The GPS unit objects calculate their global locations every 0.10 seconds. It is important for the GPS units to be separate objects so that they can calculate their global and shovel locations as realistically as possible. Simulating the GPS units as individual objects also makes it easy to move them on the shovel because Flexsim allows the user to click on any object and drag it to a new location. The GPS units calculate their global positions by calling a function in Flexsim called "vectorproject," which calculates the global location of an object that is inside of another object.

The math in the "vectorproject" function could not be used to calculate the global locations of the key bucket points because the location and rotation of the shovel must be known before the global locations of the GPS units are determined. The determinations of Global Key Bucket Point Location Calculations are made in reverse order from this, as they use the global locations of the GPS units to calculate the global locations of the shovel and key bucket points.

The Bucket object represents the bucket, and thus provides the key bucket points. The local location of the Bucket object is updated by the Digger object every 0.01 seconds.

To visually check the effectiveness of the Mine Design Limit Calculations the object that draws the design limit mesh incorporates some intersection notification logic. The intersection notification logic changes the color of the mesh areas to help identify the state of the area: green for 0 (Parallel), yellow for 1 (Short), orange for 2 (Outside), and red for 3 (Intersects). This allows the tester to watch the digging motion of the shovel and see the mesh areas change colors as the bucket moves by or through them.

To answer the primary and secondary questions, it was necessary to use different setup data involving the three input parameters of the control system.

To answer the primary question, "Does the CCES work as expected, and if so how well?" it is necessary to know the optimal values for the three control input parameters. For this reason the primary question was actually answered after the secondary questions because the secondary questions gave the values for the input variables that resulted in the most accurate digging profile. The input variable values for the primary question were as follows:

| Interval time | 0.05 seconds |
|---|---|
| Look ahead time | 0.10 seconds |
| Minimum adjustment | 0.01 |

Figure 43:
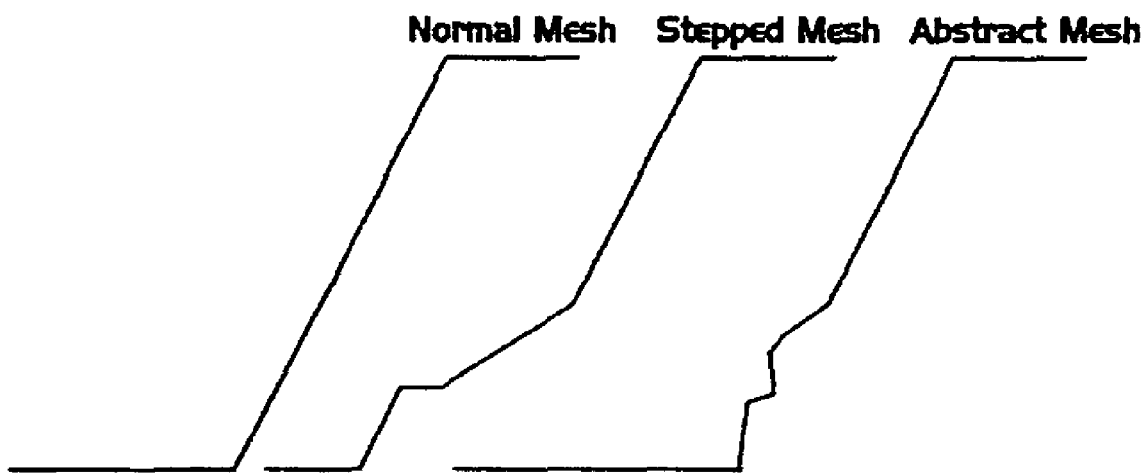
FIG. 43 is an illustration of the different mesh designs.

Three configurations or meshes were chosen for the design limit mesh, to determine how the system would react to different combinations of angles and required adjustments. The first mesh (Normal) is that of an ordinary highwall design, with a flat bench and angled highwall. The second mesh (Stepped) looks like two benches, with a lower-angle face connecting the second bench and the highwall. The lower-angle face is included to make sure that the shovel is capable of digging along the entire mesh surface. The third mesh (Abstract) is an abstract design that was developed to test the system in extreme configurations. All three mesh designs are shown in FIG. 43.

As described above, there are three control input parameters in the present CCES. The first is the interval between intersection checks, or control loop cycle time; the second is the amount of time to look ahead for intersections, or forecast time; the third is the minimum adjustment amount, or deadband. Ten scenarios were run to test the effects of changing the three input parameters on the CCES performance, answering the three secondary questions.

The design limit meshes used to test for the secondary questions were the same as those for the primary question. The Normal mesh simulates a normal situation, while the Stepped and Abstract meshes help to see differences in system performance in small, detailed areas. Each scenario tested in the simulation was run for each of the three mesh designs. In total 30 model runs were made to answer the secondary questions.

For the check-interval runs the look ahead time was set to 0.80 seconds, and held constant throughout all of the runs. A look ahead time of 0.80 seconds insured that all of the tested check interval times were smaller than the look ahead time. The check interval determines the amount of time that passes between the checks for bucket intersections with the mine design mesh. In practice, the check interval time would be adjusted based on the ability of the CCES to run the calculations and handle the number of required adjustments. The input parameter values for the check interval runs were as follows:

| Interval time | 0.05, 0.10, 0.20, and 0.40 seconds |
|---|---|
| Look ahead time | 0.80 seconds |
| Minimum adjustment | 0.01 |

The look ahead time is the amount of time ahead of the current bucket position that the CCES is looking for collisions. The look ahead time is always greater than the check interval time because if the two were equal, the bucket would try to move exactly along the mine design mesh. This would not allow for any delays in the response time of the shovel. If the look ahead time were allowed to be less than the check interval time, the bucket's reactions to the mesh intersections would always be late. The look ahead time must be adjusted to account for delays between the CCES control adjustments and the shovel response. The input parameter values for the look ahead time runs were as follows:

| Interval time | 0.05 seconds |
|---|---|
| Look ahead time | 0.10, 0.20, 0.40, and 0.80 seconds |
| Minimum adjustment | 0.01 |

The minimum adjustment is the smallest adjustment amount that the CCES is allowed to make to the controls. Theoretically this can be infinitely small, but in practice this value is adjusted to take into account the number of calculations that are being made. As the minimum adjustment decreases, more iterations are required in the Mine Design Limit Calculations. The input parameter values for the minimum adjustment runs were as follows:

| Interval time | 0.05 seconds |
|---|---|
| Look ahead time | 0.10 seconds |
| Minimum adjustment | 0.01, 0.02, 0.04, and 0.10 |

Again, the CCES test was designed to answer two questions: First, does the system work, and if so how well? Second, how does changing the input parameters affect the results?

The results for the primary question show the difference in the shovel's digging pattern with and without the CCES. They also show how closely the CCES followed the mine design mesh for each of the three test mesh patterns.

Figure 44:
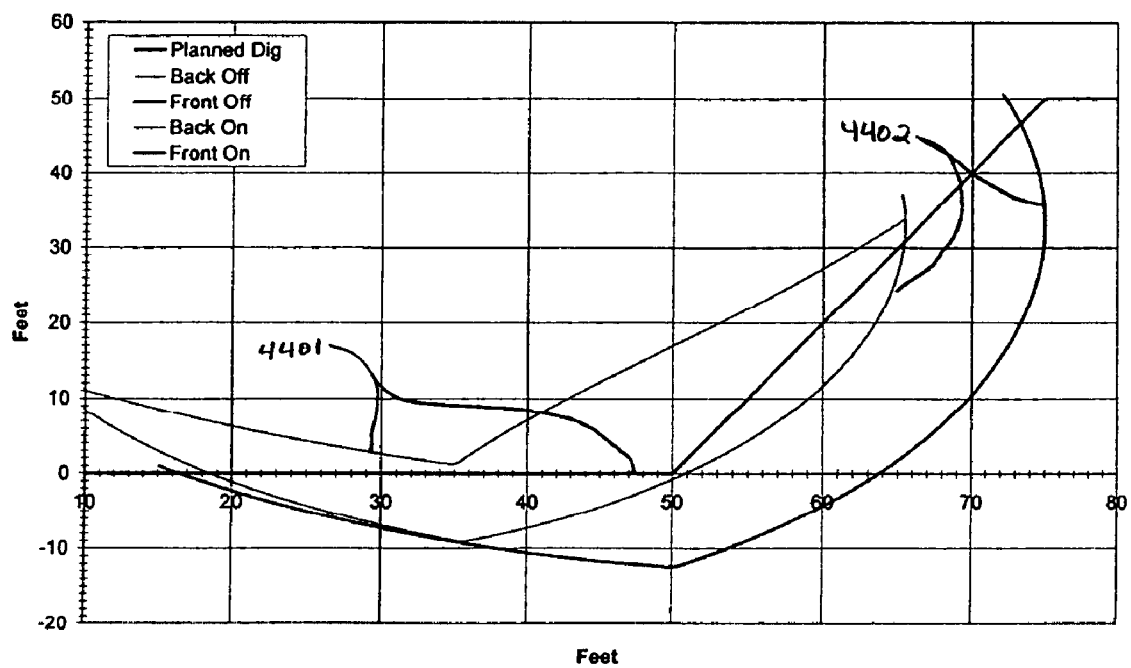
FIG. 44 is an illustration of a comparison of the digging motion of the shovel with and without the use of this invention in the normal mesh.

Although the difference between having the system on and having an operator run the shovel will fully demonstrated until the CCES is implemented on an actual shovel with an operator, the simulation results were encouraging. FIG. 44 shows the simulation of the digging motion of the bucket with the CCES on 4401 and off 4402 with the Normal mesh, assuming typical operator control. The thick lines represent the digging face of the bucket, Front Off (the front edge of the bucket with the CCES turned off) and Front On (the front edge of the bucket with the CCES turned on), and the thin lines are the back corners, Back Off (the back edge of the bucket with the CCES turned off) and Back On (the back edge of the bucket with the CCES turned on), of the bucket.

Figure 45:
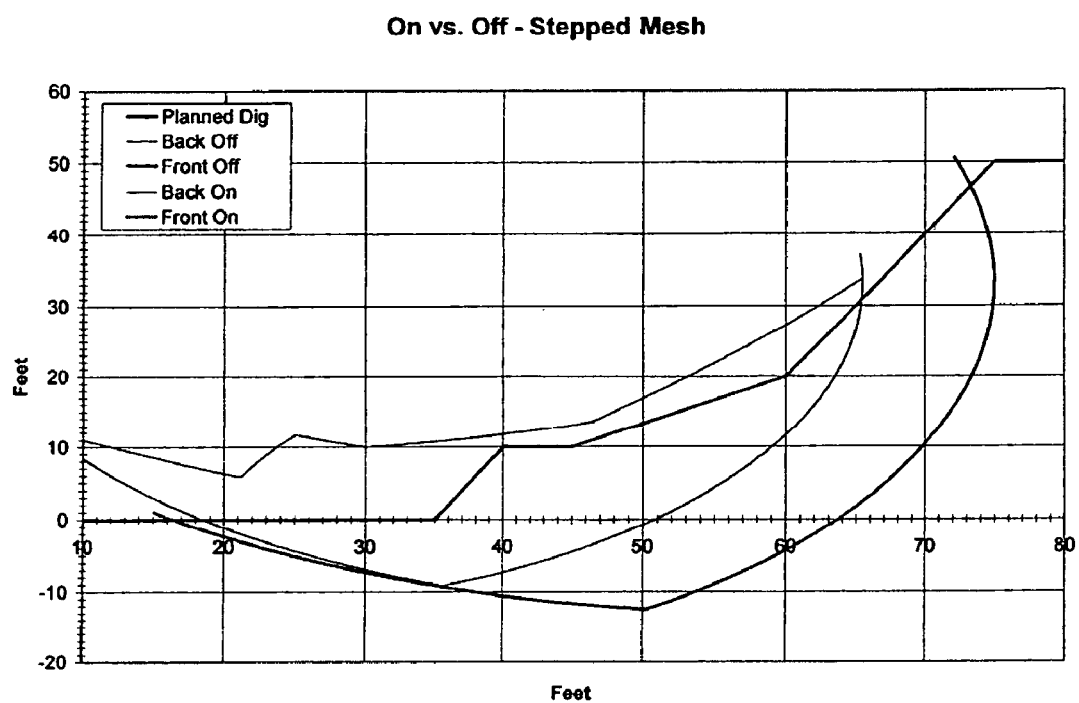
FIG. 45 is an illustration of a comparison of the digging motion of the shovel with and without the use of this invention on the stepped mesh.

FIG. 45 is an illustration of a comparison of the digging motion of the shovel with and without the use of this invention on the stepped mesh and shows a simulation of the digging motion on the Stepped mesh, with the CCES on and off. The simulation shows how the CCES can return to the user values after having to adjust the controls to avoid the design mesh. This happens at the crest of the intermediate bench.

Figure 46:
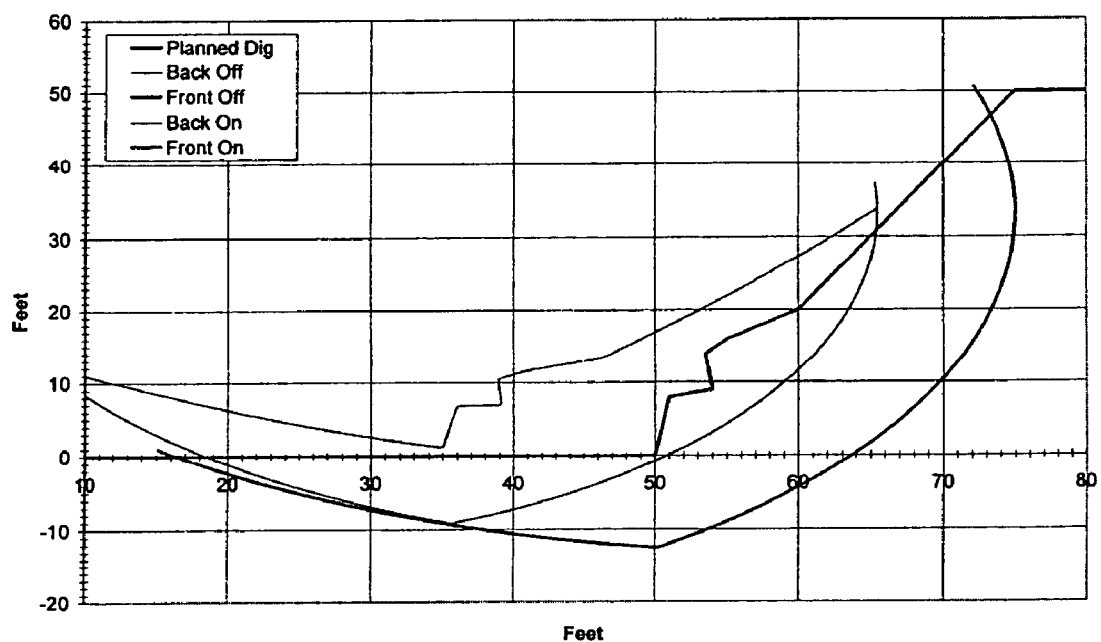
FIG. 46 is an illustration of a comparison of the digging motion of the shovel with and without the use of this invention on the abstract mesh.

FIG. 46 is an illustration of a comparison of the digging motion of the shovel with and without the use of this invention on the abstract mesh and shows a simulation of the digging motion on the Abstract mesh, with the CCES on and off. This simulation shows how the CCES can change directions multiple times, cut a highwall angle greater than 90-degrees, and still return to the user values.

Figure 47:
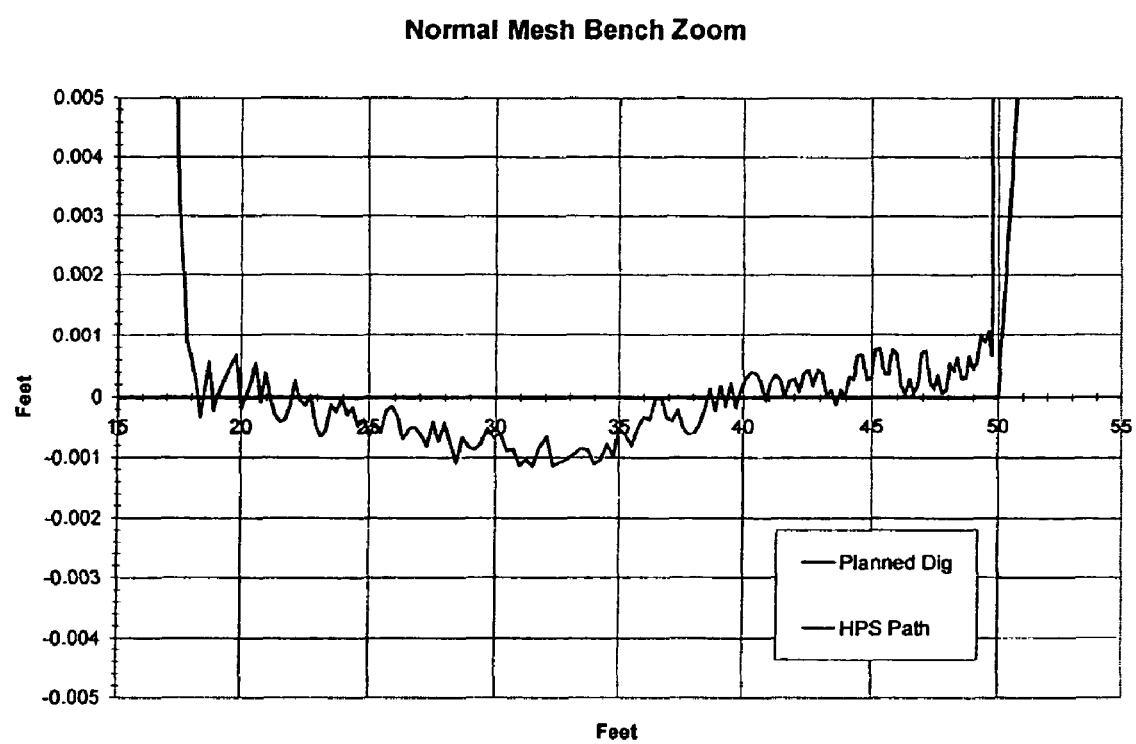
FIG. 47 is a close-up view of the first bench of the normal mesh showing the front edge of the bucket with this invention.

FIG. 47 is a close-up view of the first bench of the normal mesh showing the front edge of the bucket with this invention and shows a view of the simulated path of front edge of the bucket along the bench of the Normal mesh. The graph shows that the CCES was accurate to with in 0.335 millimeters (0.0011 feet). These simulation results do not include any additional errors, and it is likely that an actual system on a shovel would be less accurate. In FIG. 47 the CCES path looks very irregular. This is because the difference between the scales of the two axes is so great. Considering that the bucket was within 0.335 millimeters (0.0011 feet) of the design over a distance of roughly 9.75 meters (32 feet), the CCES path is actually quite smooth. The reason that the CCES path isn't smoother is because natural motion of the bucket closely approximates a continuous arc, while the CCES adjustments to the bucket's position are incremental and sequential. The interval time between successive CCES calculations contributes to this effect.

Figure 48:
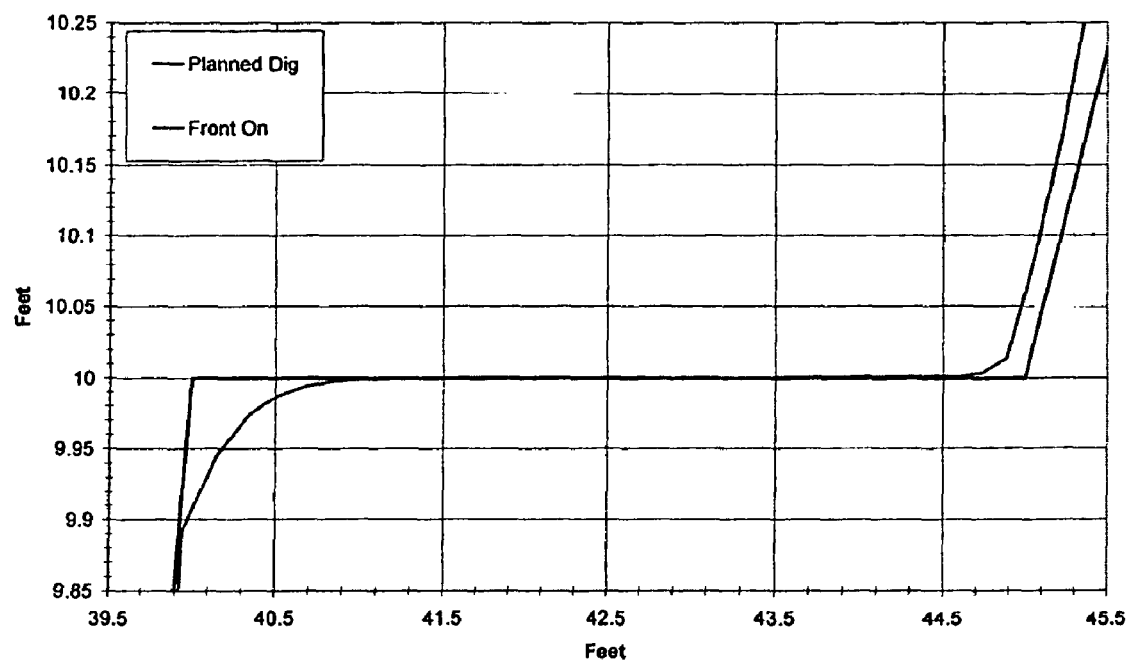
FIG. 48 is a close-up view of the second bench of the stepped mesh showing the front edge of the bucket with this invention.

FIG. 48 is a close-up view of the second bench of the stepped mesh showing the front edge of the bucket with this invention. This graph shows how the look ahead time causes the CCES to round the crest and toe of the bench.

Figure 49:
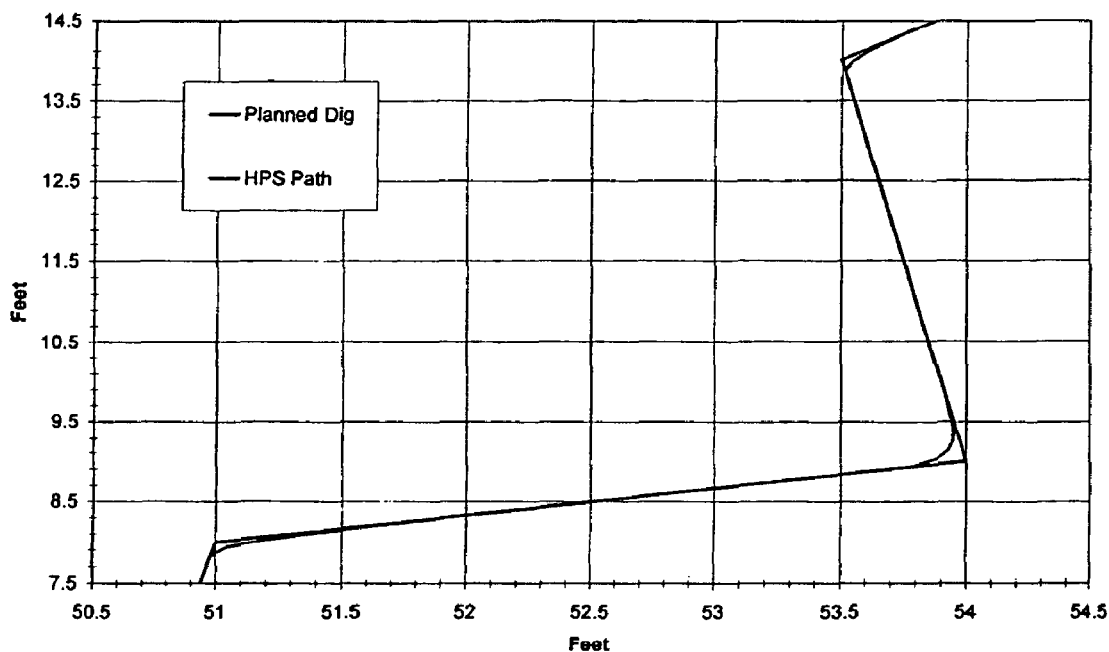
FIG. 49 is a close-up view of the second bench of the abstract mesh showing the path of the front edge of the bucket with this invention.

FIG. 49 is a close-up view of the second bench of the abstract mesh showing the path of the front edge of the bucket with this invention and a close-up of the second bench and face of the Abstract mesh. Like FIG. 48, this figure shows how the look ahead time of the CCES causes it to round off sharp corners. Comparing this figure to FIG. 48 also reveals that the severity of the rounding increases as the angle between successive segments of the bench decreases.

Figure 50:
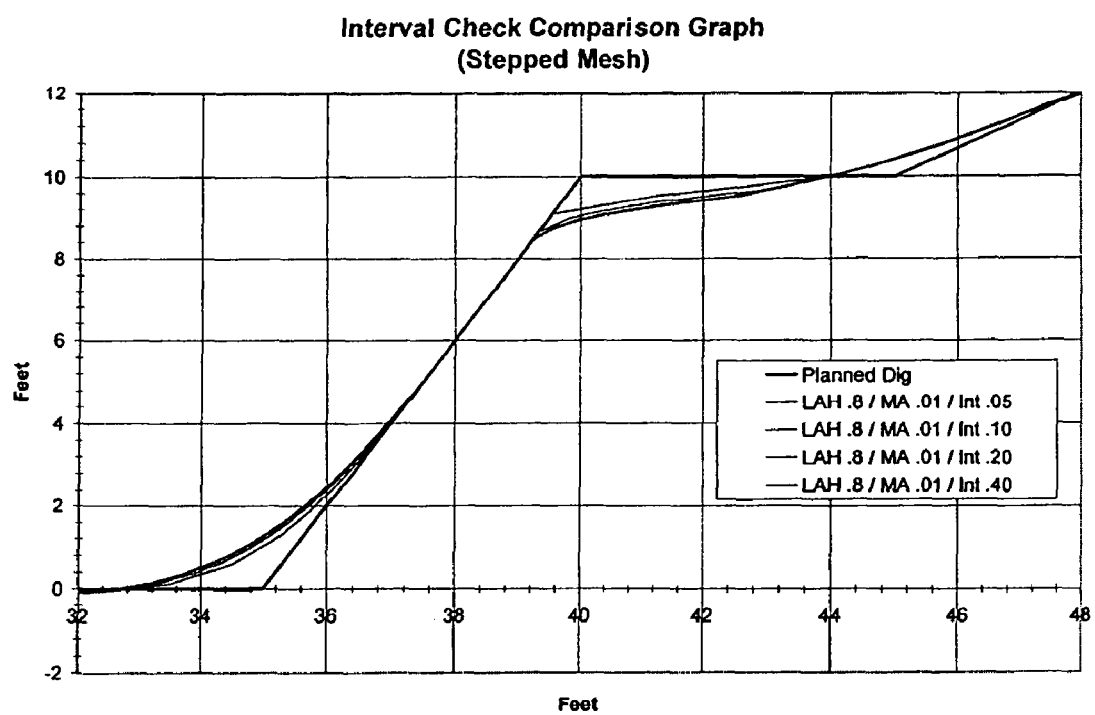
FIG. 50 is a close-up view of the second bench of the stepped mesh showing a comparison of the paths of this invention with different check interval times.

FIG. 50 is a close-up view of the second bench of the stepped mesh showing a comparison of the paths of this invention with different check interval times. The results for the secondary questions show the effects of changing the input parameters and, ultimately, the values that will produce the most accurate results. Four different values were tested for each variable and each value was tested on all three meshes. All of the graphs for the secondary questions use the same? The naming of the data places the look ahead value (LAH) first, the minimum adjustment value (MA) second and the check interval (Int) third.

For the check interval runs, the look ahead time was held constant at 0.80 seconds. The check interval time was adjusted between 0.05 and 0.40 seconds, to determine the effects of changing the interval and the sensitivity of the CCES are to those changes.

Adjusting the check interval time on the CCES without changing the look ahead time delays the system response to changes in the design mesh, causing the bucket to dig deeper into the corners of the design mesh. The end result is that the CCES performance is slightly more accurate, as shown in FIG. 50.

Figure 51:
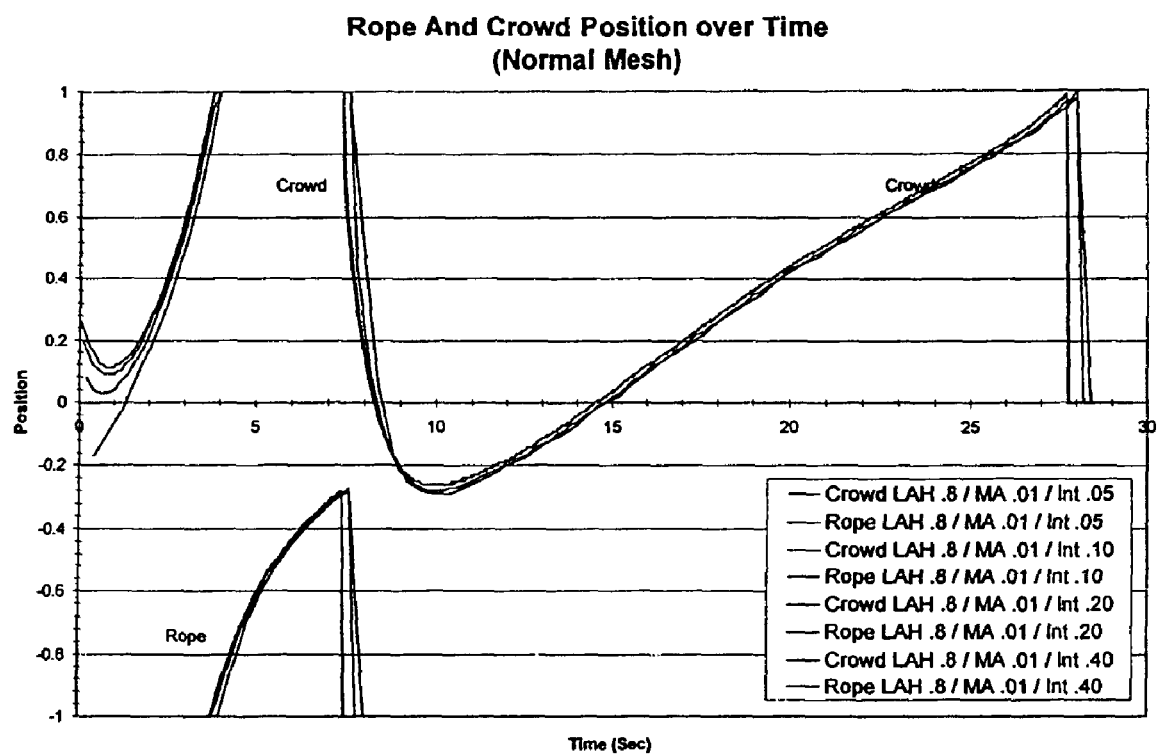
FIG. 51 shows the hoist and crowd control values showing the differences among the runs of the process of this invention with different check interval times.

FIG. 51 shows the hoist and crowd control values showing the differences among the runs of the process of this invention with different check interval times. Increasing the check interval time affects the rope and crowd controls by decreasing the number of adjustments that the CCES makes and increasing the size of the adjustments that must be made. This result is intuitively correct, because increasing the check interval time means that the CCES can not make as many adjustments, and with fewer adjustments available to cover the same amount of total adjustment required, the individual adjustments must be larger. FIG. 51 shows the effects of the different values on the rope and crowd controls. It is clear that as the check interval time is increased, the gaps between adjustments are longer and the sizes of the adjustments increase. This can be seen by looking at the distances between the points where the position values change. The larger distances between the adjustment points result in a smoother line in the graph. Increasing the check interval time decreases the number of adjustments and increases their size. A side effect of increasing the check interval time compared to the look ahead time is an increase in accuracy around the corners, because the bucket digs deeper into the corners before the CCES can adjust the shovel controls.

Figure 52:
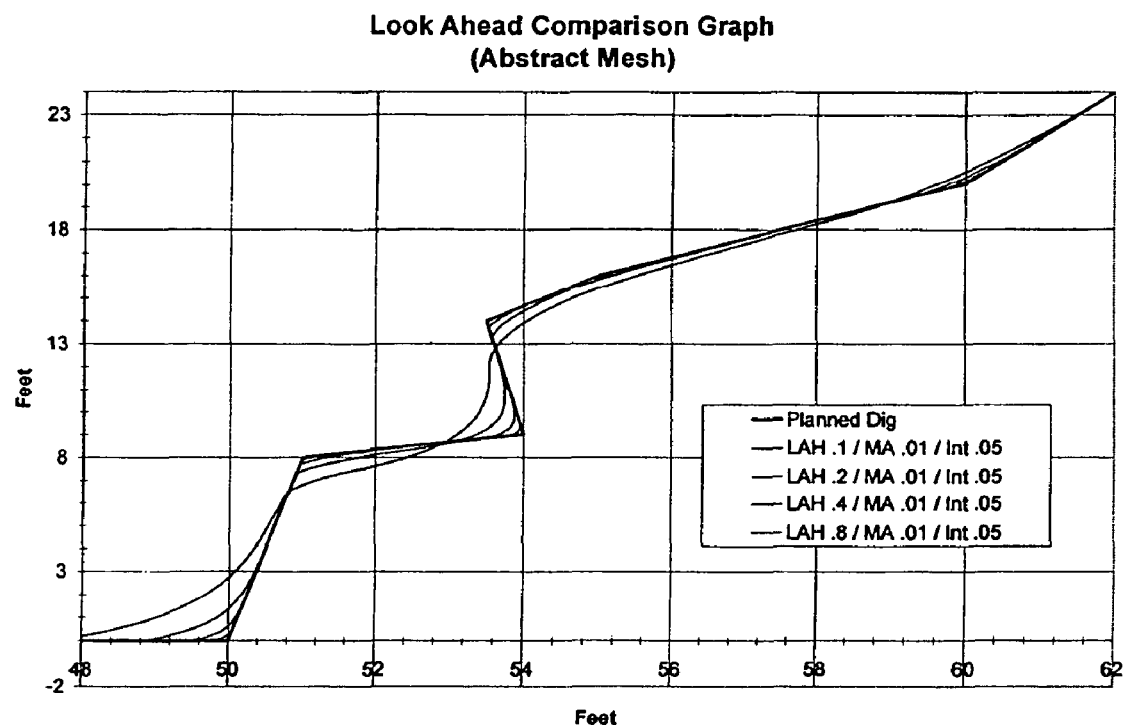
FIG. 52 is a close-up view of the abstract mesh showing a comparison of the paths of the process of this invention with different look ahead times.

FIG. 52 is a close-up view of the abstract mesh showing a comparison of the paths of the process of this invention with different look ahead times. The simulations showed that increasing the look ahead time decreased the accuracy of the system. This occurs because when the system looks further ahead in time, it is less accurate for the current point in time (FIG. 52). The greatest error caused by increasing this parameter was seen in the areas where successive portions of the design mesh made significant angle changes, as shown in FIG. 52.

Figure 53:
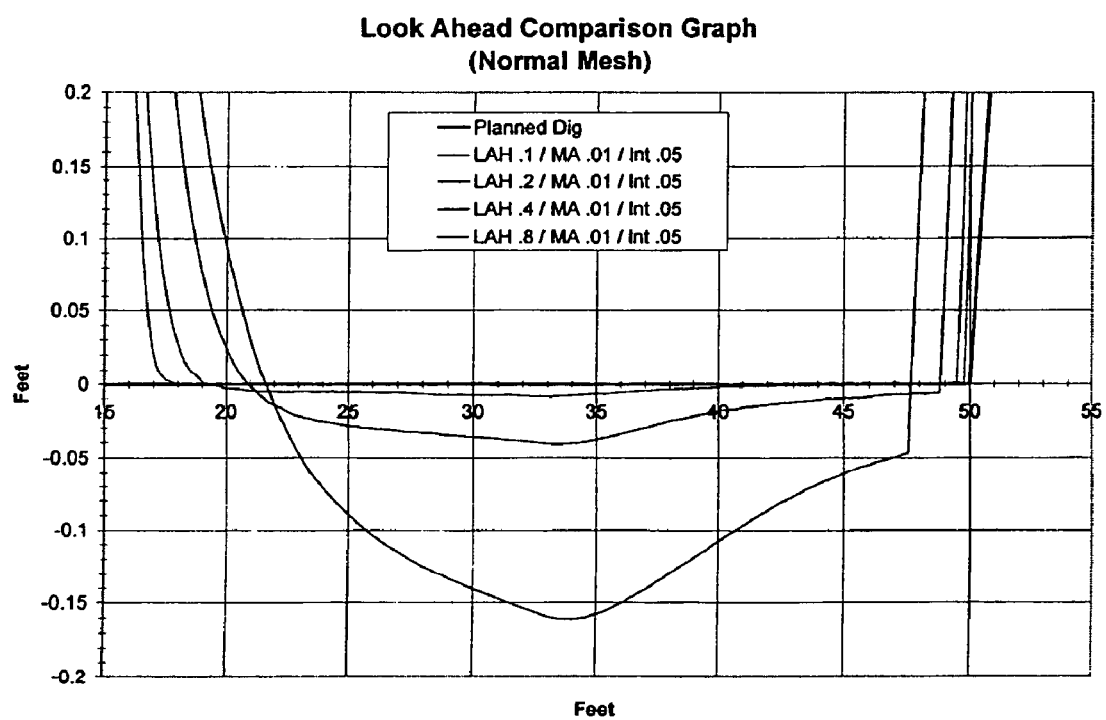
FIG. 53 is a graph of close-up views of the first bench of the normal mesh showing a comparison of the pats of the process of this invention with different look ahead times.

FIG. 53 is a graph of close-up views of the first bench of the normal mesh showing a comparison of the pats of the process of this invention with different look ahead times. The CCES is fairly sensitive to the look ahead time; increasing the time from 0.10 seconds to 0.20 seconds resulted in a ten-fold increase in the margin of error along the bench of the normal bench (FIG. 53).

Figure 54:
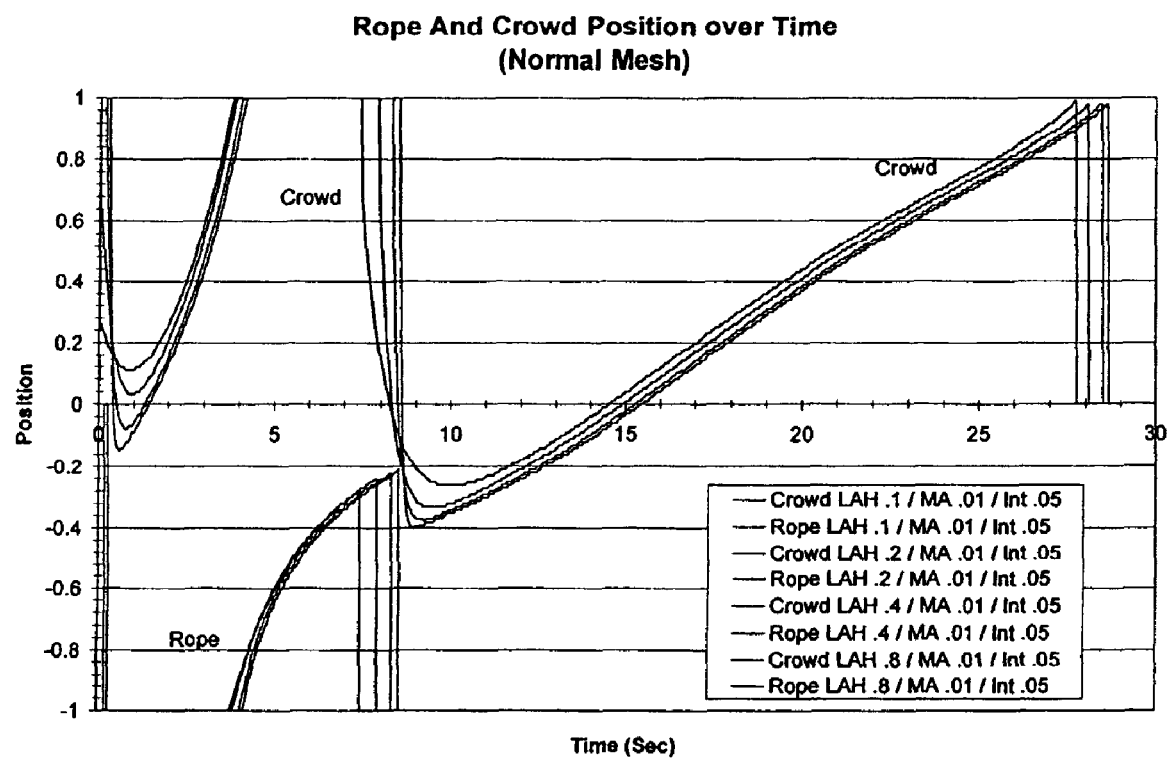
FIG. 54 is a graph of the hoist and crowd control values showing the differences between the process runs with different look ahead times.

FIG. 54 is a graph of the hoist and crowd control values showing the differences between the process runs with different look ahead times. Increasing the look ahead time of the CCES decreases the magnitudes of the overall adjustments to the crowd and rope controls (FIG. 54). The adjustments are decreased as the accuracy of the system decreases because the CCES is not trying to make as changes as quickly. In effect, increasing the look ahead time has a smoothing effect on the performance of the system (FIG. 52).

Figure 55:
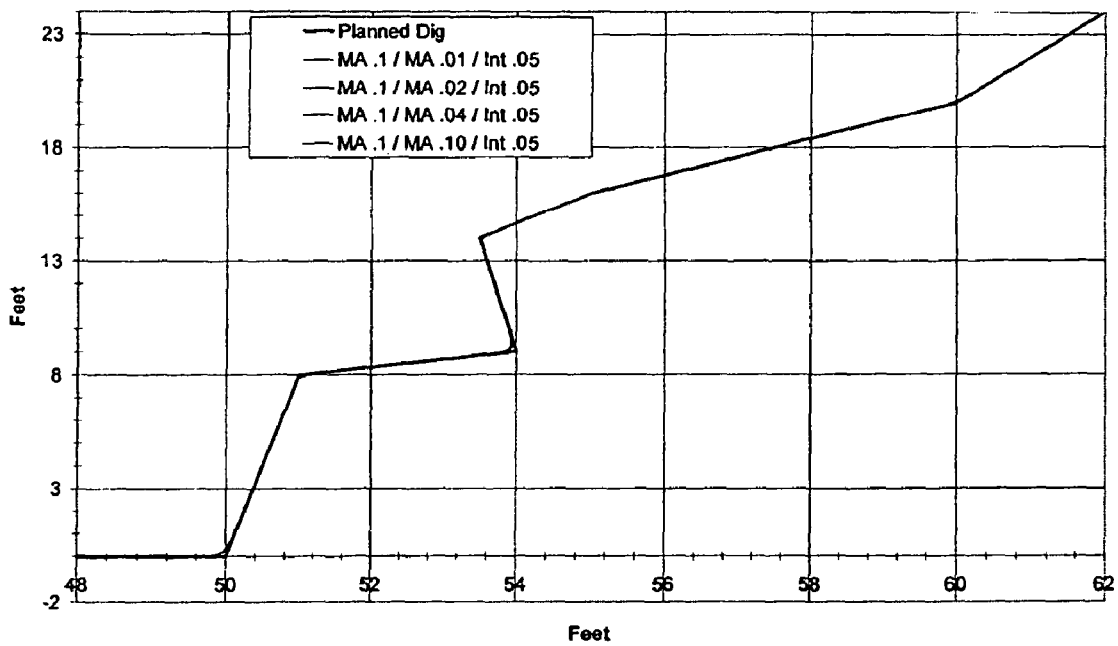
FIG. 55 is a graph of a close-up view of the abstract mesh showing a comparison of the process paths with different minimum adjustment values.

FIG. 55 is a graph of a close-up view of the abstract mesh showing a comparison of the process paths with different minimum adjustment values. The Flexsim simulation software allows the user to define the run speed of the model in relation to real time. This allows the user to run the model faster or slower than real time. The simulations described were run on a 1.7-gigahertz computer. During these simulations it was noted that the model was capable of running at about 2.85 times faster than real time without any significant differences in performance from one scenario to the next. This suggests that there will not be any reason to increase the minimum adjustment value due to a lack of computing power. The accuracy of the CCES was only minimally affected by changes in the minimum adjustment value. FIG. 55 shows a simulation of the effects of changing the minimum adjustment while digging the abstract mesh. In this graph it is hard to distinguish the differences among the respective runs.

Figure 56:
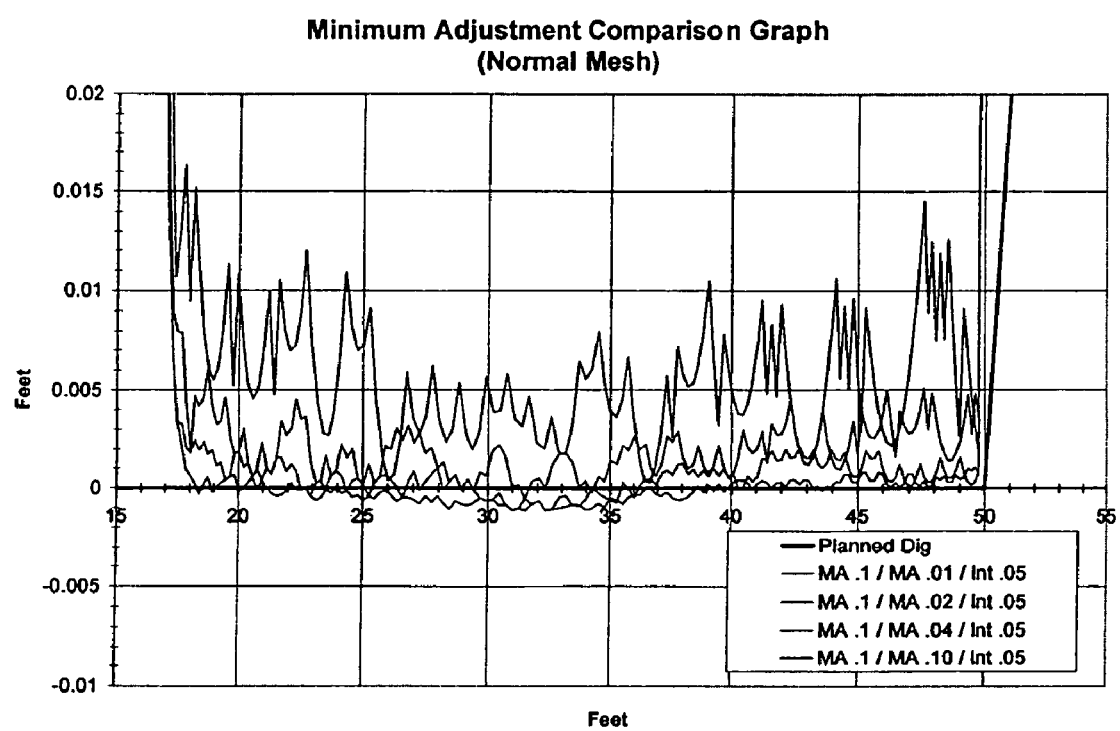
FIG. 56 is a graph of the close-up view of the first bench of the normal mesh showing a comparison of the process paths with different minimum adjustment values.

FIG. 56 is a graph of the close-up view of the first bench of the normal mesh showing a comparison of the process paths with different minimum adjustment values. Although they are indistinguishable in FIG. 55, there are differences in accuracy with the different minimum adjustment values. FIG. 56 is a close-up view of the bench of the Normal mesh, and shows that a higher minimum adjustment value results in a less accurate CCES cut. This is because the CCES cannot make its movements as small, and so cannot follow the design limit mesh as closely. FIG. 56 also shows how increasing the minimum adjustment value decreases the smoothness of the CCES path because the increased delay between adjustments.

Figure 57:
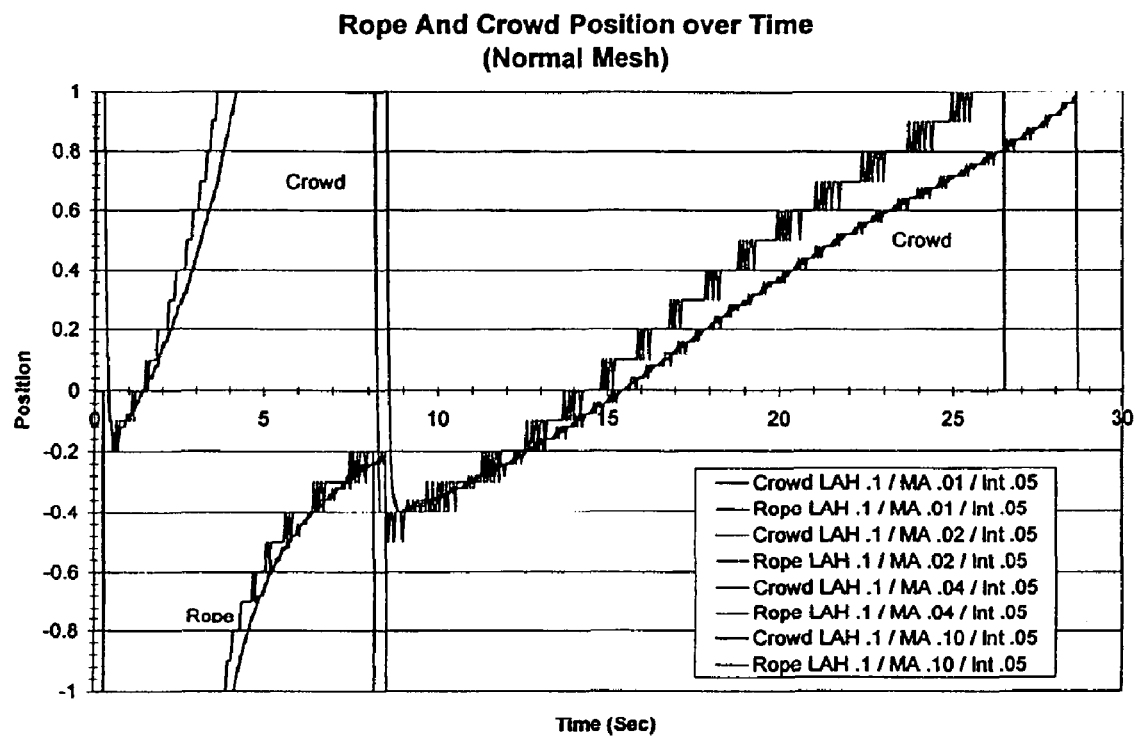
FIG. 57 is a graph of the hoist and crowd control values showing the differences in the process runs with different minimum adjustment values.

FIG. 57 is a graph of the hoist and crowd control values showing the differences in the process runs with different minimum adjustment values. While the minimum adjustment value does not significantly affect the accuracy of the system it does affect the controls of the system. As the minimum adjustment value increases, so does the amount of noise in the control outputs of the system. Noise refers to the tendency of the control outputs to bounce back and forth between two values. It occurs when the system needs to set a control output to a value that is between two possible values. The system compensates by varying the controls between the two values over time. This can lead to significant problems with machinery because of the increased stress caused from the jerky motions that result from the noise in the controls, and the increased wear on the components that actually control the motion of the machine. This is a well-known phenomenon in control systems. FIG. 57 shows the increase in noise as the minimum adjustment value increases.

Figure 58:
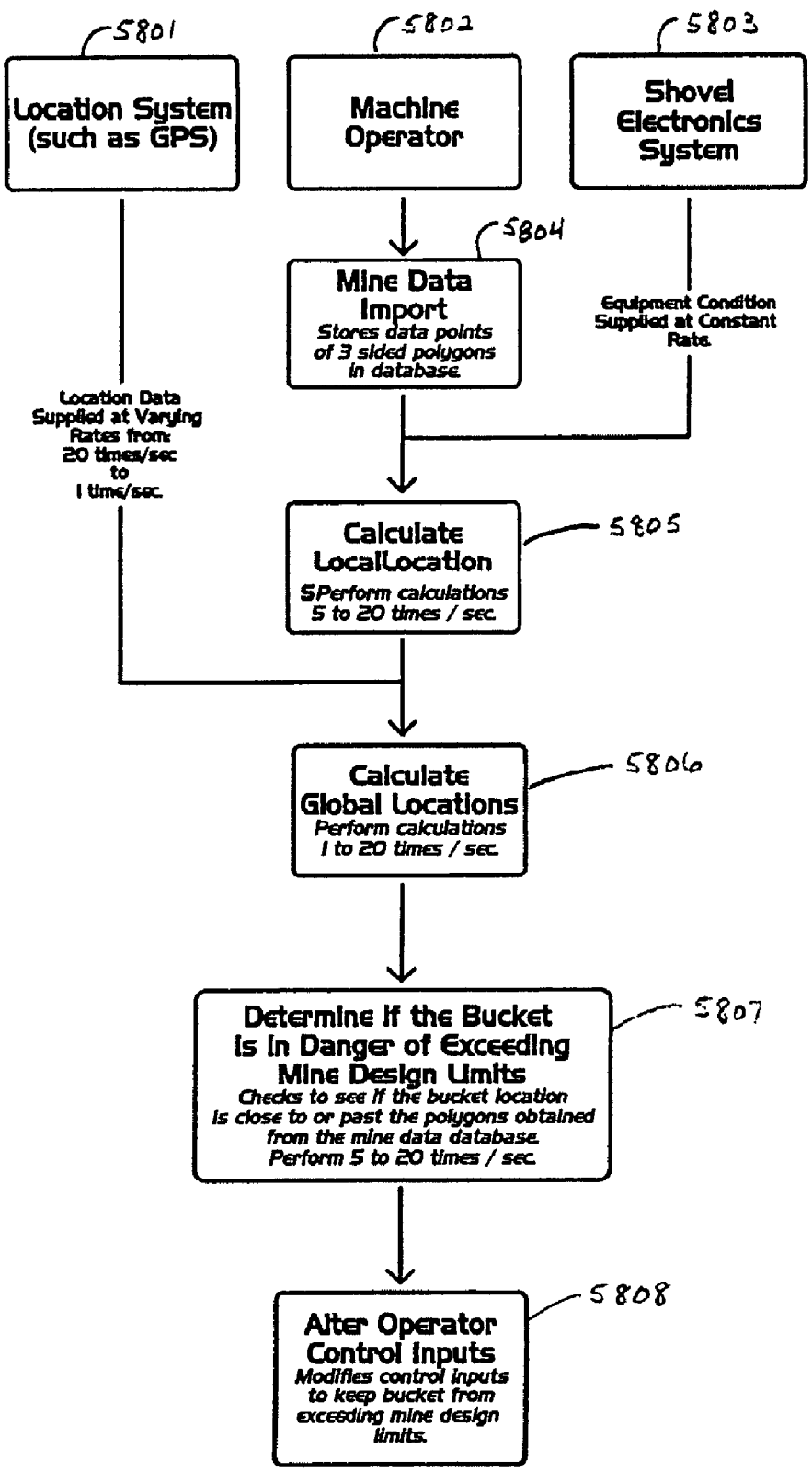
FIG. 58 is a flow diagram showing the interaction of the process of this invention with external systems.
Figure 59:
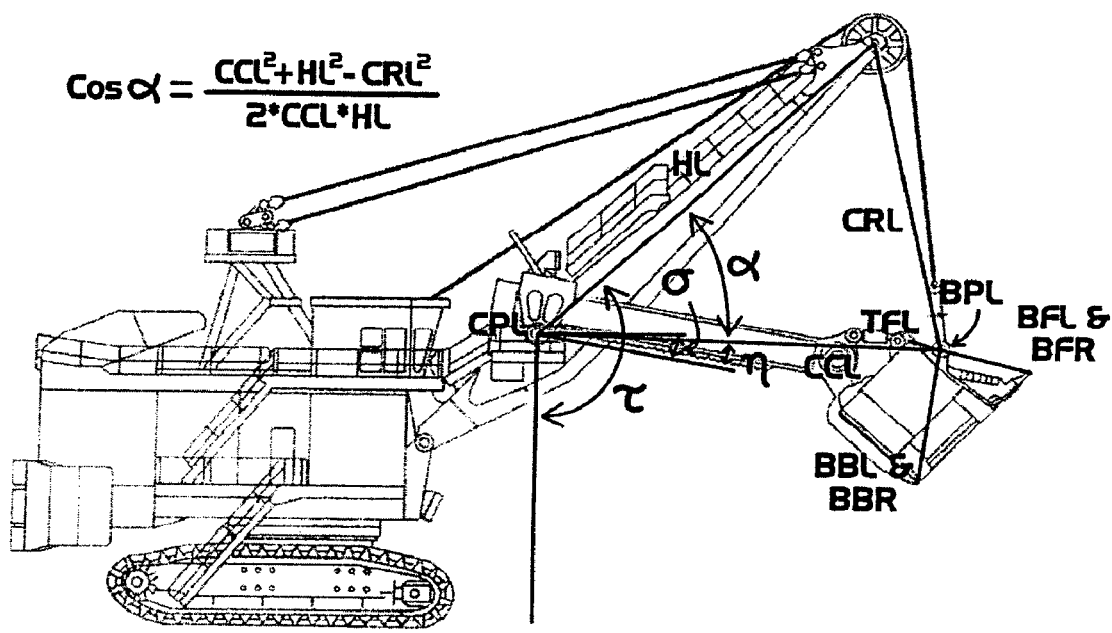
FIG. 59 is an illustration of local bucket calculations in the present embodiment of this invention.
Figure 60:
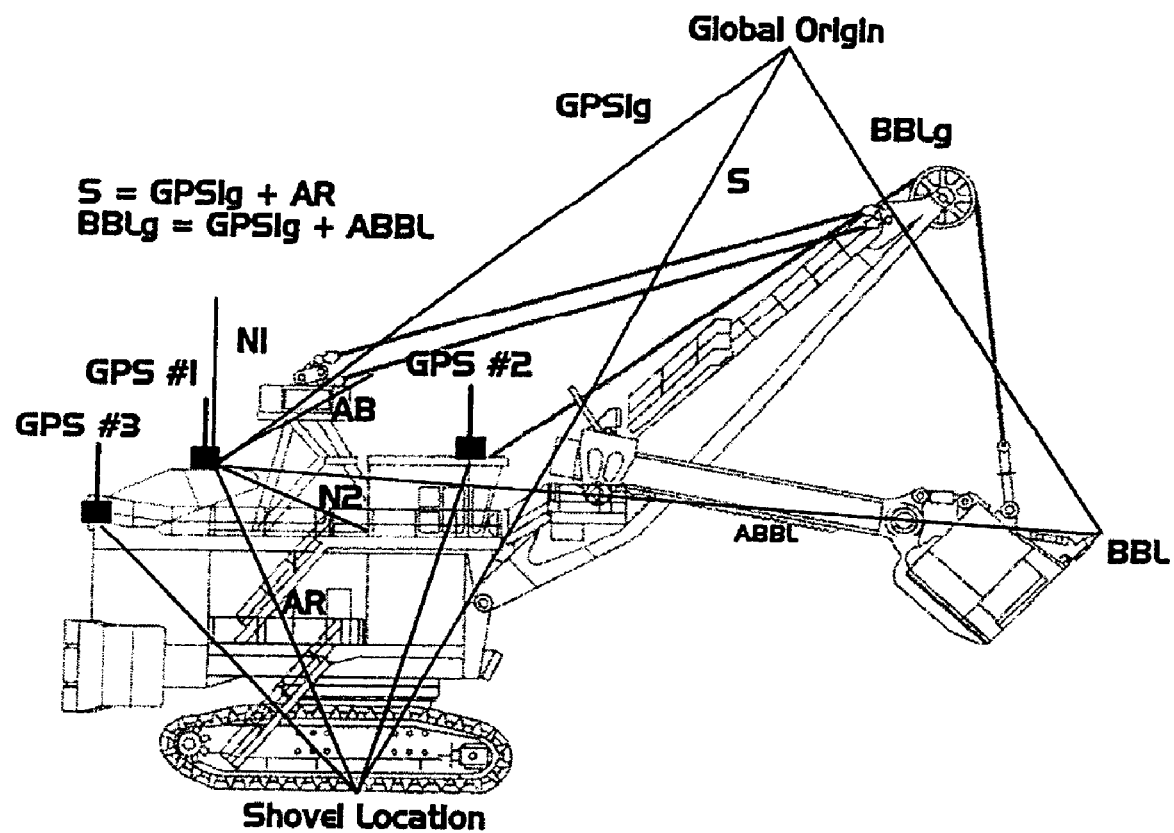
FIG. 60 is an illustration of global bucket calculations in the present embodiment of this invention.

FIG. 58 is a flow diagram showing the interaction of the process of this invention with external systems. The computer used in this invention processes data received from the GPS system 5801 to determine the location of the equipment 5805, 5806 relative to the mine or construction site. This information is used to retrieve design limit polygons from the mine/construction site data base 5804 that are within the area of potential damage from the equipment. The mine/construction data database 5804 is constructed from a series of points input into the system by the machine operator 5802, usually between once a day and once a week. The system compares the polygons that are within the area of potential damage with the current location of the equipment (shovel electronics 5803) and the cutting edge of the equipment. If the machine is in danger of exceeding the limits 5807 the system will modify the control inputs to the equipment to keep the machine from exceeding the design limits 5808. As an example of how the system determines the global bucket location on an electric shovel: (1) the hoist and crowd positions are acquired from equipment electronics 5803; (2) shovel specific locations of key points on the bucket are calculated 5805; and (3) the global locations of key points on the bucket are calculated 5806. This example is shown in FIG. 59 and FIG. 60.

Figure 61:
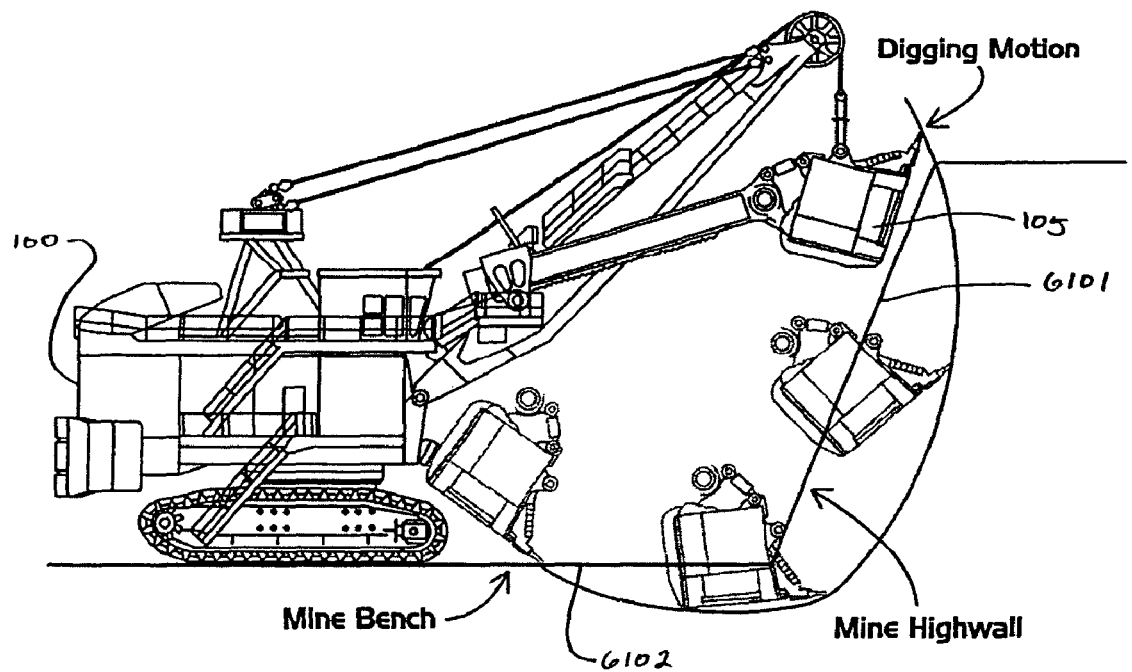
FIG. 61 is an illustration of the normal digging motion of an electric shovel.

FIG. 61 is an illustration of the normal digging motion of an electric shovel and shows the ability for an electric shovel 100 to damage the mine bench 6102 and mine highwall 6101 when operating normally.

Figure 62:
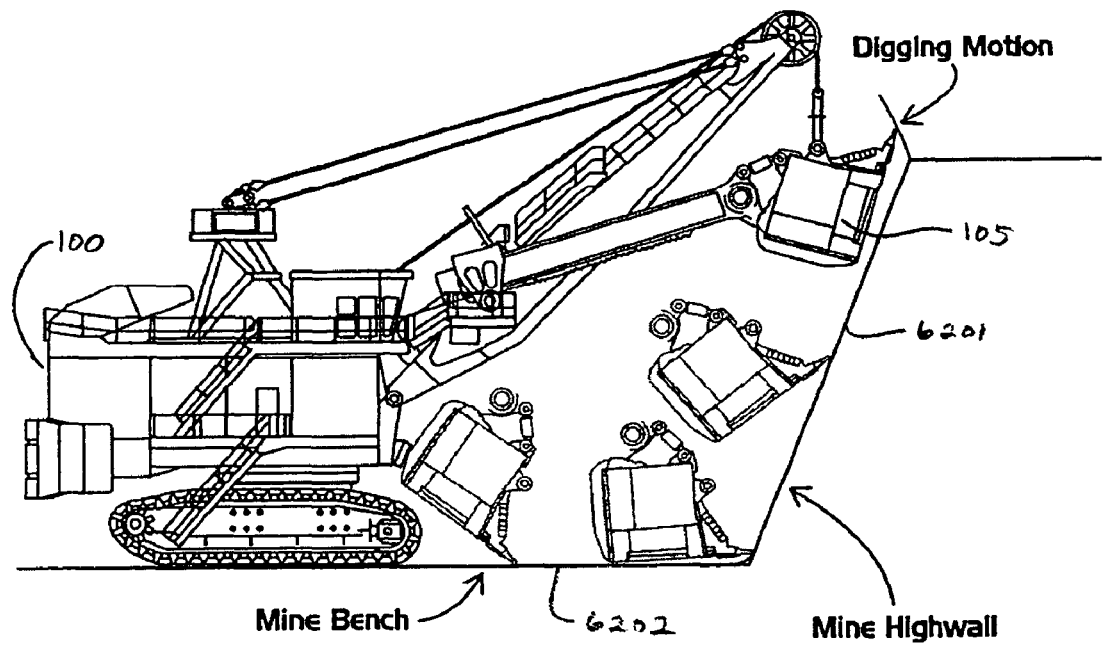
FIG. 62 is an illustration of the digging motion of an electric shovel when controlled by this invention.

FIG. 62 is an illustration of the digging motion of an electric shovel when controlled by this invention and shows the digging motion of the shovel 100 when this invention is being used to limit the motion of the shovel 100, not damaging either the mine highwall 6201 or mine bench 6202. The difference between FIG. 61 and FIG. 62 shows the ability of this present system of this invention to protect external structures from damage by the equipment 100.

In alternative embodiments of the invention, a combination of one or more of the foregoing components, computer steps and devices should be considered within the scope of this invention. Moreover, in alternative embodiments a variety of equivalent alternative electronic and/or software components could be substituted for the components specifically identified in the foregoing description, without departing from the concept of this invention. The various enumerated steps of the process of this invention can be performed in various and different orders, with some steps combined and other steps added without departing from the concept of this invention. The appended claims are to define the scope of this invention. All process and devices that come within the meaning and range of equivalency of the claims are to be embraced as being within the scope of this patent.

What is claimed is:

1. A system for controlling the movement of mobile machines, comprising:
    a control system in communication with an operator-driven operating system of a mobile machine;
    a location system in communication with said control system, wherein said location system comprises a plurality of global location detectors positioned at one or more location points on a mobile machine corresponding to key points of the machine; and
    wherein said control system contains data of one or more limit boundaries for determining when one or more key points of a mobile machine are imminently about to intersect with one or more said limit boundaries and overrides the operator commands to the operating system to modify movement of the mobile machine to prevent exceeding one or more said limit boundaries.

2. A system for controlling the movement of mobile machines, as recited in claim 1, wherein said location system further comprises a plurality of local location detectors positioned at various locations on said mobile machine corresponding to key points of the machine.

3. A system for controlling the movement of mobile machines, as recited in claim 2, wherein said location detectors are GPS units.

4. A system for controlling the movement of mobile machines, as recited in claim 3, wherein said GPS units number three or more.

5. A system for controlling the movement of mobile machines, as recited in claim 2, wherein said global location detectors are laser detectors.

6. A system for controlling the movement of mobile machines, as recited in claim 2, wherein said global location detectors further comprise radio frequency receivers.

7. A system for controlling the movement of mobile machines, as recited in claim 2, wherein said global location detectors further comprise reflector devices.

8. A system for controlling the movement of mobile machines, as recited in claim 2, wherein said local location detectors further comprise joint-monitoring sensors.

9. A system for controlling the movement of mobile machines, as recited in claim 2, wherein at least one of said key points is the outline of the machine.

10. A system for controlling the movement of mobile machines, as recited in claim 2, wherein at least one of said key points is the outline of an appendage of the machine.

11. A system for controlling the movement of mobile machines, as recited in claim 2, wherein at least one of said key points is the cutting edge of the machine.

12. A system for controlling the movement of mobile machines, as recited in claim 2, wherein at least one of said key points is a load of material being moved by the machine.

13. A system for controlling the movement of mobile machines, as recited in claim 2, wherein said control system further comprises a display device for visually displaying for the mobile machine operator the location of said key points of the mobile machine.

14. A system for controlling the movement of mobile machines, as recited in claim 13, wherein said display device is structured to provide visual display of said limit boundaries in three-dimensions.

15. A system for controlling the movement of mobile machines, as recited in claim 1, wherein said control system is a computer device in electronic communication with said mobile machine and with said location system.

16. A system for controlling the movement of mobile machines, as recited in claim 15, wherein said computer device further comprises a storage device containing a database of said limit boundary data.

17. A system for controlling the movement of mobile machines, as recited in claim 15, wherein said computer device further comprises a program for detecting and processing location information received from said location system.

18. A system for controlling the movement of mobile machines, as recited in claim 17, wherein said computer device is structured to update said location information on a real-time basis.

19. A system for controlling the movement of mobile machines, as recited in claim 15, wherein said computer device is programmable to control the speed of the machine.

20. A method for controlling the movement of mobile machines, comprising:

provuding a mobile machine having an operator-driven operating system for effecting movement of a portion of said mobile machine with relative to a design mesh;

providing a control system;

providing a location system comprising global location detectors corresponding to key points on said mobile machine and local location detectors for determining the location of said key points locally, said global and local location detectors being in communication with said control system;

inputting into said control system data comprising a design mesh having defined limit boundaries;

continuously monitoring said global location detectors and said local location detectors corresponding to said key points on said mobile machine;

determining when said mobile machine is approaching an intersection with said defined limit boundaries of said design mesh; and overriding the operator commands given to the operating system of said mobile machine to modify the movement of said appendage of said machine to prevent said appendage from exceeding the defined limit boundaries of said design mesh.

21. The method of claim 20 further comprising overriding the operating system of said mobile machine to modify the operating speed of said mobile machine responsive to detection of said defined limit boundaries.

22. The method of claim 20 wherein said data comprising said design mesh and said determining when said mobile machine is moving relative to said defined limit boundaries of said design mesh is updated in real-time.

23. The method of claim 20 further comprising: providing a display system positioned on said mobile machine; and providing a visual display of the position of said limit boundaries.

24. The method of claim 23 wherein said visual display is provided in three dimensions.

25. The method of claim 20 wherein said global location detectors comprise providing at least three GPS units attached to said mobile machine.

26. The method of claim 20 wherein said design mesh comprises an earth formation.

27. The method of claim 26 wherein said design mesh further includes obstacles located in the area of said mobile machine that are to be avoided.

28. The method of claim 20 wherein said design mesh comprises a load of material to be moved.

29. The method of claim 20 further comprising:

receiving location data for an appendage of said machine locally from local location detectors, said appendage having said local location detectors defining at least one key point on said appendage;

comparing said received location data of said appendage with said data of said design mesh;

determining if the location of said appendage is imminently about to pass through a said limit boundary of said design mesh; and overriding the operator commands given to the operating system to modify the movement of said appendage of said machine to prevent said appendage from exceeding a defined limit boundary of said mesh design.

* * * * *